(12) United States Patent
Mukherjee et al.

(10) Patent No.: US 12,552,961 B2
(45) Date of Patent: Feb. 17, 2026

(54) DROPLET FORMING DEVICES AND METHODS HAVING FLUOROUS DIOL ADDITIVES

(71) Applicant: 10x Genomics, Inc., Pleasanton, CA (US)

(72) Inventors: Tathagata Mukherjee, San Jose, CA (US); Eric Anderson, Lafayette, CA (US); Stefanie Nishimura, Castro Valley, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 0 days.

(21) Appl. No.: 18/635,552

(22) Filed: Apr. 15, 2024

(65) Prior Publication Data
US 2024/0271005 A1    Aug. 15, 2024

Related U.S. Application Data

(63) Continuation of application No. PCT/US2023/030441, filed on Aug. 17, 2023.

(60) Provisional application No. 63/371,787, filed on Aug. 18, 2022.

(51) Int. Cl.
*B01L 3/00* (2006.01)
*C08G 77/50* (2006.01)
*C09D 5/16* (2006.01)
*C09D 183/14* (2006.01)

(52) U.S. Cl.
CPC .......... *C09D 183/14* (2013.01); *B01L 3/5027* (2013.01); *C08G 77/50* (2013.01); *C09D 5/1675* (2013.01); *B01L 2300/16* (2013.01)

(58) Field of Classification Search
CPC .. B01L 2300/16–168; C08G 77/46–50; C08G 65/226; C08G 65/336; C09D 183/12–16
See application file for complete search history.

(56) References Cited

U.S. PATENT DOCUMENTS

| | | |
|---|---|---|
| 5,700,692 A | 12/1997 | Sweet |
| 5,842,787 A | 12/1998 | Kopf-Sill et al. |
| 5,872,010 A | 2/1999 | Karger et al. |
| 6,071,564 A | 6/2000 | Marchetti et al. |
| 6,296,020 B1 | 10/2001 | McNeely et al. |
| 6,432,290 B1 | 8/2002 | Harrison et al. |
| 6,778,724 B2 | 8/2004 | Wang et al. |
| 6,808,075 B2 | 10/2004 | Bohm et al. |
| 6,877,528 B2 | 4/2005 | Gilbert et al. |
| 6,880,576 B2 | 4/2005 | Karp et al. |
| 6,994,218 B2 | 2/2006 | Kawano et al. |
| 7,264,972 B2 | 9/2007 | Foster |
| 7,452,725 B2 | 11/2008 | Leary et al. |
| 7,699,767 B2 | 4/2010 | Mueth et al. |
| 7,901,947 B2 | 3/2011 | Pollack et al. |
| 7,943,671 B2 | 5/2011 | Herminghaus et al. |
| 8,096,421 B2 | 1/2012 | Shinoda |
| 8,186,913 B2 | 5/2012 | Toner et al. |
| 8,206,994 B2 | 6/2012 | Baroud et al. |
| 8,387,803 B2 | 3/2013 | Thorslund et al. |
| 8,467,040 B2 | 6/2013 | Luscher |
| 8,524,173 B2 | 9/2013 | Yamanaka et al. |
| 8,529,026 B2 | 9/2013 | Clarke et al. |
| 8,592,221 B2 | 11/2013 | Fraden et al. |
| 8,609,787 B2 | 12/2013 | Hansen et al. |
| 8,664,323 B2 | 3/2014 | Iyer et al. |
| 8,741,192 B2 | 6/2014 | Torii et al. |
| 8,820,538 B1 | 9/2014 | Lin |
| 8,821,006 B2 | 9/2014 | Norikane et al. |
| 8,871,500 B2 | 10/2014 | Foster et al. |
| 8,944,083 B2 | 2/2015 | Collier et al. |
| 9,012,390 B2 | 4/2015 | Holtze et al. |
| 9,017,623 B2 | 4/2015 | Fraden et al. |
| 9,045,647 B2 | 6/2015 | Kleyer et al. |
| 9,133,009 B2 | 9/2015 | Baroud et al. |
| 9,399,215 B2 | 7/2016 | Cauley, III et al. |
| 9,403,294 B2 | 8/2016 | Cauley, III |
| 9,453,787 B2 | 9/2016 | Foster et al. |
| 9,638,620 B2 | 5/2017 | Di Carlo et al. |
| 9,700,891 B2 | 7/2017 | Smith et al. |
| 9,757,698 B2 | 9/2017 | Weitz et al. |
| 9,957,359 B2 | 5/2018 | Dent et al. |
| 10,011,872 B1 | 7/2018 | Belgrader et al. |
| 10,323,278 B2 | 6/2019 | Belgrader et al. |
| 2001/0036669 A1 | 11/2001 | Jedrzejewski et al. |

(Continued)

FOREIGN PATENT DOCUMENTS

| | | |
|---|---|---|
| CN | 102458690 A | 5/2012 |
| CN | 102712665 A | 10/2012 |

(Continued)

OTHER PUBLICATIONS

Machine Translation of JPH07-053919A. Feb. 28, 1995. (Year: 1995).*
U.S. Appl. No. 62/522,292, Delaney et al.
3M Novec 1720 Electronic Grade Coating Product Information, 3M Electronics Markets Materials Division, Issued Mar. 2014 (2 pages).
Abate et al., Valve-based flow focusing for drop formation. Appl. Phys. Lett. 2009;94. 3 pages.
Abate, et al. High-throughput injection with microfluidics using picoinjectors. Proc. Natl. Acad. Sci. USA. Nov. 9, 2010;107(45):19163-6. doi: 10.1073/pNas.1006888107. Epub Oct. 20, 2010.
AGC Chemicals, "Amorphous Fluoropolymer CYTOP: Chemistry for a Blue Planet" Jul. 2015 (10 pages).
Akartuna et al. "Chemically induced coalescence in droplet-based microfluidics" Lab Chip DOI:10.1039/c4lc91285b (2014) (5 pages).
Attia, U.M et al., "Micro-injection moulding of polymer microfluidic devices" Microfluidics and nanofluidics (2009) 7(1):1-28.

(Continued)

*Primary Examiner* — Stephen E Rieth
(74) *Attorney, Agent, or Firm* — Clark & Elbing LLP

(57) ABSTRACT

Crosslinked fluorocarbon surface coating, kits therefor, microfluidic devices having crosslinked fluoropolymer surface coatings, and methods of use for droplet generation are provided. The kits, devices, and their methods have a droplet source region that is coated with a crosslinked fluoropolymer surface coating produced by the reaction of a fluorocarbon silane and a fluorocarbon polyol.

6 Claims, 4 Drawing Sheets

(56) References Cited

U.S. PATENT DOCUMENTS

| | | |
|---|---|---|
| 2003/0005967 A1 | 1/2003 | Karp |
| 2004/0109793 A1 | 6/2004 | McNeely et al. |
| 2007/0065808 A1 | 3/2007 | Bohm et al. |
| 2007/0166200 A1 | 7/2007 | Zhou et al. |
| 2008/0038810 A1 | 2/2008 | Pollack et al. |
| 2008/0050283 A1 | 2/2008 | Chou et al. |
| 2009/0269824 A1 | 10/2009 | Kim et al. |
| 2010/0006441 A1 | 1/2010 | Renaud et al. |
| 2010/0021984 A1 | 1/2010 | Edd et al. |
| 2011/0000560 A1 | 1/2011 | Miller et al. |
| 2011/0086377 A1 | 4/2011 | Thwar et al. |
| 2011/0223314 A1 | 9/2011 | Zhang et al. |
| 2011/0319546 A1 | 12/2011 | Iyer et al. |
| 2012/0091059 A1 | 4/2012 | Beer et al. |
| 2012/0097159 A1 | 4/2012 | Iyer et al. |
| 2012/0121480 A1 | 5/2012 | Frenz et al. |
| 2012/0142018 A1 | 6/2012 | Jiang |
| 2012/0211084 A1 | 8/2012 | Weitz et al. |
| 2012/0236299 A1 | 9/2012 | Chiou et al. |
| 2012/0315690 A1 | 12/2012 | Di Carlo et al. |
| 2013/0228100 A1 | 9/2013 | Kleyer et al. |
| 2013/0236901 A1 | 9/2013 | Potier et al. |
| 2014/0179544 A1 | 6/2014 | Steenblock et al. |
| 2014/0326339 A1 | 11/2014 | Toner et al. |
| 2015/0034163 A1 | 2/2015 | Abate et al. |
| 2015/0224466 A1 | 8/2015 | Hindson et al. |
| 2015/0258543 A1 | 9/2015 | Baroud et al. |
| 2015/0267246 A1 | 9/2015 | Baroud et al. |
| 2015/0292988 A1 | 10/2015 | Bharadwaj et al. |
| 2015/0298157 A1 | 10/2015 | Weitz et al. |
| 2015/0336096 A1 | 11/2015 | Smith et al. |
| 2015/0360236 A1 | 12/2015 | Garcia et al. |
| 2016/0097071 A1 | 4/2016 | Wiyatno et al. |
| 2016/0193574 A1 | 7/2016 | Weitz et al. |
| 2016/0250637 A1 | 9/2016 | Neild et al. |
| 2017/0106134 A1 | 4/2017 | Dreschel et al. |
| 2017/0114385 A1 | 4/2017 | Di Carlo et al. |
| 2017/0165663 A1 | 6/2017 | Hong et al. |
| 2017/0189908 A1 | 7/2017 | Dzenitis et al. |
| 2018/0056294 A1 | 3/2018 | Di Carlo et al. |
| 2018/0104691 A1 | 4/2018 | Merten et al. |
| 2018/0193829 A1 | 7/2018 | Boitard et al. |
| 2018/0311669 A1 | 11/2018 | Basu et al. |
| 2019/0060905 A1* | 2/2019 | Bharadwaj .......... B01F 25/3141 |
| 2019/0118182 A1 | 4/2019 | Weitz et al. |
| 2019/0271633 A1 | 9/2019 | Otsuka et al. |
| 2020/0086322 A1 | 3/2020 | Amini et al. |
| 2020/0122135 A1 | 4/2020 | Abate et al. |
| 2023/0068054 A1 | 3/2023 | Iida et al. |

FOREIGN PATENT DOCUMENTS

| | | |
|---|---|---|
| CN | 103097474 A | 5/2013 |
| CN | 103328491 A | 9/2013 |
| CN | 103965755 A | 8/2014 |
| CN | 104321393 A | 1/2015 |
| CN | 106133063 A | 11/2016 |
| JP | 07053919 A * | 2/1995 |
| JP | H08104862 A | 4/1996 |
| JP | 2008-001929 A | 1/2008 |
| WO | WO-2010128858 A1 | 11/2010 |
| WO | WO-2013/129691 A1 | 9/2013 |
| WO | WO-2014/120601 A1 | 8/2014 |
| WO | WO-2015/142561 A1 | 9/2015 |
| WO | WO-2015160919 A1 | 10/2015 |
| WO | WO-2016075172 A1 | 5/2016 |
| WO | WO-2019/040637 A1 | 2/2019 |
| WO | WO-2019/157529 A1 | 8/2019 |
| WO | WO-2021/125058 A1 | 6/2021 |
| WO | WO-2023/168423 A1 | 9/2023 |

OTHER PUBLICATIONS

Baret et al. "Fluorescence-activated droplet sorting (FADS): efficient microfluidic cell sorting based on enzymatic activity" Lab on a Chip (2009) 9(13):1850-1858.
Becker et al., "Polymer Microfabrication Technologies for Microfluidic", vol. 390, Issue 1, pp. 89-111 (Jan. 2008).
Bransky, et al. A microfluidic droplet generator based on a piezoelectric actuator. Lab Chip. Feb. 21, 2009;9(4):516-20. doi: 10.1039/b814810d. Epub Nov. 20, 2008.
Brouzes, E et al., "Droplet microfluidic technology for single-cell high-throughput screening" PNAS (2009) 106(34):14195-14200.
Brower et al. Optimized double emulsion flow cytometry with high-throughput single droplet isolation. bioRxiv preprint first posted online Oct. 15, 2019; doi: http://dx.doi.org/10.1101/803460.
Chakraborty et al. "Microfluidic step-emulsification in axisymmetric geometry" Lab Chip 17(21):3609-3620 (2017).
Chokkalingam et al. "Self-synchronizing pairwise production of monodisperse droplets by microfluidic step emulsification" Apl Phys Lett 93(25):254101-1-254101-3 (2008).
Chou, H-P. et al. "Disposable Microdevices for DNA Analysis and Cell Sorting" Proc. Solid-State Sensor and Actuator Workshop Hilton Head, SC Jun. 8-11, 1998, pp. 11-14.
Dangla et al. "The physical mechanisms of step emulsification" J Phys D Appl Phys 46(11):114003 (2013) (8 pages).
Dangla, et al. Droplet microfluidics driven by gradients of confinement. PNAS. Jan. 15, 2013; 110(3): 853-858. Published online Jan. 2, 2013. doi:10.1073/pnas.1209186110.
De Mello et al. "Chip technology for micro-separation" Microsys Tech: Biomethods vol. 10 Kohler, J.M., Mejevaia T., Saluz H.P. 129-177 (1999) (49 pages).
Demirci, et al. "Single cell epitaxy by acoustic picolitre droplets" Lab Chip. Sep. 2007;7(9):1139-45. Epub Jul. 10, 2007.
Doerr, "The smallest bioreactor", Nature Methods, 2:5 326 (2005).
Draper, M.C. et al., "Compartmentalization of electrophoretically separated analytes in a multiphase microfluidic platform" Anal. Chem. (2012) 84:5801-5808.
Eggersdorfer et al. "Supplementary Information: Tandem emulsification for high-throughput production of double emulsions" Lab Chip 17(5):936-942 (2017) (2 pages).
Eggersdorfer et al. "Tandem emulsification for high-throughput production of double emulsions" Lab Chip 17(5):936-942 (2017).
Field et al., "Cross-Linked Fluoropolymer Coatings," Ind Eng Chem Prod Res Dev. 14(1):52-54 (Mar. 1975).
Fredrickson, C.K. et al., "Macro-to-micro interfaces for microfluidic devices" Lab Chip (2004) 4:526-533.
Friesen et al., "Outstanding telechelic perfluoropolyalkylethers and applications therefrom." Progress in Polymer Science, 81:238-280 (Feb. 5, 2018) (43 pages).
Galambos et al. "Precision alignment packaging for microsystems with multiple fluid connections" Proceedings of 2001 ASME: International Mechanical Engineering Conference and Exposition, Nov. 11-16, New York, NY. pp. 1-8 (2001).
Garstecki, P. et al. "Formation of monodisperse bubbles in a microfluidic flow-focusing device" Appl. Phys. Lett (2004) 85(13):2659-2651. DOI: 10.1063/1.1796526.
Guldiken et al.; Sheathless size-based acoustic particle separation; Sensors; 2012; 12; 905-922.
Hati et al. "Production of mondisperse drops from viscous fluids" LabChip DOI:10.1039/c7lc01322a (2018) (7 pages).
HE "Selective Encapsulation of Single Cells and Subcellular Organelles into Picoliter- and Femtoliter—Volume Droplets" Anal. Chern 77: 1539-1544 (2005).
Huang et al. "Coating of poly(dimethylsiloxane) with n-dodecyl-Beta-Da-maltoside to minimize nonspecific protein adsorption" Lab Chip 5(10):1005-1007 (2005).
Huang et al. "Collective generation of milliemulsions by step-emulsification" RSC Adv 7(24):14932-14938 (2017).
Hwang et al. "Surface modification of cycle olefin copolymer substrate by oxygen plasma treatment" Surf Coat Tech 202(15):3669-3674 (2008).
Kahkeshani et al. "Drop formation using ferrofluids driven magnetically in step emulsification device" Lab Chip 16(13):2474-2480 (2016).

(56) References Cited

OTHER PUBLICATIONS

Kawai et al. "Mass-production system of nearly monodisperse diameter gel particles using droplets formation in a microchannel" Micro Total Analysis Systems 2002, vol. 1, Bab Y., Shoji S., van den Berg A., 368-370 (2002).

Kobayashi et al. "Preparation characteristics in oil-in-water emulsions using differently charged surfactants in straight-through microchannel emulsification" Colloids Surf A Physicochem Eng Asp 229(1-3):33-41 (2003).

Kobayashi, et al. Effect of slot aspect ratio on droplet formation from silicon straight-through microchannels. J Colloid Interface Sci. , 279(1):277-80 (2004).

Li, et al. Step-emulsification in a microfluidic device. Lab Chip. Feb. 21, 2015;15(4):1023-31. doi:10.1039/c4lc01289e.

Luo, T. et al. "Microfluidic Single-Cell Manipulation and Analysis: Methods and Applications" Micromachines (2019) 10:104 (31 pages).

Maan et al. "Microfluidic emulsification in food processing" J Food Eng 147:1-7 (2015).

Mittal et al. "Dynamics of step-emulsification: From a single to a collection of emulsion droplet generators" Phys Fluids 26:082109-1082109-14 (2014).

Sahin, et al. Microfluidic Edge emulsification: the importance of interface interactions on droplet formation and pressure stability. Sci Rep. May 27, 2016;6:26407. doi:10.1038/srep26407.

Sanchez Barea, J. et al. "Recent Advances in Droplet-based Microfluidic Technologies for Biochemistry and Molecular Biology" Micromachines (2019) 10:412 (25 pages).

Schuler et al. "Digital droplet PCR on disk" Lab Chip 16(1):208-216 (2016).

Shaikh, et al. A modular microfluidic architecture for integrated biochemical analysis. Proc Natl Acad Sci U S A. Jul. 12, 2005;102(28):9745-50. Epub Jun. 28, 2005.

Shim et al. "Supporting information: Control and measurement of the phase behavior of aqueous solutions using microfluidics" S1-S13 (2007) (13 pages).

Stolovicki et al. "Throughput enhancement of parallel step emulsifier devices by shear-free and efficient nozzle clearance" Lab Chip DOI:10.1039/c7lc01037k (2017) (7 pages).

Su, et al., Microfluidics-Based Biochips: Technology Issues, Implementation Platforms, and Design-Automation Challenges. IEEE Transactions on Computer-Aided Design of Integrated Circuits and Systems. 2006;25(2):211-23. (Feb. 2006).

Subramanian et al., "Surface modification of droplet polymeric microfluidic devices for the stable and continuous generation of aqueous droplets," available in PMC Sep. 16, 2012, published in final edited form as: Langmuir. 27(12):7949-57 (Jun. 2011) (22 pages).

Van Dijke et al. "Edge emulsification for food grade dispersions" J Food Eng 97(3):348-354 (2010).

Van Dijke et al. "Microchannel Emulsification: From Computational Fluid Dynamics to Predictive Analytical Model" Langmuir 24(18):10107-10115 (2008).

Van Dijke et al. "Parallelized edge-based droplet generation (EDGE) devices" Lab Chip 9(19):2824-2830 (2009).

Van Dijke et al. "Simultaneous Formation of Many Droplets in a Single Microfluidic Droplet Formation Unit" AIChE J 56(3):833-836 (2010).

Van Dijke et al. "The mechanism of droplet formation in microfluidic Edge systems" Soft Matter 6(2):321-330 (2010).

Van Dijke, et al. Effect of viscosities of dispersed and continuous phases in microchannel oil-in water emulsification. Microfluid Nanofluid (2010) 9: 77. https://doi.org/10.1007/s10404-009-0521-7.

Vitale et al. "Direct photolithography of perfluoropolyethers for solvent-resistant microfluidics." *Langmuir: the ACS journal of surfaces and colloids* vol. 29(50):15711-18 (Nov. 2013) (8 pages).

Xia and Whitesides, Soft Lithography, Angew. Chem. Int. Ed. 37:550-575 (1998).

Zeng, Y. et al. "High-Performance Single Cell Genetic Analysis Using Microfluidic Emulsion Generator Arrays" Analytical Chemistry (Apr. 15, 2010) 82(8):3183-3190.

U.S. Appl. No. 18/822,969, Mukherjee et al.

\* cited by examiner

DROPLET FORMING DEVICES AND METHODS HAVING FLUOROUS DIOL ADDITIVES

CROSS-REFERENCE TO RELATED APPLICATIONS

This application is a continuation of international application no. PCT/US2023/030441, filed Aug. 17, 2023, which claims priority to U.S. application No. 63/371,787, filed Aug. 18, 2022, each of which is hereby incorporated by reference.

BACKGROUND OF THE INVENTION

Many biomedical applications rely on high-throughput assays of samples combined with one or more reagents in droplets or particles. For example, in both research and clinical applications, high-throughput genetic tests using target-specific reagents are able to provide information about samples in drug discovery, biomarker discovery, and clinical diagnostics, among others. Many of these applications rely on the capability to produce uniform samples. However, precise sample preparation can be complicated by a plurality of intermolecular interactions leading to ballooning and/or wetting. Improved devices and methods for producing droplets would be beneficial.

SUMMARY OF THE INVENTION

In one aspect, the invention provides a crosslinked fluorocarbon surface coating kit including a fluorocarbon silane and a fluorocarbon polyol. The fluorocarbon silane has the structure of Formula I:

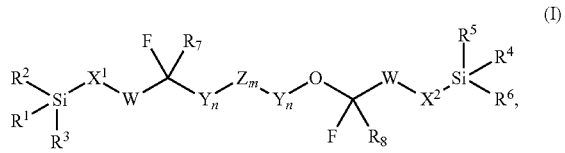

(I)

wherein each Y is independently $C_1$-$C_7$ fluoroalkylene or $C_1$-$C_7$ heterofluoroalkylene, each n is independently 0, 1, 2, 3, 4, 5, 6, or 7, each Z is independently —$OR^9$— or —$R^9$—, wherein $R^9$ is $C_1$-$C_6$ perfluoroalkylene, m is 1, 2, 3, 4, 5, or 6, each W is independently —C(O)$NR_a$—, —$NR_a$C(O)—, —C(O)O—, —OC(O)—, —C(O)S—, —SC(O)—, or —O—, wherein $R_a$ is —H, $C_1$-$C_6$ perfluoroalkyl, or —F, $X^1$ is —[(CH$_2$)$_j$Q]$_s$—(CH$_2$)$_j$— or optionally substituted $C_1$-$C_6$ alkylene and $X^2$ is —(CH$_2$)$_j$-[Q(CH$_2$)$_j$]$_s$— or optionally substituted $C_1$-$C_6$ alkylene, wherein Q is —O—, —S—, —$NR_b$—, —$NR_b$C(O)—, —C(O)$NR_b$—, —C(O)O—, —C(O)S—, or —SC(O)—, $R_b$ is —H or $C_1$-$C_6$ alkyl, each j is independently 1, 2, 3, 4, 5, or 6, and each s is independently 1, 2, 3, 4, 5, or 6, each of $R^1$, $R^2$, $R^3$, $R^4$, $R^5$, and $R^6$ is independently optionally substituted $C_1$-$C_6$ alkoxy, $C_1$-$C_6$ alkyl, or halo, wherein at least one of $R^1$, $R^2$, or $R^3$ and one of $R^4$, $R^5$, or $R^6$ is $C_1$-$C_6$ alkoxy, and each of $R^7$ and $R^8$ is independently F or $C_1$-$C_6$ perfluoroalkyl. In some embodiments, m is 1-5, such as 3. In certain embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7, or 7+6).

In some embodiments, Y is —O($CR^{10}_2$)$_p$—, and p is 1, 2, 3, 4, 5, or 6, and each $R^{10}$ is independently F or $C_1$-$C_6$ perfluoroalkyl. In some embodiments, at least one $R^{10}$ is $C_1$-$C_6$ perfluoroalkyl. In some embodiments, Y is —OCF$_2$—CF($R^{11}$)—, and $R^{11}$ is $C_1$-$C_5$ perfluoroalkyl. In some embodiments, $R^{11}$ is CF$_3$. In some embodiments, $Y_n$ is $C_1$-$C_7$ heterofluoroalkylene, e.g., —(OCF$_2$—CF$_2$)$_n$—, —(OCF$_2$)$_n$—, —(OCF(CF$_3$)—CF$_2$)$_n$—,

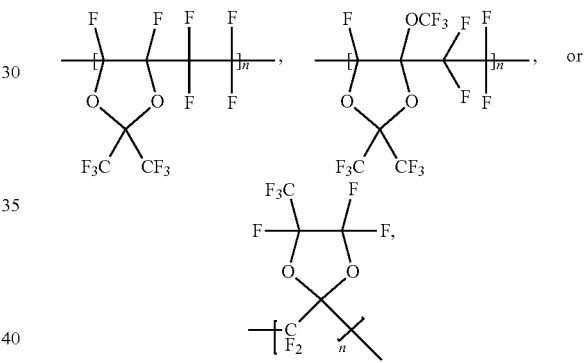

and n is 0, 1, 2, 3, 4, 5, 6, or 7.

In some embodiments, Z is —OCF$_2$—CF$_2$—CF$_2$—CF$_2$— or —OCF$_2$—CF$_2$—CF$_2$—CF$_2$—CF$_2$—. In some embodiments, each of $R^1$, $R^2$, $R^3$, $R^4$, $R^5$, and $R^6$ is methoxy. In some embodiments, each of $R^1$, $R^2$, $R^3$, $R^4$, $R^5$, and $R^6$ is chloro.

In some embodiments, the fluorocarbon silane has the structure of Formula II:

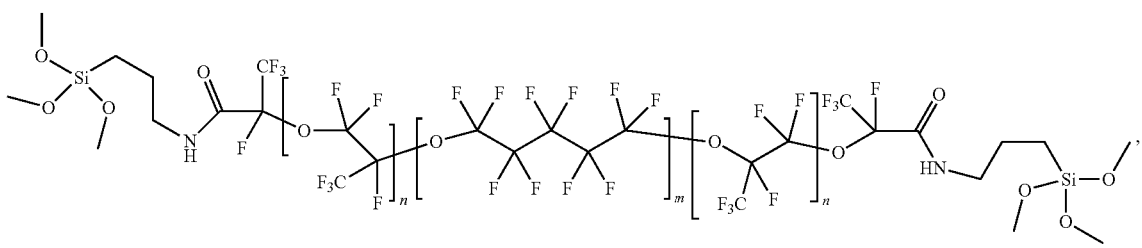

(II)

and each n is independently 0, 1, 2, 3, 4, 5, 6, or 7, and m is 1, 2, 3, 4, 5, or 6. In some embodiments, m is 1-5, such as 3. In some embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7 or 7+6).

In some embodiments, the fluorocarbon polyol is a diol. In some embodiments, the fluorocarbon polyol is a compound of formula V:

in which V is —$(CZ_2)_{n'}$—$C_{1\text{-}15}$ perfluoroalkylene-$(CZ_2)_{n'}$— or —$(CZ_2)_{n'}$—$(C_{1\text{-}15}$ heterofluoroalkylene)$_{n'}$-$(CZ_2)_{n'}$—, wherein each Z is independently H, F, or $C_{1\text{-}6}$ perfluoroalkyl and each n' is independently 1, 2, 3, 4, 5, 6 or 7. In some embodiments, V is —$(CZ_2)_{n'}$—$C_{1\text{-}15}$ perfluoroalkylene-$(CZ_2)_{n'}$, e.g., —$CH_2$—$(CF_2)_k$—$CH_2$— or —$(C(CF_3)_2)_k$—, in which k is 1-15 (e.g., 1, 2, 3, 4, 5, 6, 7, 8, 9, 10, 11, 12, 13, 14, or 15). In some embodiments, V is —$(CZ_2)_{n'}$—$(C_{1\text{-}15}$ heterofluoroalkylene)$_{n'}$-$(CZ_2)_{n'}$—, e.g., —$C(CF_3)_2$(OCF_3)$—$C(CF_3)_2$—, —$CH_2(OCF_2)_k$—$(OCF_2CF_2)_k$—$CH_2$—, or —$CH_2$—$CH_2(OCF_2)_{k'}$—$(OCF_2CF_2)_{k'}$—$CH_2$—$CH_2$—, wherein k'+k' 1-30. In some embodiments, V has the structure of Formula VI:

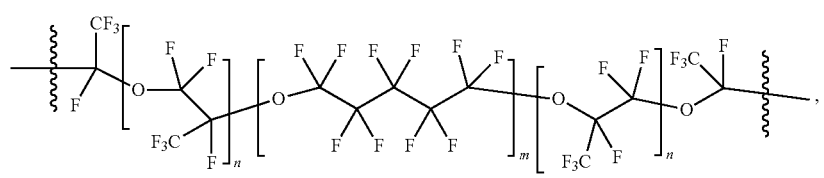

wherein each n is independently 0, 1, 2, 3, 4, 5, 6, or 7, and m is 1, 2, 3, 4, 5, or 6. In some embodiments, V has the structure X—$(CF_2CF_2O)_n(CF_2O)_m(CF_2CF(CF_3)O)_k$—Y, in which X and Y are independently $C_{1\text{-}6}$ alkyl or $C_{1\text{-}6}$ perfluoroalkyl and m, n, and k are independently 0 to 6 (e.g., 1 to 6), provided that at least one of m, n, and k is greater than 0.

In another aspect, the invention provides a device for producing droplets of a first liquid in a second liquid, The device includes a first channel having a first depth, a first width, a first proximal end, a first distal end; and a droplet source region in fluid communication with the first distal end configured to produce droplets of the first liquid in the second liquid. The droplet source region has a crosslinked fluorocarbon surface coating.

In some embodiments, the fluorocarbon silane includes a fluorocarbon alkoxysilane or a fluorocarbon halosilane (e.g., fluorocarbon chlorosilane). In some embodiments, an alcohol of the fluorocarbon polyol reacts with the alkoxy or chloro of any of $R^1$, $R^2$, $R^3$, $R^4$, $R^5$, or $R^6$, and forms the crosslinked fluorocarbon surface coating. In some embodiments the fluorocarbon silane has the structure of Formula I. In some embodiments, the fluorocarbon silane has a structure of Formula II. In some embodiments, the fluorocarbon silane has the structure of Formula III. In some embodiments, the fluorocarbon silane has the structure of Formula IV. In some embodiments, the fluorocarbon polyol has the structure of Formula V.

In some embodiments, the device has a second channel having a second depth, a second width, a second proximal end, and a second distal end that intersects the first channel between the first proximal and first distal ends. In some embodiments, the second channel includes the crosslinked fluorocarbon surface coating. In some embodiments, the device includes a second reservoir in fluid communication with the second proximal end.

In some embodiments, the droplet source region includes a shelf region having a second depth and a second width, wherein the second width is greater than the first width, and wherein the first distal end is in fluid communication with the shelf region. In some embodiments, the droplet source region includes a collection reservoir configured to collect the droplets and includes at least one wall that forms a step region fluidically connected to the shelf region.

In some embodiments, the shelf region includes the crosslinked fluorocarbon surface coating.

The invention also provides a method for producing droplets including providing a device described herein and flowing a first liquid from the first proximal end to the droplet source region to produce droplets of the first liquid in a second liquid.

In some embodiments, the first liquid is aqueous or miscible with water.

In some embodiments, the device further includes a second channel having a second depth, a second width, a second proximal end, and a second distal end that intersects the first channel between the first proximal and first distal ends. The second channel includes a third liquid that combines with the first liquid at the intersection such that the droplets include the first and third liquids. In some embodiments, the first liquid includes supports, the third liquid includes particles, and the droplets include a support from the first liquid and a particle from the third liquid.

In some embodiments, the method includes producing droplets at a generation frequency of 130 Hz-150 Hz.

Definitions

To facilitate the understanding of this invention, a number of terms are defined below. Terms defined herein have meanings as commonly understood by a person of ordinary skill in the areas relevant to the invention. Terms such as "a", "an," and "the" are not intended to refer to only a singular entity, but include the general class of which a specific example may be used for illustration. The terminology herein is used to describe specific embodiments of the invention, but their usage does not limit the invention, except as outlined in the claims.

As used herein, the term "about" refers to ±10% of a recited value.

The terms "adaptor(s)," "adapter(s)," and "tag(s)" may be used synonymously. An adaptor or tag can be coupled to a polynucleotide sequence to be "tagged" by any approach including ligation, hybridization, or other approaches.

The term "alkoxy," as used herein, refers to a —O— alkyl group, wherein the alkoxy group is attached to the remainder of the compound through an oxygen atom.

The term "alkyl," as used herein, refers to a saturated, straight or branched monovalent hydrocarbon group containing from 1 to 6 (e.g., from 1 to 3 or from 1 to 5) carbons. In some embodiments, an alkyl group is unbranched (i.e., is linear); in some embodiments, an alkyl group is branched. Alkyl groups are exemplified by, but not limited to, methyl, ethyl, n- and iso-propyl, n-, sec-, iso- and tert-butyl, and neopentyl.

The term "alkylene," as used herein, refers to a saturated, straight or branched divalent hydrocarbon group containing from 1 to 15 (e.g., from 1 to 3 or from 1 to 13) carbons. In some embodiments, an alkylene group is unbranched (i.e., is linear); in some embodiments, an alkylene group is branched. Alkylene groups are exemplified by, but not limited to, methylene, ethylene, n- and iso-propylene, n-, sec-, iso- and tert-butylene, and neopentylene.

The term "barcode," as used herein, generally refers to a label, or identifier, that conveys or is capable of conveying information about an analyte. A barcode can be part of an analyte. A barcode can be a tag attached to an analyte (e.g., nucleic acid molecule) or a combination of the tag in addition to an endogenous characteristic of the analyte (e.g., size of the analyte or end sequence(s)). A barcode may be unique. Barcodes can have a variety of different formats. For example, barcodes can include: polynucleotide barcodes; random nucleic acid and/or amino acid sequences; and synthetic nucleic acid and/or amino acid sequences. A barcode can be attached to an analyte in a reversible or irreversible manner. A barcode can be added to, for example, a fragment of a deoxyribonucleic acid (DNA) or ribonucleic acid (RNA) sample before, during, and/or after sequencing of the sample. Barcodes can allow for identification and/or quantification of individual sequencing-reads in real time.

The term "biological particle," as used herein, generally refers to a discrete biological system derived from a biological sample. The biological particle may be a virus. The biological particle may be a cell or derivative of a cell. The biological particle may be an organelle from a cell. Examples of an organelle from a cell include, without limitation, a nucleus, endoplasmic reticulum, a ribosome, a Golgi apparatus, an endoplasmic reticulum, a chloroplast, an endocytic vesicle, an exocytic vesicle, a vacuole, and a lysosome. The biological particle may be a rare cell from a population of cells. The biological particle may be any type of cell, including without limitation prokaryotic cells, eukaryotic cells, bacterial, fungal, plant, mammalian, or other animal cell type, mycoplasmas, normal tissue cells, tumor cells, or any other cell type, whether derived from single cell or multicellular organisms. The biological particle may be a constituent of a cell. The biological particle may be or may include DNA, RNA, organelles, proteins, or any combination thereof. The biological particle may be or may include a matrix (e.g., a gel or polymer matrix) comprising a cell or one or more constituents from a cell (e.g., cell bead), such as DNA, RNA, organelles, proteins, or any combination thereof, from the cell. The biological particle may be obtained from a tissue of a subject. The biological particle may be a hardened cell. Such hardened cell may or may not include a cell wall or cell membrane. The biological particle may include one or more constituents of a cell but may not include other constituents of the cell. An example of such constituents is a nucleus or another organelle of a cell. A cell may be a live cell. The live cell may be capable of being cultured, for example, being cultured when enclosed in a gel or polymer matrix or cultured when comprising a gel or polymer matrix.

The term "fluidically connected," as used herein, refers to a direct connection between at least two device elements, e.g., a channel, reservoir, etc., that allows for fluid to move between such device elements without passing through an intervening element.

The term "fluoroalkylene" as used herein, refers to a divalent, saturated, straight or branched alkylene group containing from 1 to 15 (e.g., from 1 to 3 or from 1 to 13) carbons in which at least one hydrogen atom has been replaced by fluorine. In some embodiments, a fluoroalkylene group is unbranched (i.e., is linear); in some embodiments, a fluoroalkylene group is branched.

The term "fluorocarbon," as used herein, refers to a hydrocarbon that has at least one hydrogen replaced with a fluorine. In some embodiments, the fluorocarbon includes —$CH_2F$, $CHF_2$, or $CF_3$.

The term "genome," as used herein, generally refers to genomic information from a subject, which may be, for example, at least a portion or an entirety of a subject's hereditary information. A genome can be encoded either in DNA or in RNA. A genome can comprise coding regions that code for proteins as well as non-coding regions. A genome can include the sequence of all chromosomes together in an organism. For example, the human genome has a total of 46 chromosomes. The sequence of all of these together may constitute a human genome.

The term "heterofluoroalkylene" as used herein, refers to a divalent, saturated, straight or branched alkylene group containing from 1 to 15 (e.g., from 1 to 3 or from 1 to 13) carbons and 1 to 15 heteroatoms in which at least one hydrogen atom has been replaced by fluorine. In some embodiments, heteroatoms are independently selected from the group consisting of nitrogen, oxygen, and sulfur. In some embodiments, a heterofluoroalkylene group is unbranched (i.e., is linear); in some embodiments, a heterofluoroalkylene group is branched. In some embodiments, a heterofluoroalkylene group has 1 to 15 carbons in which every hydrogen atom has been replaced by fluorine.

The term "in fluid communication with", as used herein, refers to a connection between at least two device elements, e.g., a channel, reservoir, etc., that allows for fluid to move between such device elements with or without passing through one or more intervening device elements.

The term "macromolecular constituent," as used herein, generally refers to a macromolecule contained within or from a biological particle. The macromolecular constituent may comprise a nucleic acid. In some cases, the biological particle may be a macromolecule. The macromolecular constituent may comprise DNA or a DNA molecule. The macromolecular constituent may comprise RNA or an RNA molecule. The RNA may be coding or non-coding. The RNA may be messenger RNA (mRNA), ribosomal RNA (rRNA) or transfer RNA (tRNA), for example. The RNA may be a transcript. The RNA molecule may be (i) a clustered regularly interspaced short palindromic (CRISPR) RNA molecule (crRNA) or (ii) a single guide RNA (sgRNA) molecule. The RNA may be small RNA that are less than 200 nucleic acid bases in length, or large RNA that are greater than 200 nucleic acid bases in length. Small RNAs may include 5.8S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA. The macromolecular constituent may comprise a protein. The macromolecular constituent may comprise a peptide. The macromolecular constituent may comprise a polypeptide or a protein. The polypeptide or protein may be an extracellular or an intracellular polypeptide or protein. The macromolecular constituent may also comprise a metabolite. These and other suitable macromolecular constituents (also referred to as analytes) will be appreciated by those skilled in the art (see U.S. Pat. Nos. 10,011,872 and 10,323,278, and WO/2019/157529 each of which is incorporated herein by reference in its entirety).

The term "molecular tag," as used herein, generally refers to a molecule capable of binding to a macromolecular constituent. The molecular tag may bind to the macromolecular constituent with high affinity. The molecular tag may bind to the macromolecular constituent with high specificity. The molecular tag may comprise a nucleotide sequence. The molecular tag may comprise an oligonucleotide or polypeptide sequence. The molecular tag may comprise a DNA aptamer. The molecular tag may be or comprise a primer. The molecular tag may be or comprise a protein. The molecular tag may comprise a polypeptide. The molecular tag may be a barcode.

The term "oil," as used herein, generally refers to a liquid that is not miscible with water. An oil may have a density higher or lower than water and/or a viscosity higher or lower than water.

At various places in the present specification, substituents of compounds of the present disclosure are disclosed in groups or in ranges. It is specifically intended that the present disclosure include each and every individual subcombination of the members of such groups and ranges. For example, the term "$C_1$-$C_{12}$ alkyl" is specifically intended to individually disclose methyl, ethyl, $C_3$ alkyl, $C_4$ alkyl, $C_5$ alkyl, and $C_{12}$ alkyl. Furthermore, where a compound includes a plurality of positions at which substituents are disclosed in groups or in ranges, unless otherwise indicated, the present disclosure is intended to cover individual compounds and groups of compounds (e.g., genera and subgenera) containing each and every individual subcombination of members at each position.

The term "optionally substituted X" (e.g., "optionally substituted alkylene") is intended to be equivalent to "X, wherein X is optionally substituted" (e.g., "alkylene, wherein said alkyl is optionally substituted"). It is not intended to mean that the feature "X" (e.g., alkylene) per se is optional. As described herein, certain compounds of interest may contain one or more "optionally substituted" moieties. In general, the term "substituted", whether preceded by the term "optionally" or not, means that one or more hydrogens of the designated moiety are replaced with a suitable substituent, e.g., any of the substituents or groups described herein. For example, and without limitation, suitable substituents include halo (e.g., fluoro). Unless otherwise indicated, an "optionally substituted" group may have a suitable substituent at each substitutable position of the group, and when more than one position in any given structure may be substituted with more than one substituent selected from a specified group, the substituent may be either the same or different at every position. For example, in the term "optionally substituted $C_1$-$C_{12}$ alkyl," any of the hydrogens bonded to $C_1$-$C_{12}$ may be replaced with a substituent. Combinations of substituents envisioned by the present disclosure are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

The term "particulate component of a cell" refers to a discrete biological system derived from a cell or fragment thereof and having at least one dimension of 0.1 µm (e.g., at least 0.1 µm, at least 1 µm, at least 10 µm, or at least 100 µm). A particulate component of a cell may be, for example, an organelle, such as a nucleus, endoplasmic reticulum, a ribosome, a Golgi apparatus, an endoplasmic reticulum, a chloroplast, an endocytic vesicle, an exocytic vesicle, a vacuole, a lysosome, or a mitochondrion.

The term "perfluoroalkyl" as used herein, refers to a monovalent, saturated, straight or branched monovalent alkyl group containing from 1 to 12 (e.g., from 1 to 3 or from 1 to 5) carbons in which every hydrogen atom has been replaced by fluorine. In some embodiments, a perfluoroalkyl group is unbranched (i.e., is linear); in some embodiments, a perfluoroalkyl group is branched.

The term "perfluoroalkylene" as used herein, refers to a divalent, saturated, straight or branched divalent alkylene group containing from 1 to 12 (e.g., from 1 to 3 or from 1 to 5) carbons in which every hydrogen atom has been replaced by fluorine. In some embodiments, a perfluoroalkylene group is unbranched (i.e., is linear); in some embodiments, a perfluoroalkylene group is branched.

The term "sample," as used herein, generally refers to a biological sample of a subject. The biological sample may be a nucleic acid sample or protein sample. The biological sample may be derived from another sample. The sample may be a tissue sample, such as a biopsy, core biopsy, needle aspirate, or fine needle aspirate. The sample may be a liquid sample, such as a blood sample, urine sample, or saliva sample. The sample may be a skin sample. The sample may be a cheek swap. The sample may be a plasma or serum sample. The sample may include a biological particle, e.g., a cell or virus, or a population thereof, or it may alternatively be free of biological particles. A cell-free sample may include polynucleotides. Polynucleotides may be isolated from a bodily sample that may be selected from the group consisting of blood, plasma, serum, urine, saliva, mucosal excretions, sputum, stool and tears.

The term "sequencing," as used herein, generally refers to methods and technologies for determining the sequence of nucleotide bases in one or more polynucleotides. The polynucleotides can be, for example, nucleic acid molecules such as deoxyribonucleic acid (DNA) or ribonucleic acid (RNA), including variants or derivatives thereof (e.g., single stranded DNA). Sequencing can be performed by various systems currently available, such as, without limitation, a sequencing system by ILLUMINA®, Pacific Biosciences (PACBIO®), Oxford NANOPORE®, or Life Technologies (ION TORRENT®). Alternatively or in addition, sequencing may be performed using nucleic acid amplification, polymerase chain reaction (PCR) (e.g., digital PCR, quantitative PCR, or real time PCR), or isothermal amplification. Such systems may provide a plurality of raw genetic data corresponding to the genetic information of a subject (e.g., human), as generated by the systems from a sample provided by the subject. In some examples, such systems provide sequencing reads (also "reads" herein). A read may include a string of nucleic acid bases corresponding to a sequence of a nucleic acid molecule that has been sequenced. In some situations, systems and methods provided herein may be used with proteomic information.

The term "subject," as used herein, generally refers to an animal, such as a mammal (e.g., human) or avian (e.g., bird), or other organism, such as a plant. The subject can be a vertebrate, a mammal, a mouse, a primate, a simian, or a human. Animals may include, but are not limited to, farm animals, sport animals, and pets. A subject can be a healthy or asymptomatic individual, an individual that has or is suspected of having a disease (e.g., cancer) or a predisposition to the disease, or an individual that is in need of therapy or suspected of needing therapy. A subject can be a patient.

The term "substantially stationary," as used herein with respect to droplet formation, generally refers to a state when motion of formed droplets in the continuous phase is passive, e.g., resulting from the difference in density between the dispersed phase and the continuous phase.

The term "support," as used herein, generally refers to a particle that is not a biological particle. The particle may be a solid or semi-solid particle. The particle may be a bead, such as a gel bead. The gel bead may include a polymer matrix (e.g., matrix formed by polymerization or crosslinking). The polymer matrix may include one or more polymers (e.g., polymers having different functional groups or repeat units). Polymers in the polymer matrix may be randomly arranged, such as in random copolymers, and/or have ordered structures, such as in block copolymers. Crosslinking can be via covalent, ionic, or inductive, interactions, or physical entanglement. The bead may be a macromolecule. The bead may be formed of nucleic acid molecules bound together. The bead may be formed via covalent or non-covalent assembly of molecules (e.g., macromolecules), such as monomers or polymers. Such polymers or monomers may be natural or synthetic. Such polymers or monomers may be or include, for example, nucleic acid molecules (e.g., DNA or RNA). The bead may be formed of a polymeric material. The bead may be magnetic or non-magnetic. The bead may be rigid. The bead may be flexible and/or compressible. The bead may be disruptable or dissolvable. The bead may be a solid particle (e.g., a metal-based particle including but not limited to iron oxide, gold, or silver) covered with a coating comprising one or more polymers. Such coating may be disruptable or dissolvable.

As used herein, any values provided in a range of values include both the upper and lower bounds, and all possible sub-ranges within such ranges, as well as specific numerical values that fall within such ranges irrespective of whether a specific numerical value or specific sub-range is expressly stated.

DETAILED DESCRIPTION OF THE INVENTION

Figure 1:
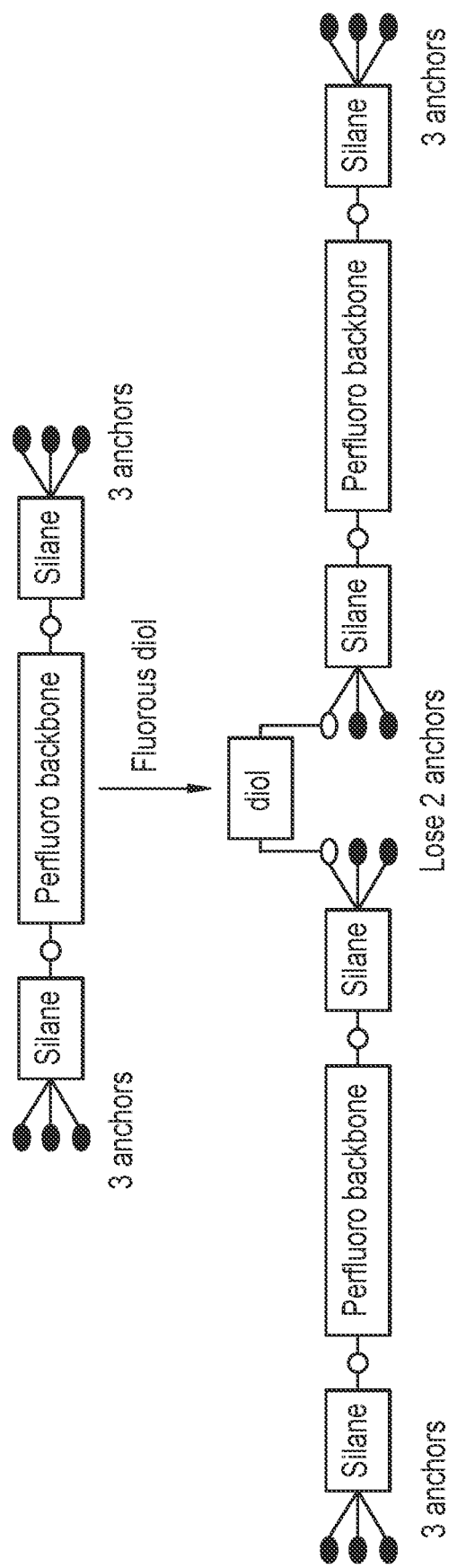
FIG. 1 is a process diagram illustrating an exemplary embodiment of synthesizing a crosslinked fluorocarbon surface agent.

The invention provides a crosslinked fluorocarbon surface coating, kits therefor, microfluidic devices having crosslinked fluoropolymer surface coatings, and methods of use thereof. The devices include a first channel having a first depth, a first width, a first proximal end, a first distal end. The devices may include a droplet source region in fluid communication with the first distal end configured to produce droplets of a first liquid in a second liquid. The droplet source region may include a crosslinked fluorocarbon surface coating, which is produced by the reaction of a fluorocarbon silane and a fluorocarbon polyol.

The crosslinked fluorocarbon surface coatings, kits, devices, and methods described herein provide various advantages. In particular, the surface coatings, devices, and methods described herein decrease variability among each droplet formed, produce smaller droplet sizes, and/or generate droplets with reduced incidence of droplet generation failure. Additionally, the surface coating compounds, devices, and methods provide enhanced time periods for droplet generation due to the increase robustness of the unique surface coating compounds. Coated surfaces are also advantageously stable for a period of months.

Fluorocarbon Silane

A fluorocarbon silane of the invention may have the structure of Formula I:

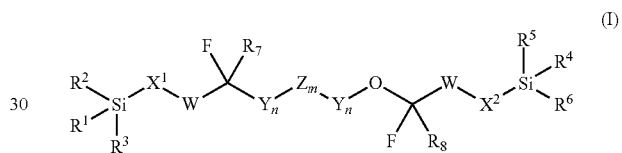

(I)

in which, each Y is independently $C_1$-$C_7$ fluoroalkylene or $C_1$-$C_7$ heterofluoroalkylene, each n is independently 0, 1, 2, 3, 4, 5, 6, or 7, each Z is independently —$OR^9$— or —$R^9$—, wherein $R^9$ is $C_1$-$C_6$ perfluoroalkylene, m is 1, 2, 3, 4, 5, or 6, each W is independently —C(O)$NR_a$—, —$NR_aC(O)$—, —C(O)O—, —OC(O)—, —C(O)S—, —SC(O)—, or —O—, wherein $R_a$ is —H, $C_1$-$C_6$ perfluoroalkyl, or —F, $X^1$ is —[(CH$_2$)$_j$Q]$_s$—(CH$_2$)$_j$— or optionally substituted $C_1$-$C_6$ alkylene and $X^2$ is —(CH$_2$)$_j$-[Q(CH$_2$)$_j$]$_s$— or optionally substituted $C_1$-$C_6$ alkylene, wherein Q is —O—, —S—, —$NR_b$—, —$NR_bC(O)$—, —C(O)$NR_b$—, —C(O)O—, —C(O)S—, or —SC(O)—, $R_b$ is —H or $C_1$-$C_6$ alkyl, each j is independently 1, 2, 3, 4, 5, or 6, and each s is independently 1, 2, 3, 4, 5, or 6, each of $R^1$, $R^2$, $R^3$, $R^4$, $R^5$, and $R^6$ is independently optionally substituted $C_1$-$C_6$ alkoxy, $C_1$-$C_6$ alkyl, or halo, wherein at least one of $R^1$, $R^2$, or $R^3$ and one of $R^4$, $R^5$, or $R^6$ is $C_1$-$C_6$ alkoxy, and each of $R^7$ and $R^8$ is independently F or $C_1$-$C_6$ perfluoroalkyl. In some embodiments, m is 1-5, such as 3. In certain embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7, or 7+6). In some embodiments, the compound having the structure of Formula I, when crosslinked and bound to a surface, may include a total fluorine weight percent of at least 57%. For example, and without limitation, the compound having the structure of Formula I, when crosslinked and bound to a surface, may include a total fluorine weight percent of about 50-70%. As a further non-limiting example, the compound having the structure of Formula I, when crosslinked and bound to a surface, may include a total fluorine weight percent of about 63%. It will be understood that the halo or alkyl portion of alkoxy groups in $R^1$-$R^6$ will be cleaved when the compound binds to a hydroxylated surface or the polyol. In some embodiments, Y is —OCF($CF_3$)—$CF_2$, —OCF($CF_3$)—$CF_2$—$CF_2$, —OCF($CF_3$)—$CF_2$—$CF_2$—$CF_2$, —OCF($CF_3$)—$CF_2$—$CF_2$—$CF_2$—$CF_2$, or —OCF($CF_3$)—$CF_2$—$CF_2$—$CF_2$—$CF_2$—$CF_2$. In some embodiments, Y is —$OCF_2$—CF($CF_3$), —$OCF_2$—$CF_2$—CF($CF_3$), —$OCF_2$—$CF_2$—$CF_2$—CF($CF_3$), —$OCF_2$—$CF_2$—$CF_2$—$CF_2$—CF($CF_3$), or —$OCF_2$—$CF_2$—$CF_2$—$CF_2$—$CF_2$—CF($CF_3$). In some embodiments, Y is —$OCF_2$—CF($C_2F_5$), —$OCF_2$—CF($C_3F_7$), —$OCF_2$—CF($C_4F_9$), or —$OCF_2$—CF($C_5F_{11}$). In some embodiments, Y is —$OCF_2$—$CF_2$—CF($C_2F_5$), —$OCF_2$—$CF_2$—CF($C_3F_7$), or —$OCF_2$—$CF_2$—CF($C_4F_9$). In some embodiments, Y is —$OCF_2$—$CF_2$—$CF_2$—CF($C_2F_5$) or —$OCF_2$—$CF_2$—$CF_2$—CF($C_3F_7$). In some embodiments, Y is —$OCF_2$—$CF_2$—$CF_2$—$CF_2$—CF($C_2F_5$).

In some embodiments, Y is —$OCF_2$—CF($CF_3$)—$CF_2$—$CF_2$, —$OCF_2$—CF($C_2F_5$)—$CF_2$—$CF_2$, or —$OCF_2$—CF($C_3F_7$)—$CF_2$—$CF_2$. In some embodiments, Y is —$OCF_2$—CF($CF_3$)—$CF_2$—$CF_2$—$CF_2$ or —$OCF_2$—CF($C_2F_5$)—$CF_2$—$CF_2$—$CF_2$. In some embodiments, Y is —$OCF_2$—CF($CF_3$)—$CF_2$—$CF_2$—$CF_2$—$CF_2$. In some embodiments, Y is —$OCF_2$—$CF_2$—CF($CF_3$)—$CF_2$, —$OCF_2$—$CF_2$—CF($C_2F_5$)—$CF_2$, or —$OCF_2$—$CF_2$—CF($C_3F_7$)—$CF_2$. In some embodiments, Y is —$OCF_2$—$CF_2$—CF($CF_3$)—$CF_2$—$CF_2$ or —$OCF_2$—$CF_2$—CF($C_2F_5$)—$CF_2$—$CF_2$. In some embodiments, Y is —$OCF_2$—$CF_2$—CF($CF_3$)—$CF_2$—$CF_2$. In some embodiments, Y is —$OCF_2$—$CF_2$—$CF_2$—CF($CF_3$)—$CF_2$ or —$OCF_2$—$CF_2$—$CF_2$—CF($C_2F_5$)—$CF_2$. In some embodiments, Y is —$OCF_2$—$CF_2$—$CF_2$—CF($CF_3$)—$CF_2$—$CF_2$. In some embodiments, Y is —$OCF_2$—$CF_2$—$CF_2$—$CF_2$—CF($CF_3$)—$CF_2$.

In some embodiments, Y is —OCF($CF_3$)—$CF_2$—O, —OCF($CF_3$)—$CF_2$—$CF_2$—O, —OCF($CF_3$)—$CF_2$—$CF_2$—$CF_2$—O, —OCF($CF_3$)—$CF_2$—$CF_2$—$CF_2$—$CF_2$—O, or —OCF($CF_3$)—$CF_2$—$CF_2$—$CF_2$—$CF_2$—$CF_2$—O. In some embodiments, Y is —$OCF_2$—CF($CF_3$)—O, —$OCF_2$—$CF_2$—CF($CF_3$)—O, —$OCF_2$—$CF_2$—$CF_2$—CF($CF_3$)—O, —$OCF_2$—$CF_2$—$CF_2$—$CF_2$—CF($CF_3$)—O, or —$OCF_2$—$CF_2$—$CF_2$—$CF_2$—$CF_2$—CF($CF_3$)—O. In some embodiments, Y is —$OCF_2$—CF($C_2F_5$)—O, —$OCF_2$—CF($C_3F_7$)—O, —$OCF_2$—CF($C_4F_9$)—O, or —$OCF_2$—CF($C_5F_{11}$)—O. In some embodiments, Y is —$OCF_2$—$CF_2$—CF($C_2F_5$)—O, —$OCF_2$—$CF_2$—CF($C_3F_7$)—O, or —$OCF_2$—$CF_2$—CF($C_4F_9$)—O. In some embodiments, Y is —$OCF_2$—$CF_2$—$CF_2$—CF($C_2F_5$)—O or —$OCF_2$—$CF_2$—$CF_2$—CF($C_3F_7$)—O. In some embodiments, Y is —$OCF_2$—$CF_2$—$CF_2$—$CF_2$—CF($C_2F_5$)—O. In some embodiments, Y is —$OCF_2$—CF($CF_3$)—$CF_2$—O, —$OCF_2$—CF($C_2F_5$)—$CF_2$—O, —$OCF_2$—CF($C_3F_7$)—$CF_2$—O, or —$OCF_2$—CF($C_4F_9$)—$CF_2$—O.

In some embodiments, Y is —$OCF_2$—CF($CF_3$)—$CF_2$—$CF_2$—O, —$OCF_2$—CF($C_2F_5$)—$CF_2$—$CF_2$—O, or —$OCF_2$—CF($C_3F_7$)—$CF_2$—$CF_2$—O. In some embodiments, Y is —$OCF_2$—CF($CF_3$)—$CF_2$—$CF_2$—$CF_2$—O or —$OCF_2$—CF($C_2F_5$)—$CF_2$—$CF_2$—$CF_2$—O. In some embodiments, Y is —$OCF_2$—CF($CF_3$)—$CF_2$—$CF_2$—$CF_2$—$CF_2$—O. In some embodiments, Y is —$OCF_2$—$CF_2$—CF($CF_3$)—$CF_2$—O, —$OCF_2$—$CF_2$—CF($C_2F_5$)—$CF_2$—O, or —$OCF_2$—$CF_2$—CF($C_3F_7$)—$CF_2$—O. In some embodiments, Y is —$OCF_2$—$CF_2$—CF($CF_3$)—$CF_2$—$CF_2$—O or —$OCF_2$—$CF_2$—CF($C_2F_5$)—$CF_2$—$CF_2$—O. In some embodiments, Y is —$OCF_2$—$CF_2$—CF($CF_3$)—$CF_2$—$CF_2$—$CF_2$—O. In some embodiments, Y is —$OCF_2$—$CF_2$—$CF_2$—CF($CF_3$)—$CF_2$—O, or —$OCF_2$—$CF_2$—$CF_2$—CF($C_2F_5$)—$CF_2$—O. In some embodiments, Y is —$OCF_2$—$CF_2$—$CF_2$—CF($CF_3$)—$CF_2$—$CF_2$—O. In some embodiments, Y is —$OCF_2$—$CF_2$—$CF_2$—$CF_2$—CF($CF_3$)—$CF_2$—O.

In some embodiments, Y is —SCF($CF_3$)—$CF_2$, —SCF($CF_3$)—$CF_2$—$CF_2$, —SCF($CF_3$)—$CF_2$—$CF_2$—$CF_2$, —SCF($CF_3$)—$CF_2$—$CF_2$—$CF_2$—$CF_2$, or —SCF($CF_3$)—$CF_2$—$CF_2$—$CF_2$—$CF_2$—$CF_2$. In some embodiments, Y is —$SCF_2$—CF($CF_3$), —$SCF_2$—$CF_2$—CF($CF_3$), —$SCF_2$—$CF_2$—$CF_2$—CF($CF_3$), —$SCF_2$—$CF_2$—$CF_2$—$CF_2$—CF($CF_3$), or —$SCF_2$—$CF_2$—$CF_2$—$CF_2$—$CF_2$—CF($CF_3$). In some embodiments, Y is —$SCF_2$—CF($C_2F_5$), —$SCF_2$—CF($C_3F_7$), —$SCF_2$—CF($C_4F_9$), or —$SCF_2$—CF($C_5F_{11}$). In some embodiments, Y is —$SCF_2$—$CF_2$—CF($C_2F_5$), —$SCF_2$—$CF_2$—CF($C_3F_7$), or —$SCF_2$—$CF_2$—CF($C_4F_9$). In some embodiments, Y is —$SCF_2$—$CF_2$—$CF_2$—CF($C_2F_5$) or —$SCF_2$—$CF_2$—$CF_2$—CF($C_3F_7$). In some embodiments, Y is —$SCF_2$—$CF_2$—$CF_2$—$CF_2$—CF($C_2F_5$). In some embodiments, Y is —$SCF_2$—CF($CF_3$)—$CF_2$, —$SCF_2$—CF($C_2F_5$)—$CF_2$, —$SCF_2$—CF($C_3F_7$)—$CF_2$, or —$SCF_2$—CF($C_4F_9$)—$CF_2$.

In some embodiments, Y is —$SCF_2$—CF($CF_3$)—$CF_2$—$CF_2$, —$SCF_2$—CF($C_2F_5$)—$CF_2$—$CF_2$, or —$SCF_2$—CF($C_3F_7$)—$CF_2$—$CF_2$. In some embodiments, Y is —$SCF_2$—CF($CF_3$)—$CF_2$—$CF_2$—$CF_2$ or —$SCF_2$—CF($C_2F_5$)—$CF_2$—$CF_2$—$CF_2$. In some embodiments, Y is —$SCF_2$—CF($CF_3$)—$CF_2$—$CF_2$—$CF_2$—$CF_2$. In some embodiments, Y is —$SCF_2$—$CF_2$—CF($CF_3$)—$CF_2$, —$SCF_2$—$CF_2$—CF($C_2F_5$)—$CF_2$, or —$SCF_2$—$CF_2$—CF($C_3F_7$)—$CF_2$. In some embodiments, Y is —$SCF_2$—$CF_2$—CF($CF_3$)—$CF_2$—$CF_2$, or —$SCF_2$—$CF_2$—CF($C_2F_5$)—$CF_2$—$CF_2$. In some embodiments, Y is —$SCF_2$—$CF_2$—CF($CF_3$)—$CF_2$—$CF_2$. In some embodiments, Y is —$SCF_2$—$CF_2$—$CF_2$—CF($CF_3$)—$CF_2$ or —$SCF_2$—$CF_2$—$CF_2$—CF($C_2F_5$)—$CF_2$. In some embodiments, Y is —$SCF_2$—$CF_2$—$CF_2$—CF($CF_3$)—$CF_2$—$CF_2$. In some embodiments, Y is —$SCF_2$—$CF_2$—$CF_2$—$CF_2$—CF($CF_3$)—$CF_2$.

In some embodiments, Y is —SCF($CF_3$)—$CF_2$—S, —SCF($CF_3$)—$CF_2$—$CF_2$—S, —SCF($CF_3$)—$CF_2$—$CF_2$—$CF_2$—S, —SCF($CF_3$)—$CF_2$—$CF_2$—$CF_2$—$CF_2$—S, or —SCF($CF_3$)—$CF_2$—$CF_2$—$CF_2$—$CF_2$—$CF_2$—S. In some embodiments, Y is —$SCF_2$—CF($CF_3$)—S, —$SCF_2$—$CF_2$—CF($CF_3$)—S, —$SCF_2$—$CF_2$—$CF_2$—CF($CF_3$)—S, —$SCF_2$—$CF_2$—$CF_2$—$CF_2$—CF($CF_3$)—S, or —$SCF_2$—$CF_2$—$CF_2$—$CF_2$—$CF_2$—CF($CF_3$)—S. In some embodiments, Y is —$SCF_2$—CF($C_2F_5$)—S, —$SCF_2$—CF($C_3F_7$)—S, —$SCF_2$—CF($C_4F_9$)—S, or —$SCF_2$—CF($C_5F_{11}$)—S. In some embodiments, Y is —$SCF_2$—$CF_2$—CF($C_2F_5$)—S, —$SCF_2$—$CF_2$—CF($C_3F_7$)—S, or —$SCF_2$—$CF_2$—CF($C_4F_9$)—S. In some embodiments, Y is —$SCF_2$—$CF_2$—$CF_2$—CF($C_2F_5$)—S or —$SCF_2$—$CF_2$—$CF_2$—CF($C_3F_7$)—S. In some embodiments, Y is —$SCF_2$—$CF_2$—$CF_2$—$CF_2$—CF($C_2F_5$)—S. In some embodiments, Y is —$SCF_2$—CF($CF_3$)—$CF_2$—S, —$SCF_2$—CF($C_2F_5$)—$CF_2$—S, —$SCF_2$—CF($C_3F_7$)—$CF_2$—S, or —$SCF_2$—CF($C_4F_9$)—$CF_2$—S.

In some embodiments, Y is —$SCF_2$—CF($CF_3$)—$CF_2$—S, —$SCF_2$—CF($C_2F_5$)—$CF_2$—$CF_2$—S, or —$SCF_2$—CF($C_3F_7$)—$CF_2$—$CF_2$—S. In some embodiments, Y is —$SCF_2$—CF($CF_3$)—$CF_2$—$CF_2$—$CF_2$—S or —$SCF_2$—CF($C_2F_5$)—$CF_2$—$CF_2$—$CF_2$—S. In some embodiments, Y is —$SCF_2$—CF($CF_3$)—$CF_2$—$CF_2$—$CF_2$—S. In some embodiments, Y is —$SCF_2$—$CF_2$—CF($CF_3$)—$CF_2$—S, —$SCF_2$—$CF_2$—CF($C_2F_5$)—$CF_2$—S, —$SCF_2$—$CF_2$—CF($C_3F_7$)—$CF_2$—S. In some embodiments, Y is —$SCF_2$—$CF_2$—CF($CF_3$)—$CF_2$—$CF_2$—S or —$SCF_2$—$CF_2$—CF($C_2F_5$)—$CF_2$—$CF_2$—S. In some embodiments, Y is —$SCF_2$—$CF_2$—CF($CF_3$)—$CF_2$—

$CF_2$—$CF_2$—S. In some embodiments, Y is —$SCF_2$—$CF_2$—$CF_2$—$CF(CF_3)$—$CF_2$—S or —$SCF_2$—$CF_2$—$CF_2$—$CF(C_2F_5)$—$CF_2$—S. In some embodiments, Y is —$SCF_2$—$CF_2$—$CF_2$—$CF(CF_3)$—$CF_2$—$CF_2$—S. In some embodiments, Y is —$SCF_2$—$CF_2$—$CF_2$—$CF_2$—$CF(CF_3)$—$CF_2$—S.

In some embodiments, Y is —$OCF(CF_3)$—$CF_2$—S, —$OCF(CF_3)$—$CF_2$—$CF_2$—S, —$OCF(CF_3)$—$CF_2$—$CF_2$—$CF_2$—S, —$OCF(CF_3)$—$CF_2$—$CF_2$—$CF_2$—$CF_2$—S, or —$OCF(CF_3)$—$CF_2$—$CF_2$—$CF_2$—$CF_2$—$CF_2$—S. In some embodiments, Y is —$OCF_2$—$CF(CF_3)$—S, —$OCF_2$—$CF_2$—$CF(CF_3)$—S, —$OCF_2$—$CF_2$—$CF_2$—$CF(CF_3)$—S, —$OCF_2$—$CF_2$—$CF_2$—$CF_2$—$CF(CF_3)$—S, or —$OCF_2$—$CF_2$—$CF_2$—$CF_2$—$CF_2$—$CF(CF_3)$—S. In some embodiments, Y is —$OCF_2$—$CF(C_2F_5)$—S, —$OCF_2$—$CF(C_3F_7)$—S, —$OCF_2$—$CF(C_4F_9)$—S, or —$OCF_2$—$CF(C_5F_{11})$—S. In some embodiments, Y is —$OCF_2$—$CF_2$—$CF(C_2F_5)$—S, —$OCF_2$—$CF_2$—$CF(C_3F_7)$—S, or —$OCF_2$—$CF_2$—$CF(C_4F_9)$—S. In some embodiments, Y is —$OCF_2$—$CF_2$—$CF_2$—$CF(C_2F_5)$—S or —$OCF_2$—$CF_2$—$CF_2$—$CF(C_3F_7)$—S. In some embodiments, Y is —$OCF_2$—$CF_2$—$CF_2$—$CF_2$—$CF(C_2F_5)$—S In some embodiments, Y is —$OCF_2$—$CF(CF_3)$—$CF_2$—S, —$OCF_2$—$CF(C_2F_5)$—$CF_2$—S, —$OCF_2$—$CF(C_3F_7)$—$CF_2$—S, or —$OCF_2$—$CF(C_4F_9)$—$CF_2$—S.

In some embodiments, Y is —$OCF_2$—$CF(CF_3)$—$CF_2$—$CF_2$—S, —$OCF_2$—$CF(C_2F_5)$—$CF_2$—$CF_2$—S, or —$OCF_2$—$CF(C_3F_7)$—$CF_2$—$CF_2$—S. In some embodiments, Y is —$OCF_2$—$CF(CF_3)$—$CF_2$—$CF_2$—$CF_2$—S or —$OCF_2$—$CF(C_2F_5)$—$CF_2$—$CF_2$—$CF_2$—S. In some embodiments, Y is —$OCF_2$—$CF(CF_3)$—$CF_2$—$CF_2$—$CF_2$—$CF_2$—S or —$OCF_2$—$CF(C_2F_5)$—$CF_2$—$CF_2$—$CF_2$—$CF_2$—S. In some embodiments, Y is —$OCF_2$—$CF_2$—$CF(CF_3)$—$CF_2$—S, —$OCF_2$—$CF_2$—$CF(C_2F_5)$—$CF_2$—S, or —$OCF_2$—$CF_2$—$CF(C_3F_7)$—$CF_2$—S. In some embodiments, Y is —$OCF_2$—$CF_2$—$CF(CF_3)$—$CF_2$—$CF_2$—S or —$OCF_2$—$CF_2$—$CF(C_2F_5)$—$CF_2$—$CF_2$—S. In some embodiments, Y is —$OCF_2$—$CF_2$—$CF(CF_3)$—$CF_2$—$CF_2$—$CF_2$—S. In some embodiments, Y is —$OCF_2$—$CF_2$—$CF_2$—$CF(CF_3)$—$CF_2$—S or —$OCF_2$—$CF_2$—$CF_2$—$CF(C_2F_5)$—$CF_2$—S. In some embodiments, Y is —$OCF_2$—$CF_2$—$CF_2$—$CF(CF_3)$—$CF_2$—$CF_2$—S. In some embodiments, Y is —$OCF_2$—$CF_2$—$CF_2$—$CF_2$—$CF(CF_3)$—$CF_2$—S.

In some embodiments, Y is —$SCF(CF_3)$—$CF_2$—O, —$SCF(CF_3)$—$CF_2$—$CF_2$—O, —$SCF(CF_3)$—$CF_2$—$CF_2$—$CF_2$—O, —$SCF(CF_3)$—$CF_2$—$CF_2$—$CF_2$—$CF_2$—O, or —$SCF(CF_3)$—$CF_2$—$CF_2$—$CF_2$—$CF_2$—$CF_2$—O. In some embodiments, Y is —$SCF_2$—$CF(CF_3)$—O, —$SCF_2$—$CF_2$—$CF(CF_3)$—O, —$SCF_2$—$CF_2$—$CF_2$—$CF(CF_3)$—O, —$SCF_2$—$CF_2$—$CF_2$—$CF_2$—$CF(CF_3)$—O, or —$SCF_2$—$CF_2$—$CF_2$—$CF_2$—$CF_2$—$CF(CF_3)$—O. In some embodiments, Y is —$SCF_2$—$CF(C_2F_5)$—O, —$SCF_2$—$CF(C_3F_7)$—O, —$SCF_2$—$CF(C_4F_9)$—O, or —$SCF_2$—$CF(C_5F_{11})$—O. In some embodiments, Y is —$SCF_2$—$CF_2$—$CF(C_2F_5)$—O, —$SCF_2$—$CF_2$—$CF(C_3F_7)$—O, or —$SCF_2$—$CF_2$—$CF(C_4F_9)$—O. In some embodiments, Y is —$SCF_2$—$CF_2$—$CF_2$—$CF(C_2F_5)$—O or —$SCF_2$—$CF_2$—$CF_2$—$CF(C_3F_7)$—O. In some embodiments, Y is —$SCF_2$—$CF_2$—$CF_2$—$CF_2$—$CF(C_2F_5)$—O In some embodiments, Y is —$SCF_2$—$CF(CF_3)$—$CF_2$—O, —$SCF_2$—$CF(C_2F_5)$—$CF_2$—O, —$SCF_2$—$CF(C_3F_7)$—$CF_2$—O, or —$SCF_2$—$CF(C_4F_9)$—$CF_2$-0.

In some embodiments, Y is —$SCF_2$—$CF(CF_3)$—$CF_2$—$CF_2$—O, —$SCF_2$—$CF(C_2F_5)$—$CF_2$—$CF_2$—O, or —$SCF_2$—$CF(C_3F_7)$—$CF_2$—$CF_2$—O. In some embodiments, Y is —$SCF_2$—$CF(CF_3)$—$CF_2$—$CF_2$—$CF_2$—O or —$SCF_2$—$CF(C_2F_5)$—$CF_2$—$CF_2$—$CF_2$—O. In some embodiments, Y is —$SCF_2$—$CF(CF_3)$—$CF_2$—$CF_2$—$CF_2$—$CF_2$—O. In some embodiments, Y is —$SCF_2$—$CF_2$—$CF(CF_3)$—$CF_2$—O, —$SCF_2$—$CF_2$—$CF(C_2F_5)$—$CF_2$—O, or —$SCF_2$—$CF_2$—$CF(C_3F_7)$—$CF_2$—O. In some embodiments, Y is —$SCF_2$—$CF_2$—$CF(CF_3)$—$CF_2$—$CF_2$—O or —$SCF_2$—$CF_2$—$CF(C_2F_5)$—$CF_2$—$CF_2$—O. In some embodiments, Y is —$SCF_2$—$CF_2$—$CF(CF_3)$—$CF_2$—$CF_2$—$CF_2$—O. In some embodiments, Y is —$SCF_2$—$CF_2$—$CF_2$—$CF(CF_3)$—$CF_2$—O or —$SCF_2$—$CF_2$—$CF_2$—$CF(C_2F_5)$—$CF_2$—O. In some embodiments, Y is —$SCF_2$—$CF_2$—$CF_2$—$CF(CF_3)$—$CF_2$—$CF_2$—O. In some embodiments, Y is —$SCF_2$—$CF_2$—$CF_2$—$CF_2$—$CF(CF_3)$—$CF_2$—O.

In some embodiments, Y is —$OCF_2$—$CF_2$—, —$OCF_2$—$CF_2$—$OCF_2$—$CF_2$—, or —$OCF_2$—$CF_2$—$OCF_2$—$CF_2$—$OCF_2$—$CF_2$—. In some embodiments, Y is —$OCF_2$—, —$OCF_2$—$OCF_2$—, —$OCF_2$—$OCF_2$—$OCF_2$—, —$OCF_2$—$OCF_2$—$OCF_2$—$OCF_2$—, —$OCF_2$—$OCF_2$—$OCF_2$—$OCF_2$—$OCF_2$—, —$OCF_2$—$OCF_2$—$OCF_2$—$OCF_2$—$OCF_2$—$OCF_2$—, or —$OCF_2$—$OCF_2$—$OCF_2$—$OCF_2$—$OCF_2$—$OCF_2$—$OCF_2$—. In some embodiments, Y is —$OCF(CF_3)$—$CF_2$— or —$OCF(CF_3)$—$CF_2$—$OCF(CF_3)$—$CF_2$—. In some embodiments, Y is in which n is 0, 1, 2, 3, 4, 5, 6, or 7.

In some embodiments, Z is —$OCF_2$, —$OCF_2$—$CF_2$, —$OCF_2$—$CF_2$—$CF_2$, —$OCF_2$—$CF_2$—$CF_2$—$CF_2$, —$OCF_2$—$CF_2$—$CF_2$—$CF_2$—$CF_2$, or —$OCF_2$—$CF_2$—$CF_2$—$CF_2$—$CF_2$—$CF_2$. In some embodiments, Z is —$CF_2$, —$CF_2$—$CF_2$, —$CF_2$—$CF_2$—$CF_2$, —$CF_2$—$CF_2$—$CF_2$—$CF_2$, —$CF_2$—$CF_2$—$CF_2$—$CF_2$—$CF_2$, or —$CF_2$—$CF_2$—$CF_2$—$CF_2$—$CF_2$—$CF_2$. In some embodiments, each W is independently —$C(O)NR_a$—, —$NR_aC(O)$—, —$C(O)O$—, —$OC(O)$—, —$C(O)S$—, —$SC(O)$—, or —O—, wherein $R_a$ is —H, $C_1$-$C_{12}$ perfluoroalkyl, or —F, e.g., W is a —$C(O)NH$—, —$C(O)O$—, —$C(O)$—S—, or —O—. In some embodiments, $X^1$ and/or $X^2$ is methylene, ethylene, propylene, butylene, pentylene, or hexylene. In some embodiments, $X^1$ is —$CH_2$—O—$CH_2$—, —$CH_2$—S—$CH_2$—, —$CH_2$—$NH$—$CH_2$—, —$CH_2$—$NR_b$—$CH_2$—, —$CH_2$—$NR_b$—$C(O)$—$CH_2$—, —$CH_2$—$C(O)$—$NR_b$—$CH_2$—, —$CH_2$—$C(O)$—O—$CH_2$—, —$CH_2$—$C(O)$—S—$CH_2$—, or —$CH_2$—S—$C(O)$—$CH_2$—, and $R_b$ is —H or $C_1$-$C_6$ alkyl. In some embodiments, $X^1$ is —$CH_2$—$CH_2$—O—$CH_2$—, —$CH_2$—$CH_2$—S—$CH_2$—, —$CH_2$—$CH_2$—$NH$—$CH_2$—, —$CH_2$—$CH_2$—$NR_b$—$CH_2$—, —$CH_2$—$CH_2$—$NR_b$—$C(O)$—$CH_2$—, —$CH_2$—$CH_2$—$C(O)$—$NR_b$—$CH_2$—, —$CH_2$—$CH_2$—$C(O)$—O—$CH_2$—, —$CH_2$—$CH_2$—$C(O)$—S—$CH_2$—, or —$CH_2$—$CH_2$—S—$C(O)$—$CH_2$—, and $R_b$ is —H or $C_1$-$C_6$ alkyl. In some embodiments, $X^1$ is —$CH_2$—$CH_2$—$CH_2$—O—$CH_2$—, —$CH_2$—$CH_2$—$CH_2$—S—$CH_2$—, —$CH_2$—$CH_2$—$CH_2$—NH—$CH_2$—, —$CH_2$—$CH_2$—$CH_2$—$NR_b$—$CH_2$—, —$CH_2$—$CH_2$—$CH_2$—$NR_b$—C(O)—$CH_2$—, —$CH_2$—$CH_2$—$CH_2$—C(O)—$NR_b$—$CH_2$—, —$CH_2$—$CH_2$—$CH_2$—C(O)—O—$CH_2$—, —$CH_2$—$CH_2$—$CH_2$—C(O)—S—$CH_2$—, or —$CH_2$—$CH_2$—$CH_2$—S—C(O)—$CH_2$—, and $R_b$ is —H or $C_1$-$C_6$ alkyl. In some embodiments, $X^1$ is —$CH_2$—$CH_2$—$CH_2$—$CH_2$—O—$CH_2$—, —$CH_2$—$CH_2$—$CH_2$—$CH_2$—S—$CH_2$—, —$CH_2$—$CH_2$—$CH_2$—$CH_2$—NH—$CH_2$—, —$CH_2$—$CH_2$—$CH_2$—$CH_2$—$NR_b$—$CH_2$—, —$CH_2$—$CH_2$—$CH_2$—$CH_2$—$NR_b$—C(O)—$CH_2$—, —$CH_2$—$CH_2$—$CH_2$—$CH_2$—C(O)—$NR_b$—$CH_2$—, —$CH_2$—$CH_2$—$CH_2$—$CH_2$—C(O)—O—$CH_2$—, —$CH_2$—$CH_2$—$CH_2$—$CH_2$—C(O)—S—$CH_2$—, or —$CH_2$—$CH_2$—$CH_2$—$CH_2$—S—C(O)—$CH_2$—, and $R_b$ is —H or $C_1$-$C_6$ alkyl. In some embodiments, $X^1$ is —$CH_2$—$CH_2$—$CH_2$—$CH_2$—$CH_2$—O—$CH_2$—, —$CH_2$—$CH_2$—$CH_2$—$CH_2$—$CH_2$—S—$CH_2$—, —$CH_2$—$CH_2$—$CH_2$—$CH_2$—$CH_2$—NH—$CH_2$—, —$CH_2$—$CH_2$—$CH_2$—$CH_2$—$CH_2$—$NR_b$—$CH_2$—, —$CH_2$—$CH_2$—$CH_2$—$CH_2$—$CH_2$—$NR_b$—C(O)—$CH_2$—, —$CH_2$—$CH_2$—$CH_2$—$CH_2$—$CH_2$—C(O)—$NR_b$—$CH_2$—, —$CH_2$—$CH_2$—$CH_2$—$CH_2$—$CH_2$—C(O)—O—$CH_2$—, —$CH_2$—$CH_2$—$CH_2$—$CH_2$—$CH_2$—C(O)—S—$CH_2$—, or —$CH_2$—$CH_2$—$CH_2$—$CH_2$—$CH_2$—S—C(O)—$CH_2$—, and $R_b$ is —H or $C_1$-$C_6$ alkyl. In some embodiments, $X^1$ is —$CH_2$—$CH_2$—$CH_2$—$CH_2$—$CH_2$—$CH_2O$—$CH_2$—, —$CH_2$—$CH_2$—$CH_2$—$CH_2$—$CH_2$—$CH_2$—S—$CH_2$—, —$CH_2$—$CH_2$—$CH_2$—$CH_2$—$CH_2$—$CH_2$—NH—$CH_2$—, —$CH_2$—$CH_2$—$CH_2$—$CH_2$—$CH_2$—$CH_2$—$NR_b$—$CH_2$—, —$CH_2$—$CH_2$—$CH_2$—$CH_2$—$CH_2$—$CH_2$—$NR_b$—C(O)—$CH_2$—, —$CH_2$—$CH_2$—$CH_2$—$CH_2$—$CH_2$—$CH_2$—C(O)—$NR_b$—$CH_2$—, —$CH_2$—$CH_2$—$CH_2$—$CH_2$—$CH_2$—$CH_2$—C(O)—O—$CH_2$—, —$CH_2$—$CH_2$—$CH_2$—$CH_2$—$CH_2$—$CH_2$—C(O)—S—$CH_2$—, or —$CH_2$—$CH_2$—$CH_2$—$CH_2$—$CH_2$—$CH_2$—S—C(O)—$CH_2$—, and $R_b$ is —H or $C_1$-$C_6$ alkyl.

In some embodiments, $X^2$ is —$CH_2$—O—$CH_2$—, —$CH_2$—S—$CH_2$—, —$CH_2$—NH—$CH_2$—, —$CH_2$—$NR_b$—$CH_2$—, —$CH_2$—C(O)—$NR_b$—$CH_2$—, —$CH_2$—$NR_b$—C(O)—$CH_2$—, —$CH_2$—C(O)—O—$CH_2$—, —$CH_2$—C(O)—S—$CH_2$—, or —$CH_2$—S—C(O)—$CH_2$—, and $R_b$ is —H or $C_1$-$C_6$ alkyl. In some embodiments, $X^2$ is —$CH_2$—O—$CH_2$—$CH_2$—, —$CH_2$—S—$CH_2$—$CH_2$—, —$CH_2$—NH—$CH_2$—$CH_2$—, —$CH_2$—$NR_b$—$CH_2$—$CH_2$—, —$CH_2$—$NR_b$—C(O)—$CH_2$—$CH_2$—, —$CH_2$—C(O)—$NR_b$—$CH_2$—$CH_2$—, —$CH_2$—C(O)—O—$CH_2$—$CH_2$—$CH_2$—, —$CH_2$—C(O)—S—$CH_2$—$CH_2$—$CH_2$—, or —$CH_2$—S—C(O)—$CH_2$—$CH_2$—$CH_2$—, and $R_b$ is —H or $C_1$-$C_6$ alkyl. In some embodiments, $X^2$ is —$CH_2$—O—$CH_2$—$CH_2$—$CH_2$—$CH_2$—, —$CH_2$—S—$CH_2$—$CH_2$—$CH_2$—$CH_2$—, —$CH_2$—NH—$CH_2$—$CH_2$—$CH_2$—, —$CH_2$—$NR_b$—$CH_2$—$CH_2$—$CH_2$—, —$CH_2$—$NR_b$—C(O)—$CH_2$—$CH_2$—$CH_2$—, —$CH_2$—C(O)—$NR_b$—$CH_2$—$CH_2$—$CH_2$—, —$CH_2$—C(O)—O—$CH_2$—$CH_2$—$CH_2$—, —$CH_2$—$NR_b$—C(O)—$CH_2$—$CH_2$—$CH_2$—, —$CH_2$—C(O)—S—$CH_2$—$CH_2$—$CH_2$—, or —$CH_2$—S—C(O)—$CH_2$—$CH_2$—$CH_2$—, and $R_b$ is —H or $C_1$-$C_6$ alkyl. In some embodiments, $X^2$ is —$CH_2$—O—$CH_2$—$CH_2$—$CH_2$—$CH_2$—, —$CH_2$—S—$CH_2$—$CH_2$—$CH_2$—$CH_2$—, —$CH_2$—NH—$CH_2$—$CH_2$—$CH_2$—$CH_2$—, —$CH_2$—$NR_b$—$CH_2$—$CH_2$—$CH_2$—$CH_2$—, —$CH_2$—$NR_b$—C(O)—$CH_2$—$CH_2$—$CH_2$—$CH_2$—, —$CH_2$—C(O)—$NR_b$—$CH_2$—$CH_2$—$CH_2$—$CH_2$—, —$CH_2$—C(O)—O—$CH_2$—$CH_2$—$CH_2$—$CH_2$—, —$CH_2$—C(O)—S—$CH_2$—$CH_2$—$CH_2$—$CH_2$—, or —$CH_2$—S—C(O)—$CH_2$—$CH_2$—$CH_2$—$CH_2$—, and $R_b$ is —H or $C_1$-$C_6$ alkyl. In some embodiments, $X^2$ is —$CH_2$—O—$CH_2$—$CH_2$—$CH_2$—$CH_2$—$CH_2$—, —$CH_2$—S—$CH_2$—$CH_2$—$CH_2$—$CH_2$—$CH_2$—, —$CH_2$—NH—$CH_2$—$CH_2$—$CH_2$—$CH_2$—$CH_2$—, —$CH_2$—$NR_b$—$CH_2$—$CH_2$—$CH_2$—$CH_2$—$CH_2$—, —$CH_2$—$NR_b$—C(O)—$CH_2$—$CH_2$—$CH_2$—$CH_2$—$CH_2$—, —$CH_2$—C(O)—$NR_b$—$CH_2$—$CH_2$—$CH_2$—$CH_2$—$CH_2$—, —$CH_2$—C(O)—O—$CH_2$—$CH_2$—$CH_2$—$CH_2$—$CH_2$—$CH_2$—, —$CH_2$—C(O)—S—$CH_2$—$CH_2$—$CH_2$—$CH_2$—$CH_2$—$CH_2$—, or —$CH_2$—S—C(O)—$CH_2$—$CH_2$—$CH_2$—$CH_2$—$CH_2$—$CH_2$—, and $R_b$ is —H or $C_1$-$C_6$ alkyl.

In some embodiments, each of $R^1$, $R^2$, $R^3$, $R^4$, $R^5$, and/or $R^6$ is methoxy, ethoxy, —$OCH_2$—$CH_2$—$CH_3$, —$OCH_2$—$CH_2$—$CH_2$—$CH_3$, —$OCH_2$—$CH_2$—$CH_2$—$CH_2$—$CH_3$, or —$OCH_2$—$CH_2$—$CH_2$—$CH_2$—$CH_2$—$CH_3$. In other embodiments, $R^1$, $R^2$, $R^3$, $R^4$, $R^5$, and/or $R^6$ is methyl, ethyl, propyl, butyl, pentyl, or hexyl. In some embodiments, each of $R^1$, $R^2$, $R^3$, $R^4$, $R^5$, and/or $R^6$ is chloro, fluoro, or bromo. In some embodiments, each of $R^7$ and/or $R^8$ is F or $C_1$-$C_{12}$ perfluoroalkyl. For example, and without limitation, $R^7$ and/or $R^8$ is —$CF_3$, —$CF_2$—$CF_3$, —$CF_2$—$CF_2$—$CF_3$, —$CF_2$—$CF_2$—$CF_2$—$CF_3$, —$CF_2$—$CF_2$—$CF_2$—$CF_2$—$CF_3$, or —$CF_2$—$CF_2$—$CF_2$—$CF_2$—$CF_2$—$CF_3$.

In some embodiments, the fluorocarbon silane has a structure of Formula II:

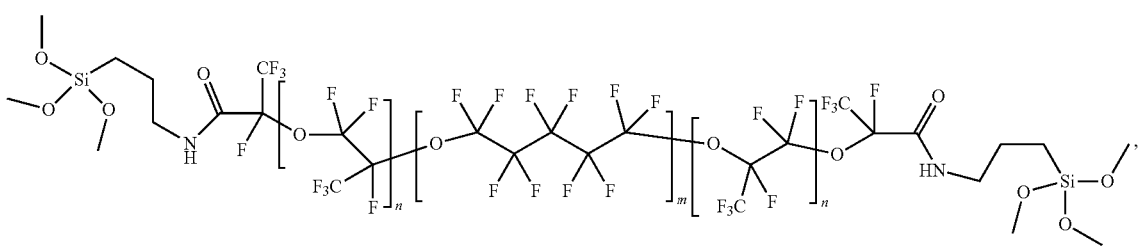

(II)

in which each n is independently 0, 1, 2, 3, 4, 5, 6, or 7 and m is 1, 2, 3, 4, 5, or 6. In some embodiments, m is 1-5, such as 3. In some embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7, or 7+6). For example, n+n is 7 when the fluorocarbon silane has the structure of Formula III:

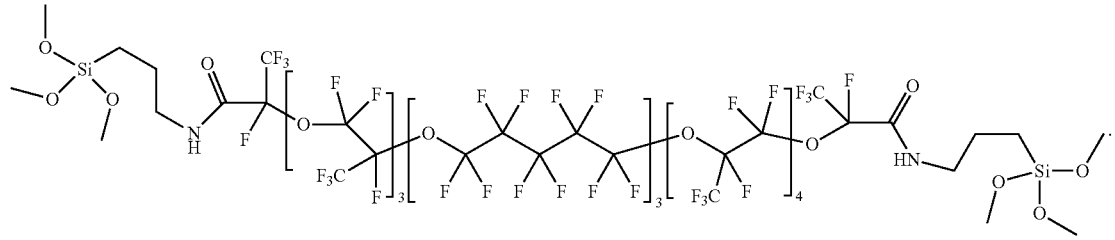

(III)

In some embodiments, the fluorocarbon silane has the structure of Formula IV:

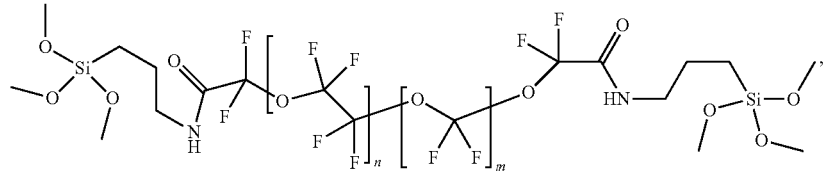

(IV)

in which n is 0, 1, 2, 3, 4, 5, 6, or 7 and m is 1, 2, 3, 4, 5, or 6.

Fluorocarbon Polyol

The fluorocarbon polyol includes at least two hydroxyl groups (e.g., two, three, four, five, etc.). In some embodiments, the fluorocarbon polyol has a range of about 2 to about 10 hydroxyl groups (e.g., 2, 3, 4, 5, 6, 7, 8, 9, or 10). In some embodiments, the fluorocarbon is a diol. In some embodiments, the fluorocarbon is a triol. In some embodiments, the fluorocarbon is a tetrol.

In some embodiments, the fluorocarbon polyol is a compound of Formula V:

$$HO-V-OH,$$ (V)

in which V is V is $-(CZ_2)_{n'}-C_{1-15}$ perfluoroalkylene-$(CZ_2)_{n'}-$ or $-(CZ_2)_{n'}-(C_{1-15}$ heterofluoroalkylene)$_{n'}-(CZ_2)_{n'}-$, wherein each Z is independently H, F, or $C_{1-6}$ perfluoroalkyl and each n' is independently 1, 2, 3, 4, 5, 6 or 7. In some embodiments, V is $-(CZ_2)_{n'}-C_{1-15}$ perfluoroalkylene-$(CZ_2)_{n'}-$, e.g., $-CZ_2-(CF_2)_k-CZ_2-$ or $-(C(CF_3)_2)_k-$, in which k is 1-15 (e.g., 1, 2, 3, 4, 5, 6, 7, 8, 9, 10, 11, 12, 13, 14, or 15). In some embodiments, V is $-(CZ_2)_{n'}-(C_{1-15}$ heterofluoroalkylene)$_{n'}-(CZ_2)_{n'}-$, e.g., $-C(CF_3)_2(OCF_3)-C(CF_3)_2-$, $-CH_2(OCF_2)_k-(OCF_2CF_2)_k-CH_2-$, or $-CH_2-CH_2(OCF_2)_{k'}-(OCF_2CF_2)_{k'}-CH_2-CH_2-$, wherein k'+k' is 1-30. In some embodiments, V is $-CH_2-CF_2-CH_2-$, $-CH_2-CF_2-CF_2-CH_2-$, $-CH_2-CF_2-CF_2-CF_2-CH_2-$, $-CH_2-CF_2-CF_2-CF_2-CF_2-CH_2-$, $-CH_2-CF_2-CF_2-$ $-CF_2-CF_2-CF_2-CH_2-$, $-CH_2-CF_2-CF_2-CF_2-CF_2-CF_2-CH_2-$, $-CH_2-CF_2-CF_2-CF_2-CF_2-CF_2-CF_2-CH_2-$, $-CH_2-CF_2-$ $CF_2-CF_2-CF_2-CF_2-CF_2-CF_2-CH_2-$, $-CH_2-CF_2-CF_2-CF_2-CF_2-CF_2-CF_2-CF_2-CF_2-CH_2-$, or $-CH_2-CF_2-CF_2-CF_2-CF_2-CF_2-CF_2-CF_2-CF_2-CF_2-CH_2-$.

In some embodiments, V is $-CH_2-O-CF_2-CH_2$, $-CH_2-O-CF_2-CF_2-CH_2-$, $-CH_2-O-CF_2-CF_2-CH_2-$, $-CH_2-O-CF_2-CF_2-CF_2-CH_2-$, $-CH_2-O-CF_2-CF_2-CF_2-CF_2-CH_2-$, $-CH_2-O-CF_2-CF_2-CF_2-CF_2-CF_2-CH_2-$, $-CH_2-O-CF_2-CF_2-CF_2-CF_2-CF_2-CF_2-CH_2-$, $-CH_2-O-CF_2-CF_2-CF_2-CF_2-CF_2-CF_2-CF_2-CH_2-$, $-CH_2-O-CF_2-CF_2-CF_2-CF_2-CF_2-CF_2-CF_2-CF_2-CH_2-$, $-CH_2-O-CF_2-CF_2-CF_2-CF_2-CF_2-CF_2-CF_2-CF_2-CF_2-CH_2-$, or $-CH_2-O-CF_2-CF_2-CF_2-CF_2-CF_2-CF_2-CF_2-CF_2-CF_2-CF_2-CH_2-$.

In some embodiments, V is $-CH_2-O-CF_2-CF_2-O-CF_2-CF_2-CH_2$, $-CH_2-O-CF_2-CF_2-O-CF_2-CF_2-O-CF_2-CF_2-CH_2-$, $-CH_2-O-CF_2-CF_2-O-CF_2-CF_2-O-CF_2-CF_2-O-CF_2-CF_2-CH_2-$, $-CH_2-O-CF_2-CF_2-O-CF_2-CF_2-O-CF_2-CF_2-O-CF_2-CF_2-CH_2-$, or $-CH_2-O-CF_2-CF_2-O-CF_2-CF_2-O-CF_2-CF_2-O-CF_2-CF_2-O-CF_2-CF_2-CH_2-$. In some embodiments, V is $-CH_2-O-CF_2-CF_2-O-CF_2-CF_2-CF_2-CH_2-$, $-CH_2-O-CF_2-CF_2-O-CF_2-CF_2-CF_2-O-CF_2-CF_2-$ $CF_2-CH_2$, or $-CH_2-O-CF_2-CF_2-CF_2-O-CF_2-CF_2-CF_2-O-CF_2-CF_2-CF_2-CH_2-$. In some embodiments, V is $-CH_2-O-CF_2-CF_2-CF_2-O-CF_2-CF_2-CF_2-CF_2-CH_2-$, or $-CH_2-O-CF_2-CF_2-CF_2-CF_2-O-CF_2-CF_2-$ $CF_2-CF_2-O-CF_2-CF_2-CF_2-CF_2-CH_2-$. In some embodiments, V is $-CH_2-O-CF_2-CF_2-CF_2-CF_2-CF_2-CH_2-$ $CF_2-O-CF_2-CF_2-CF_2-CF_2-CF_2-CH_2$, or

—CH₂—O—CF₂—CF₂—CF₂—CF₂—CF₂—CF₂—O—CF₂—CF₂—CF₂—CF₂—CF₂—CF₂—CH₂—.

In some embodiments, V is —CH₂—O—CF₂—O—CF₂—CH₂—, —CH₂—O—CF₂—CF₂—O—CF₂—CH₂—, —CH₂—O—CF₂—CF₂—CF₂—O—CF₂—CH₂—, —CH₂—O—CF₂—CF₂—CF₂—CF₂—O—CF₂—CH₂—, —CH₂—O—CF₂—CF₂—CF₂—CF₂—CF₂—O—CF₂—CH₂—, —CH₂—O—CF₂—CF₂—CF₂—CF₂—CF₂—CF₂—O—CF₂—CH₂—, —CH₂—O—CF₂—CF₂—CF₂—CF₂—CF₂—CF₂—CF₂—O—CF₂—CH₂—, —CH₂—O—CF₂—CF₂—CF₂—CF₂—CF₂—CF₂—CF₂—CF₂—O—CF₂—CH₂—, —CH₂—O—CF₂—CF₂—CF₂—CF₂—CF₂—CF₂—CF₂—CF₂—CF₂—O—CF₂—CH₂—, —CH₂—O—CF₂—CF₂—CF₂—CF₂—CF₂—CF₂—CF₂—CF₂—CF₂—CF₂—O—CF₂—CH₂—, or —CH₂—O—CF₂—CF₂—CF₂—CF₂—CF₂—CF₂—CF₂—CF₂—CF₂—CF₂—CF₂—O—CF₂—CH₂—. In some embodiments, V is —CH₂—O—CF₂—O—CF₂—CF₂—CH₂—, —CH₂—O—CF₂—CF₂—O—CF₂—CF₂—CH₂—, —CH₂—O—CF₂—CF₂—CF₂—O—CF₂—CF₂—CH₂—, —CH₂—O—CF₂—CF₂—CF₂—CF₂—O—CF₂—CF₂—CH₂—, —CH₂—O—CF₂—CF₂—CF₂—CF₂—CF₂—O—CF₂—CF₂—CH₂—, —CH₂—O—CF₂—CF₂—CF₂—CF₂—CF₂—CF₂—O—CF₂—CF₂—CH₂—, —CH₂—O—CF₂—CF₂—CF₂—CF₂—CF₂—CF₂—CF₂—O—CF₂—CF₂—CH₂—, —CH₂—O—CF₂—CF₂—CF₂—CF₂—CF₂—CF₂—CF₂—CF₂—O—CF₂—CF₂—CH₂—, —CH₂—O—CF₂—CF₂—CF₂—CF₂—CF₂—CF₂—CF₂—CF₂—CF₂—O—CF₂—CF₂—CH₂—, or —CH₂—O—CF₂—CF₂—CF₂—CF₂—CF₂—CF₂—CF₂—CF₂—CF₂—CF₂—O—CF₂—CF₂—CH₂—.

In some embodiments, V is —CH₂—O—CF₂—O—CF₂—CF₂—CF₂—CH₂—, —CH₂—O—CF₂—CF₂—O—CF₂—CF₂—CF₂—CH₂—, —CH₂—O—CF₂—CF₂—CF₂—O—CF₂—CF₂—CF₂—CH₂—, —CH₂—O—CF₂—CF₂—CF₂—CF₂—O—CF₂—CF₂—CF₂—CH₂—, —CH₂—O—CF₂—CF₂—CF₂—CF₂—CF₂—O—CF₂—CF₂—CF₂—CH₂—, —CH₂—O—CF₂—CF₂—CF₂—CF₂—CF₂—CF₂—O—CF₂—CF₂—CF₂—CH₂—, or —CH₂—O—CF₂—CF₂—CF₂—CF₂—CF₂—CF₂—CF₂—O—CF₂—CF₂—CF₂—CH₂—. In some embodiments, V is —CH₂—O—CF₂—O—CF₂—CF₂—CF₂—CF₂—CH₂—, —CH₂—O—CF₂—CF₂—O—CF₂—CF₂—CF₂—CF₂—CH₂—, —CH₂—O—CF₂—CF₂—CF₂—O—CF₂—CF₂—CF₂—CF₂—CH₂—, —CH₂—O—CF₂—CF₂—CF₂—CF₂—O—CF₂—CF₂—CF₂—CF₂—CH₂—, —CH₂—O—CF₂—CF₂—CF₂—CF₂—CF₂—O—CF₂—CF₂—CF₂—CF₂—CH₂—, or —CH₂—O—CF₂—CF₂—CF₂—CF₂—CF₂—CF₂—O—CF₂—CF₂—CF₂—CF₂—CH₂—.

In some embodiments, V is —CH₂—O—CF₂—O—CF₂—CF₂—CF₂—CF₂—CF₂—CH₂—, —CH₂—O—CF₂—CF₂—O—CF₂—CF₂—CF₂—CF₂—CF₂—CH₂—, —CH₂—O—CF₂—CF₂—CF₂—O—CF₂—CF₂—CF₂—CF₂—CF₂—CH₂—, —CH₂—O—CF₂—CF₂—CF₂—CF₂—O—CF₂—CF₂—CF₂—CF₂—CF₂—CH₂—, or —CH₂—O—CF₂—CF₂—CF₂—CF₂—CF₂—O—CF₂—CF₂—CF₂—CF₂—CF₂—CH₂—. In some embodiments, V is —CH₂—O—CF₂—O—CF₂—CF₂—CF₂—CF₂—CF₂—CF₂—CH₂—, —CH₂—O—CF₂—CF₂—O—CF₂—CF₂—CF₂—CF₂—CF₂—CF₂—CH₂—, —CH₂—O—CF₂—CF₂—CF₂—O—CF₂—CF₂—CF₂—CF₂—CF₂—CF₂—CH₂—, or —CH₂—O—CF₂—CF₂—CF₂—CF₂—O—CF₂—CF₂—CF₂—CF₂—CF₂—CF₂—CH₂—. In some embodiments, V is —CH₂—O—CF₂—O—CF₂—CF₂—CF₂—CF₂—CF₂—CF₂—CF₂—CH₂—, —CH₂—O—CF₂—CF₂—O—CF₂—CF₂—CF₂—CF₂—CF₂—CF₂—CF₂—CH₂—, or —CH₂—O—CF₂—CF₂—CF₂—O—CF₂—CF₂—CF₂—CF₂—CF₂—CF₂—CF₂—CH₂—. In some embodiments, V is —CH₂—O—CF₂—O—CF₂—CF₂—CF₂—CF₂—CF₂—CF₂—CF₂—CF₂—CH₂—, or —CH₂—O—CF₂—CF₂—O—CF₂—CF₂—CF₂—CF₂—CF₂—CF₂—CF₂—CF₂—CH₂—.

In some embodiments, V is —C(CF₃)₂—, —C(CF₃)₂—C(CF₃)₂—, —C(CF₃)₂—C(CF₃)₂—C(CF₃)₂—, —C(CF₃)₂—C(CF₃)₂—C(CF₃)₂—C(CF₃)₂—, or —C(CF₃)₂—C(CF₃)₂—C(CF₃)₂—C(CF₃)₂—C(CF₃)₂—. In some embodiments, V is —C(CF₃)(OCF₃)—C(CF₃)₂)—, —CH₂(OCF₂)$_{k'}$—(OCF₂CF₂)$_{k'}$—CH₂—, or —CH₂—CH₂(OCF₂)$_{k'}$—(OCF₂CF₂)$_{k'}$—CH₂—CH₂—, wherein k'+k' is 1-30.

In some embodiments, V has the structure of Formula VI:

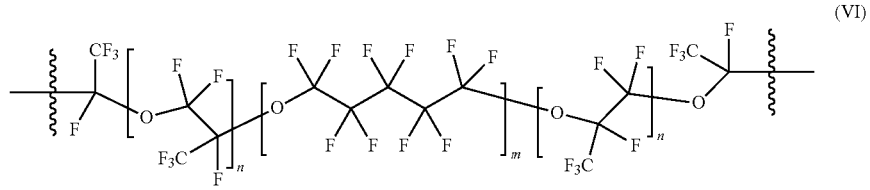

(VI)

in which each n is independently 0, 1, 2, 3, 4, 5, 6, or 7, and m is 1, 2, 3, 4, 5, or 6.

In some embodiments, V has the structure X—(CF₂CF₂O)$_n$(CF₂O)$_m$(CF₂CF(CF₃)O)$_k$—Y, in which X and Y are independently $C_{1-6}$ alkyl or perfluoroalkyl and m, n, and k independently 0 to 6 (e.g., 1 to 6), provided that at least one of m, n, and k is greater than 0.

In some embodiments, the crosslinked fluorocarbon surface coating may be the product of the reaction of any of the fluorocarbon silanes described herein and a hydroxyl group of the fluorocarbon polyol (FIG. 1). For example, and without limitation, one or more of the methoxy groups of the fluorocarbon silane described herein may react with a hydroxyl group on the fluorocarbon polyol.

Kits

The invention provides kits for coating a surface include a fluorocarbon silane and a fluorocarbon polyol. The kit may include a plurality of containers. For example, a first container may store a fluorocarbon silane, and a second container may store a fluorocarbon polyol.

Devices

A device of the invention may include a first channel, region, or reservoir being coated with a crosslinked fluorocarbon surface coating and having a depth, a width, a proximal end, and a distal end. The proximal end is or is configured to be in fluid communication with a source of liquid, e.g., a reservoir integral to the device or coupled to the device, e.g., by tubing. The device of the invention may also include a second channel, region, or reservoir being coated with the crosslinked fluorocarbon surface coating and having a depth, a width, a proximal end, and a distal end. The distal end of the first channel may be in fluid communication with, e.g., fluidically connected to, a droplet source (e.g., a droplet source region). A droplet source region may allow liquid from the first channel to expand in at least one dimension, leading to droplet formation under appropriate conditions as described herein. A droplet source region can be of any suitable geometry.

In one embodiment, the droplet source region includes a shelf region that allows liquid to expand substantially in one dimension, e.g., perpendicular to the direction of flow. The width of the shelf region is greater than the width of the first channel at its distal end. In certain embodiments, the first channel is a channel distinct from a shelf region, e.g., the shelf region widens or widens at a steeper slope or curvature than the distal end of the first channel. In other embodiments, the first channel and shelf region are merged into a continuous flow path, e.g., one that widens linearly or non-linearly from its proximal end to its distal end; in these embodiments, the distal end of the first channel can be considered to be an arbitrary point along the merged first channel and shelf region. In another embodiment, the droplet source region includes a step region, which provides a spatial displacement and allows the liquid to expand in more than one dimension. The spatial displacement may be upward or downward or both relative to the channel. The choice of direction may be made based on the relative density of the dispersed and continuous phases, with an upward step employed when the dispersed phase is less dense than the continuous phase and a downward step employed when the dispersed phase is denser than the continuous phase. Droplet source regions may also include combinations of a shelf and a step region, e.g., with the shelf region disposed between the channel and the step region. Droplet source regions may also be coated with the crosslinked fluorocarbon surface coating.

Channel

The devices described herein include at least a first channel. A channel can be of any suitable geometry. The channels can be open-ended (e.g., connected to subsequent channels) or enclosed. The channels can have any length, width, and height suitable for transporting one or more droplets. For example, the length, width, and height may be at least, independently, e.g., 0.1 µm-10 mm (e.g., 0.1-1 µm, e.g., about 0.1 µm, 0.2 µm, 0.3 µm, 0.4 µm, 0.5 µm, 0.6 µm, 0.7 µm, 0.8 µm, 0.9 µm, 1 µm, or 1-10 µm, e.g., about 1 µm, 2 µm, 3 µm, 4 µm, 5 µm, 6 µm, 7 µm, 8 µm, 9 µm, 10 µm, or 10-100 µm, e.g., about 20 µm, 30 µm, 40 µm, 50 µm, 60 µm, 70 µm, 80 µm, 90 µm, 100 µm, or 100 µm-1000 µm, e.g., about 200 µm, 300 µm, 400 µm, 500 µm, 600 µm, 700 µm, 800 µm, 900 µm, 1000 µm, or 1 mm-10 mm, e.g., about 2 mm, 3 mm, 4 mm, 5 mm, 6 mm, 7 mm, 8 mm, 9 mm, 10 mm). The channel may have a volume of e.g., 1 nL-10 mL (e.g., about 1 nL, 2 nL, 3 nL, 4 nL, 5 nL, 6 nL, 7 nL, 8 nL, 9 nL, 10 nL, or 10 nL-100 nL, e.g., about 20 nL, 30 nL, 40 nL, 50 nL, 60 nL, 70 nL, 80 nL, 90 nL, 100 nL, or 100 nL-1 µL, e.g., about 200 nL, 300 nL, 400 nL, 500 nL, 600 nL, 700 nL, 800 nL, 900 nL, 1 µL, or 1 µL-10 µL, e.g., about 2 µL, 3 µL, 4 µL, 5 µL, 6 µL, 7 µL, 8 µL, 9 µL, 10 µL, or 10-100 µL, e.g., about 20 µL, 30 µL, 40 µL, 50 µL, 60 µL, 70 µL, 80 µL, 90 µL, 100 µL, or 100 µL-1 mL, e.g., about 200 µL, 300 µL, 400 µL, 500 µL, 600 µL, 700 µL, 800 µL, 900 µL, 1 mL, or 1 mL-10 mL, e.g., about 2 mL, 3 mL, 4 mL, 5 mL, 6 mL, 7 mL, 8 mL, 9 mL, 10 mL). In some embodiments, the channel has no cross-sectional dimension of greater than 1 mm.

Reservoir

The device may include a reservoir for liquid reagents. For example, the device may include a reservoir for the liquid to flow in the first channel. As a further non-limiting example, the device may include a first reservoir in fluid communication with the first proximal end. A single reservoir may also be connected to multiple channels in a device, e.g., when the same liquid is to be introduced at two or more different locations in the device. Reservoirs may be of any appropriate size, e.g., to hold 10 µL to 500 mL, e.g., 10 µL to 300 mL, 25 µL to 10 mL, 100 µL to 1 mL, 40 µL to 300 µL, 1 mL to 10 mL, or 10 mL to 50 mL.

Droplet Source Region

The devices described herein may be used for producing droplets. In general, droplets or particles are formed in a droplet source region. Droplets or particles may be formed by any suitable method known in the art. In general, droplet formation includes two liquid phases. The two phases may be the sample phase and an oil phase. During formation, a plurality of discrete volume droplets or particles are formed.

The droplets may be formed by shaking or stirring a liquid to form individual droplets, creating a suspension or an emulsion containing individual droplets, or forming the droplets through pipetting techniques, e.g., with needles, or the like. The droplets may be formed made using a milli-, micro-, or nanofluidic droplet maker. Examples of such droplet makers include, e.g., a T-junction droplet maker, a Y-junction droplet maker, a channel-within-a-channel junction droplet maker, a cross (or "X") junction droplet maker, a flow-focusing junction droplet maker, a micro-capillary droplet maker (e.g., co-flow or flow-focus), and a three-dimensional droplet maker. The droplets may be produced using a flow-focusing device, or with emulsification systems, such as homogenization, membrane emulsification, shear cell emulsification, and fluidic emulsification.

Discrete liquid droplets may be encapsulated by a carrier fluid that wets the microchannel. These droplets, sometimes known as plugs, form the dispersed phase in which the reactions occur. Systems that use plugs differ from segmented-flow injection analysis in that reagents in plugs do not come into contact with the microchannel. In T junctions, the disperse phase and the continuous phase are injected from two branches of the "T". Droplets of the disperse phase are produced as a result of the shear force and interfacial tension at the fluid-fluid interface. The phase that has lower interfacial tension with the channel wall is the continuous phase. To generate droplets in a flow-focusing configuration, the continuous phase is injected through two outside channels and the disperse phase is injected through a central channel into a narrow orifice. Other geometric designs to create droplets would be known to one of skill in the art. Methods of producing droplets are disclosed in Song et al. Angew. Chem. 45: 7336-7356, 2006, Mazutis et al. Nat. Protoc. 8(5):870-891, 2013, U.S. Pat. No. 9,839,911; U.S. Pub. Nos. 2005/0172476, 2006/0163385, and 2007/0003442, PCT Pub. Nos. WO 2009/005680 and WO 2018/009766. In some embodiments, electric fields or acoustic waves may be used to produce droplets, e.g., as described in PCT Pub. No. WO 2018/009766.

In one embodiment, the droplet source region includes a shelf region that allows liquid to expand substantially in one dimension, e.g., perpendicular to the direction of flow. In some embodiments, the shelf region may include the fluorocarbon surface coating as described below. In some embodiments, the width of the shelf region is greater than the width of the first channel at its distal end. In certain embodiments, the first channel is a channel distinct from a shelf region, e.g., the shelf region widens or widens at a steeper slope or curvature than the distal end of the first channel. In other embodiments, the first channel and shelf region are merged into a continuous flow path, e.g., one that widens linearly or non-linearly from its proximal end to its distal end; in these embodiments, the distal end of the first channel can be considered to be an arbitrary point along the merged first channel and shelf region. In another embodiment, the droplet source region includes a step region, which provides a spatial displacement and allows the liquid to expand in more than one dimension. The spatial displacement may be upward or downward or both relative to the channel. The choice of direction may be made based on the relative density of the dispersed and continuous phases, with an upward step employed when the dispersed phase is less dense than the continuous phase and a downward step employed when the dispersed phase is denser than the continuous phase. Droplet source regions may also include combinations of a shelf and a step region, e.g., with the shelf region disposed between the channel and the step region. Exemplary devices of this embodiment are described in WO 2019/040637, the droplet forming devices of which are hereby incorporated by reference.

Without wishing to be bound by theory, droplets of a first liquid can be formed in a second liquid in the devices of the invention by flow of the first liquid from the distal end into the droplet source region. In embodiments with a shelf region and a step region, the stream of first liquid expands laterally into a disk-like shape in the shelf region. As the stream of first liquid continues to flow across the shelf region, the stream passes into the step region wherein the droplet assumes a more spherical shape and eventually detaches from the liquid stream. As the droplet is forming, passive flow of the continuous phase around the nascent droplet occurs, e.g., into the shelf region, where it reforms the continuous phase as the droplet separates from its liquid stream. Droplet formation by this mechanism can occur without externally driving the continuous phase, unlike in other systems. It will be understood that the continuous phase may be externally driven during droplet formation, e.g., by gently stirring or vibration but such motion is not necessary for droplet formation.

In these embodiments, the size of the generated droplets is significantly less sensitive to changes in liquid properties. For example, the size of the generated droplets is less sensitive to the dispersed phase flow rate. Adding multiple source regions is also significantly easier from a layout and manufacturing standpoint. The addition of further source regions allows for formation of droplets even in the event that one droplet source region becomes blocked. Droplet formation can be controlled by adjusting one or more geometric features of fluidic channel architecture, such as a width, height, and/or expansion angle of one or more fluidic channels. For example, droplet size and speed of droplet formation may be controlled. In some instances, the number of regions of formation at a driven pressure can be increased to increase the throughput of droplet formation.

Passive flow of the continuous phase may occur simply around the nascent droplet. The droplet or particle source region may also include one or more channels that allow for flow of the continuous phase to a location between the distal end of the first channel and the bulk of the nascent droplet. These channels allow for the continuous phase to flow behind a nascent droplet, which modifies (e.g., increase or decreases) the rate of droplet formation. Such channels may be fluidically connected to a reservoir of the droplet or particle source region or to different reservoirs of the continuous phase. Although externally driving the continuous phase is not necessary, external driving may be employed, e.g., to pump continuous phase into the droplet or particle source region via additional channels. Such additional channels may be to one or both lateral sides of the nascent droplet or above or below the plane of the nascent droplet.

In general, the components of a device, e.g., channels, may have certain geometric features that at least partly determine the sizes of the droplets. For example, any of the channels described herein have a depth, a height, $h_0$, and width, w. The droplet or particle source region may have an expansion angle, $\alpha$. Droplet size may decrease with increasing expansion angle. The resulting droplet radius, $R_d$, may be predicted by the following equation for the aforementioned geometric parameters of $h_0$, w, and $\alpha$:

$$R_d \approx 0.44\left(1 + 2.2\sqrt{\tan \alpha}\,\frac{w}{h_0}\right)\frac{h_0}{\sqrt{\tan \alpha}}$$

As a non-limiting example, for a channel with w=21 μm, h=21 μm, and $\alpha$=3°, the predicted droplet size is 121 μm. In another example, for a channel with w=25 μm, h=25 μm, and $\alpha$=5°, the predicted droplet size is 123 μm. In yet another example, for a channel with w=28 μm, h=28 μm, and $\alpha$=7°, the predicted droplet size is 124 μm. In some instances, the expansion angle may be between a range of from about 0.5° to about 4°, from about 0.1° to about 10°, or from about 0° to about 90°. For example, the expansion angle can be at least about 0.01°, 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, or higher. In some instances, the expansion angle can be at most about 89°, 88°, 87°, 86°, 85°, 84°, 83°, 82°, 81°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, 0.1°, 0.01°, or less.

The depth and width of the first channel may be the same, or one may be larger than the other, e.g., the width is larger than the depth, or first depth is larger than the width. In some embodiments, the depth and/or width is between about 0.1 μm and 1000 μm. In some embodiments, the depth and/or width of the first channel is from 1 to 750 µm, 1 to 500 µm, 1 to 250 µm, 1 to 100 µm, 1 to 50 µm, or 3 to 40 µm. In some cases, when the width and length differ, the ratio of the width to depth is, e.g., from 0.1 to 10, e.g., 0.5 to 2 or greater than 3, such as 3 to 10, 3 to 7, or 3 to 5. The width and depths of the first channel may or may not be constant over its length. In particular, the width may increase or decrease adjacent the distal end. In general, channels may be of any suitable cross section, such as a rectangular, triangular, or circular, or a combination thereof. In particular embodiments, a channel may include a groove along the bottom surface. The width or depth of the channel may also increase or decrease, e.g., in discrete portions, to alter the rate of flow of liquid or particles or the alignment of particles.

Devices of the invention may also include additional channels that intersect the first channel between its proximal and distal ends, e.g., one or more second channels having a second depth, a second width, a second proximal end, and a second distal end that intersects the first channel between the first proximal and first distal ends. In some embodiments, the second channel may include the crosslinked fluorocarbon surface coating as described below.

Each of the first proximal end and second proximal ends are or are configured to be in fluid communication with, e.g., fluidically connected to, a source of liquid, e.g., a reservoir integral to the device or coupled to the device, e.g., by tubing. For example, the second channel may include a second reservoir in fluid communication with the second proximal end. The inclusion of one or more intersection channels allows for splitting liquid from the first channel or introduction of liquids into the first channel, e.g., that combine with the liquid in the first channel or do not combine with the liquid in the first channel, e.g., to form a sheath flow. Channels can intersect the first channel at any suitable angle, e.g., between 5° and 135° relative to the centerline of the first channel, such as between 75° and 115° or 85° and 95°. Additional channels may similarly be present to allow introduction of further liquids or additional flows of the same liquid. Multiple channels can intersect the first channel on the same side or different sides of the first channel. When multiple channels intersect on different sides, the channels may intersect along the length of the first channel to allow liquid introduction at the same point. Alternatively, channels may intersect at different points along the length of the first channel. In some instances, a channel configured to direct a liquid comprising a plurality of particles may comprise one or more grooves in one or more surface of the channel to direct the plurality of particles towards the droplet formation fluidic connection. For example, such guidance may increase single occupancy rates of the generated droplets or particles. These additional channels may have any of the structural features discussed above for the first channel.

Devices may include multiple first channels, e.g., to increase the rate of droplet or particle formation. In general, throughput may significantly increase by increasing the number of droplet or particle source regions of a device. For example, a device having five droplet or particle source regions may generate five times as many droplets or particles than a device having one droplet or particle source region, provided that the liquid flow rate is substantially the same. A device may have as many droplet or particle source regions as is practical and allowed for the size of the source of liquid, e.g., reservoir. For example, the device may have at least about 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000 or more droplet or particle source regions. Inclusion of multiple droplet or particle source regions may require the inclusion of channels that traverse but do not intersect, e.g., the flow path is in a different plane. Multiple first channel may be in fluid communication with, e.g., fluidically connected to, a separate source reservoir and/or a separate droplet or particle source region. In other embodiments, two or more first channels are in fluid communication with, e.g., fluidically connected to, the same fluid source, e.g., where the multiple first channels branch from a single, upstream channel. The droplet or particle source region may include a plurality of inlets in fluid communication with the first proximal end and a plurality of outlets (e.g., plurality of outlets in fluid communication with a collection region) (e.g., fluidically connected to the first proximal end and in fluid communication with a plurality of outlets). The number of inlets and the number of outlets in the droplet or particle source region may be the same (e.g., there may be 3-10 inlets and/or 3-10 outlets). Alternatively or in addition, the throughput of droplet or particle formation can be increased by increasing the flow rate of the first liquid. In some cases, the throughput of droplet or particle formation can be increased by having a plurality of single droplet or particle forming devices, e.g., devices with a first channel and a droplet or particle source region, in a single device, e.g., parallel droplet or particle formation.

The width of a shelf region may be from 0.1 µm to 1000 µm. In particular embodiments, the width of the shelf is from 1 to 750 µm, 10 to 500 µm, 10 to 250 µm, or 10 to 150 µm. The width of the shelf region may be constant along its length, e.g., forming a rectangular shape. Alternatively, the width of the shelf region may increase along its length away from the distal end of the first channel. This increase may be linear, nonlinear, or a combination thereof. In certain embodiments, the shelf widens 5% to 10,000%, e.g., at least 300%, (e.g., 10% to 500%, 100% to 750%, 300% to 1000%, or 500% to 1000%) relative to the width of the distal end of the first channel. The depth of the shelf can be the same as or different from the first channel. For example, the bottom of the first channel at its distal end and the bottom of the shelf region may be coplanar. Alternatively, a step or ramp may be present where the distal end meets the shelf region. The depth of the distal end may also be greater than the shelf region, such that the first channel forms a notch in the shelf region. The depth of the shelf may be from 0.1 to 1000 µm, e.g., 1 to 750 µm, 1 to 500 µm, 1 to 250 µm, 1 to 100 µm, 1 to 50 µm, or 3 to 40 µm. In some embodiments, the depth is substantially constant along the length of the shelf. Alternatively, the depth of the shelf slopes, e.g., downward or upward, from the distal end of the liquid channel to the step region. The final depth of the sloped shelf may be, for example, from 5% to 1000% greater than the shortest depth, e.g., 10 to 750%, 10 to 500%, 50 to 500%, 60 to 250%, 70 to 200%, or 100 to 150%. The overall length of the shelf region may be from at least about 0.1 µm to about 1000 µm, e.g., 0.1 to 750 µm, 0.1 to 500 µm, 0.1 to 250 µm, 0.1 to 150 µm, 1 to 150 µm, 10 to 150 µm, 50 to 150 µm, 100 to 150 µm, 10 to 80 µm, or 10 to 50 µm. In certain embodiments, the lateral walls of the shelf region, i.e., those defining the width, may be not parallel to one another. In other embodiments, the walls of the shelf region may be narrower from the distal end of the first channel towards the step region. For example, the width of the shelf region adjacent the distal end of the first channel may be sufficiently large to support droplet formation. In other embodiments, the shelf region is not substantially rectangular, e.g., not rectangular or not rectangular with rounded or chamfered corners.

A step region includes a spatial displacement (e.g., depth). Typically, this displacement occurs at an angle of approximately 90°, e.g., between 85° and 95°. Other angles are possible, e.g., 10-90°, e.g., 20 to 90°, 45 to 90°, or 70 to 90°. The spatial displacement of the step region may be any suitable size to be accommodated on a device, as the ultimate extent of displacement does not affect performance of the device. Preferably the displacement is several times the diameter of the droplet being formed. In certain embodiments, the displacement is from about 1 µm to about 10 cm, e.g., at least 10 µm, at least 40 µm, at least 100 µm, or at least 500 µm, e.g., 40 µm to 600 µm. In some embodiments, the displacement is at least 40 µm, at least 45 µm, at least 50 µm, at least 55 µm, at least 60 µm, at least 65 µm, at least 70 µm, at least 75 µm, at least 80 µm, at least 85 µm, at least 90 µm, at least 95 µm, at least 100 µm, at least 110 µm, at least 120 µm, at least 130 µm, at least 140 µm, at least 150 µm, at least 160 µm, at least 170 µm, at least 180 µm, at least 190 µm, at least 200 µm, at least 220 µm, at least 240 µm, at least 260 µm, at least 280 µm, at least 300 µm, at least 320 µm, at least 340 µm, at least 360 µm, at least 380 µm, at least 400 µm, at least 420 µm, at least 440 µm, at least 460 µm, at least 480 µm, at least 500 µm, at least 520 µm, at least 540 µm, at least 560 µm, at least 580 µm, or at least 600 µm. In some cases, the depth of the step region is substantially constant. Alternatively, the depth of the step region may increase away from the shelf region, e.g., to allow droplets that sink or float to roll away from the spatial displacement as they are formed. The step region may also increase in depth in two dimensions relative to the shelf region, e.g., both above and below the plane of the shelf region. The step region may have an inlet and/or an outlet for the addition of continuous phase, flow of continuous phase, or removal of the continuous phase and/or droplets.

While dimension of the devices may be described as width or depths, the channels, shelf regions, and step regions may be disposed in any plane. For example, the width of the shelf may be in the x-y plane, the x-z plane, the y-z plane or any plane therebetween. In addition, a droplet source region, e.g., including a shelf region, may be laterally spaced in the x-y plane relative to the first channel or located above or below the first channel. Similarly, a droplet source region, e.g., including a step region, may be laterally spaced in the x-y plane, e.g., relative to a shelf region or located above or below a shelf region. The spatial displacement in a step region may be oriented in any plane suitable to allow the nascent droplet to form a spherical shape. The fluidic components may also be in different planes so long as connectivity and other dimensional requirements are met.

In some cases, devices of the invention include a collection region, e.g., a volume for collecting formed droplets or particles. A collection region may be a reservoir that houses continuous phase or can be any other suitable structure, e.g., a channel, a shelf, or a cavity, on or in the device. For reservoirs or other elements used in collection, the walls may be smooth and not include an orthogonal element that would impede droplet or particle movement. For example, the walls may not include any feature that at least in part protrudes or recedes from the surface. It will be understood, however, that such elements may have a ceiling or floor. The droplets or particles that are formed may be moved out of the path of the next droplet or particle being formed by gravity (either upward or downward depending on the relative density of the droplet or particle and continuous phase). Alternatively or in addition, formed droplets or particles may be moved out of the path of the next droplet or particle being formed by an external force applied to the liquid in the collection region, e.g., gentle stirring, flowing continuous phase, or vibration. Similarly, a reservoir for liquids to flow in additional channels, such as those intersecting the first channel may be present. A single reservoir may also be connected to multiple channels in a device, e.g., when the same liquid is to be introduced at two or more different locations in the device. Waste reservoirs or overflow reservoirs may also be included to collect waste or overflow when droplets or particles are formed. Alternatively, the device may be configured to mate with sources of the liquids, which may be external reservoirs such as vials, tubes, or pouches. Similarly, the device may be configured to mate with a separate component that houses the reservoirs. Reservoirs may be of any appropriate size, e.g., to hold 10 µL to 500 mL, e.g., 10 µL to 300 mL, 25 µL to 10 mL, 100 µL to 1 mL, 40 µL to 300 µL, 1 mL to 10 mL, or 10 mL to 50 mL. When multiple reservoirs are present, each reservoir may have the same or a different size.

In addition to the components discussed above, devices of the invention can include additional components. In some cases, the microfluidic systems described herein may comprise one or more liquid flow units to direct the flow of one or more liquids, such as the aqueous liquid and/or the second liquid immiscible with the aqueous liquid. In some instances, the liquid flow unit may comprise a compressor to provide positive pressure at an upstream location to direct the liquid from the upstream location to flow to a downstream location. In some instances, the liquid flow unit may comprise a pump to provide negative pressure at a downstream location to direct the liquid from an upstream location to flow to the downstream location. In some instances, the liquid flow unit may comprise both a compressor and a pump, each at different locations. In some instances, the liquid flow unit may comprise different devices at different locations. The liquid flow unit may comprise an actuator. In some instances, where the second liquid is substantially stationary, the reservoir may maintain a constant pressure field at or near each droplet or particle source region. Devices may also include various valves to control the flow of liquids along a channel or to allow introduction or removal of liquids or droplets or particles from the device. Suitable valves are known in the art. Valves useful for a device of the present invention include diaphragm valves, solenoid valves, pinch valves, or a combination thereof. Valves can be controlled manually, electrically, magnetically, hydraulically, pneumatically, or by a combination thereof. The device may also include integral liquid pumps or be connectable to a pump to allow for pumping in the first channels and any other channels requiring flow. Examples of pressure pumps include syringe, peristaltic, diaphragm pumps, and sources of vacuum. Other pumps can employ centrifugal or electrokinetic forces. Alternatively, liquid movement may be controlled by gravity, capillarity, or surface treatments. Multiple pumps and mechanisms for liquid movement may be employed in a single device. The device may also include one or more vents to allow pressure equalization, and one or more filters to remove particulates or other undesirable components from a liquid. The device may also include one or more inlets and or outlets, e.g., to introduce liquids and/or remove droplets or particles. Such additional components may be actuated or monitored by one or more controllers or computers operatively coupled to the device, e.g., by being integrated with, physically connected to (mechanically or electrically), or by wired or wireless connection.

Alternatively or in addition to controlling droplet or particle formation via microfluidic channel geometry, droplet or particle formation may be controlled using one or more piezoelectric elements. Piezoelectric elements may be positioned inside a channel (i.e., in contact with a fluid in the channel), outside the channel (i.e., isolated from the fluid), or a combination thereof. In some cases, the piezoelectric element may be at the exit of a channel, e.g., where the channel connects to a reservoir or other channel that serves as a droplet or particle generation point. For example, the piezoelectric element may be integrated with the channel or coupled or otherwise fastened to the channel. Examples of fastenings include, but are not limited to, complementary threading, form-fitting pairs, hooks and loops, latches, threads, screws, staples, clips, clamps, prongs, rings, brads, rubber bands, rivets, grommets, pins, ties, snaps, adhesives (e.g., glue), tapes, vacuum, seals, magnets, soldering, or a combination thereof. In some instances, piezoelectric material can be deposited on the chip. In some instances, the piezoelectric element can be built into the channel. Alternatively or in addition, the piezoelectric element may be connected to a reservoir or channel or may be a component of a reservoir or channel, such as a wall. In some cases, the piezoelectric element may further include an aperture therethrough such that liquids can pass upon actuation of the piezoelectric element, or the device may include an aperture operatively coupled to the piezoelectric element.

The piezoelectric element can have various shapes and sizes. The piezoelectric element may have a shape or cross-section that is circular, triangular, square, rectangular, or partial shapes or combination of shapes thereof. The piezoelectric element can have a thickness from about 100 femtometers (fm) to about 100 millimeters (mm). The piezoelectric element can have a dimension (e.g., cross-section) of at least about 1 mm. The piezoelectric element can be formed of, for example, lead zirconate titanate, zinc oxide, barium titanate, potassium niobate, sodium tungstate, Ba2NaNb5O5, and Pb2KNb5O15. The piezoelectric element, for example, can be a piezo crystal. The piezoelectric element may contract when a voltage is applied and return to its original state when the voltage is unapplied. Alternatively, the piezoelectric element may expand when a voltage is applied and return to its original state when the voltage is unapplied. Alternatively or in addition, application of a voltage to the piezoelectric element can cause mechanical stress, vibration, bending, deformation, compression, decompression, expansion, and/or a combination thereof in its structure, and vice versa (e.g., applying some form of mechanical stress or pressure on the piezoelectric element may produce a voltage). In some instances, the piezoelectric element may include a composite of both piezoelectric material and non-piezoelectric material. Interdigital transducers (IDTs) can be also patterned on top of piezoelectric element to generate an acoustic wave at a certain frequency, depending on the size and distance of the fingers on the IDTs.

In some instances, the piezoelectric element may be in a first state when no electrical charge is applied, e.g., an equilibrium state. When an electrical charge is applied to the piezoelectric element, the piezoelectric element may bend backwards, pulling a part of the first channel outwards, and drawing in more of the first fluid into the first channel via negative pressure, such as from a reservoir of the first fluid. When the electrical charge is altered, the piezoelectric element may bend in another direction (e.g., inwards towards the contents of the channel), pushing a part of the first channel inwards, and propelling (e.g., at least partly via displacement) a volume of the first fluid, thereby generating a droplet of the first fluid in a second fluid. After the droplet is propelled, the piezoelectric element may return to the first state. The cycle can be repeated to generate more droplets or particles. In some instances, each cycle may generate a plurality of droplets or particles (e.g., a volume of the first fluid propelled breaks off as it enters the second fluid to form a plurality of discrete droplets). A plurality of droplets or particles can be collected in a second channel for continued transportation to a different location (e.g., reservoir), direct harvesting, and/or storage.

While the above non-limiting example describes bending of the piezoelectric element in response to application of an electrical charge, the piezoelectric may undergo or experience vibration, bending, deformation, compression, decompression, expansion, other mechanical stress and/or a combination thereof upon application of an electrical charge, which movement may be translated to the first channel.

In some cases, a channel may include a plurality of piezoelectric elements working independently or cooperatively to achieve the desired formation (e.g., propelling) of droplets or particles. For example, a first channel of a device can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, a separate piezoelectric element may be operatively coupled to (or be integrally part of) each side wall of a channel. In another example, multiple piezoelectric elements may be positioned adjacent to one another along an axis parallel to the direction of flow in the first channel. Alternatively or in addition, multiple piezoelectric elements may circumscribe the first channel. For example, a plurality of piezoelectric elements may each be in electrical communication with the same controller or one or more different controllers. The throughput of droplet or particle generation can be increased by increasing the points of generation, such as increasing the number of junctions between first fluid channels and the second fluid channel. For example, each of the first fluid channels may comprise a piezoelectric element for controlled droplet or particle generation at each point of generation. The piezoelectric element may be actuated to facilitate droplet or particle formation and/or flow of the droplets or particles.

The frequency of application of electrical charge to the piezoelectric element may be adjusted to control the speed of droplet or particle generation. For example, the frequency of droplet or particle generation may increase with the frequency of alternating electrical charge. Additionally, the material of the piezoelectric element, number of piezoelectric elements in the channel, the location of the piezoelectric elements, strength of the electrical charge applied, hydrodynamic forces of the respective fluids, and other factors may be adjusted to control droplet or particle generation and/or size of the droplets or particles generated. For example, without wishing to be bound by a particular theory, if the strength of the electrical charge applied is increased, the mechanical stress experienced by the piezoelectric element may be increased, which can increase the impact on the structural deformation of the first channel, increasing the volume of the first fluid propelled, resulting in an increased droplet or particle size.

In a non-limiting example, the first channel can carry a first fluid (e.g., aqueous) and the second channel can carry a second fluid (e.g., oil) that is immiscible with the first fluid. The two fluids can communicate at a junction. In some instances, the first fluid in the first channel may include suspended particles. The particles may be supports, biological particles, cells, cell beads, or any combination thereof (e.g., a combination of supports and cells or a combination of supports and cell beads, etc.). A discrete droplet generated may include a particle, such as when one or more particles are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel includes a plurality of biological particles.

Alternatively or in addition, one or more piezoelectric elements may be used to control droplet formation acoustically.

The piezoelectric element may be operatively coupled to a first end of a buffer substrate (e.g., glass). A second end of the buffer substrate, opposite the first end, may include an acoustic lens. In some instances, the acoustic lens can have a spherical, e.g., hemispherical, cavity. In other instances, the acoustic lens can be a different shape and/or include one or more other objects for focusing acoustic waves. The second end of the buffer substrate and/or the acoustic lens can be in contact with the first fluid in the first channel. Alternatively, the piezoelectric element may be operatively coupled to a part (e.g., wall) of the first channel without an intermediary substrate. The piezoelectric element can be in electrical communication with a controller. The piezoelectric element can be responsive to (e.g., excited by) an electric voltage driven at RF frequency. In some embodiments, the piezoelectric element can be made from zinc oxide (ZnO).

The frequency that drives the electric voltage applied to the piezoelectric element may be from about 5 to about 300 megahertz (MHz), e.g., about 5 MHz, about 6 MHz, about 7 MHz, about MHz, about 9 MHz, about 10 MHz, about 20 MHz, about 30 MHz, about 40 MHz, about 50 MHz, about 60 MHz, about 70 MHz, about 80 MHz, about 90 MHz, about 100 MHz, about 110 MHz, about 120 MHz, about 130 MHz, about 140 MHz, about 150 MHz, about 160 MHz, about 170 MHz, about 180 MHz, about 190 MHz, about 200 MHz, about 210 MHz, about 220 MHz, about 230 MHz, about 240 MHz, about 250 MHz, about 260 MHz, about 270 MHz, about 280 MHz, about 290 MHz, or about 300 MHz. Alternatively, the RF energy may have a frequency range of less than about 5 MHz or greater than about 300 MHz. As will be appreciated, the necessary voltage and/or the RF frequency driving the electric voltage may change with the properties of the piezoelectric element (e.g., efficiency).

Before an electric voltage is applied to a piezoelectric element, the first fluid and the second fluid may remain separated at or near the junction via an immiscible barrier. When the electric voltage is applied to the piezoelectric element, it can generate acoustic waves (e.g., sound waves) that propagate in the buffer substrate. The buffer substrate, such as glass, can be any material that can transfer acoustic waves. The acoustic lens of the buffer substrate can focus the acoustic waves towards the immiscible interface between the two immiscible fluids. The acoustic lens may be located such that the interface is located at the focal plane of the converging beam of the acoustic waves. Upon impact of the sound burst on the barrier, the pressure of the acoustic waves may cause a volume of the first fluid to be propelled into the second fluid, thereby generating a droplet or particle of the volume of the first fluid in the second fluid. In some instances, each propelling may generate a plurality of droplets or particles (e.g., a volume of the first fluid propelled breaks off as it enters the second fluid to form a plurality of discrete droplets or particles). After ejection of the droplet or particle, the immiscible interface can return to its original state. Subsequent applications of electric voltage to the piezoelectric element can be repeated to subsequently generate more droplets or particles. A plurality of droplets or particles can be collected in the second channel for continued transportation to a different location (e.g., reservoir), direct harvesting, and/or storage. Beneficially, the droplets or particles generated can have substantially uniform size, velocity (when ejected), and/or directionality.

In some cases, a device may include a plurality of piezoelectric elements working independently or cooperatively to achieve the desired formation (e.g., propelling) of droplets or particles. For example, the first channel can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, multiple piezoelectric elements may be positioned adjacent to one another along an axis parallel of the first channel. Alternatively or in addition, multiple piezoelectric elements may circumscribe the first channel. In some instances, the plurality of piezoelectric elements may each be in electrical communication with the same controller or one or more different controllers. The plurality of piezoelectric elements may each transmit acoustic waves from the same buffer substrate or one or more different buffer substrates. In some instances, a single buffer substrate may comprise a plurality of acoustic lenses at different locations.

In some instances, the first channel may be in communication with a third channel. The third channel may carry the first fluid to the first channel such as from a reservoir of the first fluid. The third channel may include one or more piezoelectric elements, for example, as described herein in the described devices. As described elsewhere herein, the third channel may carry first fluid with one or more particles (e.g., supports, biological particles, etc.) and/or one or more reagents suspended in the fluid. Alternatively or in addition, the device may include one or more other channels communicating with the first channel and/or the second channel.

The number and duration of electric voltage pulses applied to the piezoelectric element may be adjusted to control the speed of droplet or particle generation. For example, the frequency of droplet or particle generation may increase with the number of electric voltage pulses. Additionally, the material and size of the piezoelectric element, material and size of the buffer substrate, material, size, and shape of the acoustic lens, number of piezoelectric elements, number of buffer substrates, number of acoustic lenses, respective locations of the one or more piezoelectric elements, respective locations of the one or more buffer substrates, respective locations of the one or more acoustic lenses, dimensions (e.g., length, width, height, expansion angle) of the respective channels, level of electric voltage applied to the piezoelectric element, hydrodynamic forces of the respective fluids, and other factors may be adjusted to control droplet or particle generation speed and/or size of the droplets or particles generated.

A discrete droplet generated may include a particle, such as when one or more supports are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel further includes a suspension of a plurality of biological particles.

In some cases, the droplets or particles formed using a piezoelectric element may be collected in a collection region that is disposed below the droplet or particle generation point. The collection region may be configured to hold a source of fluid to keep the formed droplets or particles isolated from one another. The collection region used after piezoelectric or acoustic element-assisted droplet or particle formation may contain an oil that is continuously circulated, e.g., using a paddle mixer, conveyor system, or a magnetic stir bar. Alternatively, the collection region may contain one or more reagents for chemical reactions that can provide a coating on the droplets or particles to ensure isolation, e.g., polymerization, e.g., thermal- or photo-initiated polymerization.

In addition to the components discussed above, devices of the invention can include additional components. For example, channels may include filters to prevent introduction of debris into the device. In some cases, the microfluidic systems described herein may comprise one or more liquid flow units to direct the flow of one or more liquids, such as the aqueous liquid and/or the second liquid immiscible with the aqueous liquid. In some instances, the liquid flow unit may comprise a compressor to provide positive pressure at an upstream location to direct the liquid from the upstream location to flow to a downstream location. In some instances, the liquid flow unit may comprise a pump to provide negative pressure at a downstream location to direct the liquid from an upstream location to flow to the downstream location. In some instances, the liquid flow unit may comprise both a compressor and a pump, each at different locations. In some instances, the liquid flow unit may comprise different devices at different locations. The liquid flow unit may comprise an actuator. In some instances, where the second liquid is substantially stationary, the reservoir may maintain a constant pressure field at or near each droplet formation region. Devices may also include various valves to control the flow of liquids along a channel or to allow introduction or removal of liquids or droplets from the device. Suitable valves are known in the art. Valves useful for a device of the present invention include diaphragm valves, solenoid valves, pinch valves, or a combination thereof. Valves can be controlled manually, electrically, magnetically, hydraulically, pneumatically, or by a combination thereof. The device may also include integral liquid pumps or be connectable to a pump to allow for pumping in the first channels and any other channels requiring flow. Examples of pressure pumps include syringe, peristaltic, diaphragm pumps, and sources of vacuum. Other pumps can employ centrifugal or electrokinetic forces. Alternatively, liquid movement may be controlled by gravity, capillarity, or surface treatments. Multiple pumps and mechanisms for liquid movement may be employed in a single device. The device may also include one or more vents to allow pressure equalization, and one or more filters to remove particulates or other undesirable components from a liquid. The device may also include one or more inlets and or outlets, e.g., to introduce liquids and/or remove droplets. Such additional components may be actuated or monitored by one or more controllers or computers operatively coupled to the device, e.g., by being integrated with, physically connected to (mechanically or electrically), or by wired or wireless connection.

Surface Properties

A surface of the device may include a material, coating, or surface texture that determines the physical properties of the device. In particular, the flow of liquids through a device of the invention may be controlled by the device surface properties (e.g., wettability of a liquid-contacting surface). In some cases, a device portion (e.g., a channel) may have a surface having a wettability suitable for facilitating liquid flow (e.g., in a channel) or assisting droplet formation of a first liquid in a second liquid (e.g., in a channel), e.g., if droplet formation is performed.

Wetting, which is the ability of a liquid to maintain contact with a solid surface, may be measured as a function of a water contact angle. A water contact angle of a material can be measured by any suitable method known in the art, such as the static sessile drop method, pendant drop method, dynamic sessile drop method, dynamic Wilhelmy method, single-fiber Wilhelmy method, single-fiber meniscus method, and Washburn's equation capillary rise method. The wettability of each surface may be suited to producing droplets of a first liquid in a second liquid.

For example, portions of the device carrying aqueous phases (e.g., a channel) may have a surface material or coating that is hydrophilic or more hydrophilic than another portion of the device, e.g., include a material or coating having a water contact angle of less than or equal to about 90°, and/or the exterior of the device around the channel may have a surface material or coating that is hydrophobic or more hydrophobic than the channel, e.g., include a material or coating having a water contact angle of greater than 70° (e.g., greater than 90°, greater than 95°, greater than 100° (e.g., 95°-120° or 100°-10°)). In certain embodiments, portions of the device may include a material or surface coating that reduces or prevents wetting by aqueous phases. The device can be designed to have a single type of material or coating throughout. For example, the device can be designed to have a singly type of material or coating having the structure of Formula I as described above. Alternatively, the device may have separate regions having different materials or coatings. Surface textures may also be employed to control fluid flow.

The device surface properties may be those of a native surface (i.e., the surface properties of the bulk material used for the device fabrication) or of a surface treatment. Non-limiting examples of surface treatments include, e.g., surface coatings and surface textures. In some embodiments, the surface coating may have a total fluorine weight percent of about 57-70%. As a non-limiting example, the surface may include a fluorocarbon surface coating having the moiety of VII:

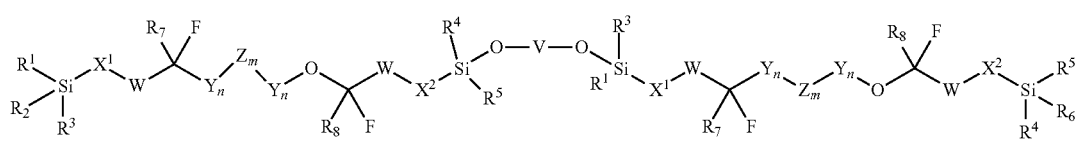

(VII)

in which, each Y is independently $C_1$-$C_7$ fluoroalkylene or $C_1$-$C_7$ heterofluoroalkylene, each n is independently 0, 1, 2, 3, 4, 5, 6, or 7, each Z is independently —$OR^9$— or —$R^9$—, wherein $R^9$ is $C_1$-$C_6$ perfluoroalkylene, m is 1, 2, 3, 4, 5, or 6, each W is independently —C(O)NR$_a$—, —NR$_a$C(O)—, —C(O)O—, —OC(O)—, —C(O)S—, —SC(O)—, or —O—, wherein R$_a$ is —H, C$_1$-C$_6$ perfluoroalkyl, or —F, each of R$^7$ and R$^8$ is independently F or C$_1$-C$_6$ perfluoroalkyl, and V is —(CH$_2$)$_{n'}$—C$_{1-15}$ perfluoroalkylene-(CH$_2$)$_{n'}$— or —(CH$_2$)$_{n'}$—(C$_{1-15}$ heterofluoroalkylene)$_{n'}$-(CH$_2$)$_{n'}$—, wherein each n' is independently 1, 2, 3, 4, 5, 6 or 7. Each R$_1$, R$_2$, R$_3$, R$_4$, R$_5$, or R$_6$ may be bound to one or more surfaces, e.g., device surface, or bound to another fluorocarbon polyol. In some embodiments, each R$_1$, R$_2$, R$_3$, R$_4$, R$_5$, or R$_6$ may be hydroxy. In some embodiments, at least one of the R$_1$, R$_2$, R$_3$, R$_4$, R$_5$, or R$_6$ is bound to a surface, and the remaining R$_1$, R$_2$, R$_3$, R$_4$, R$_5$, or R$_6$ are hydroxy or bound to another fluorocarbon polyol. In some embodiments, m is 1-5, such as 3. In certain embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7, or 7+6). In some embodiments, the fluorocarbon surface coating has the moiety of VIII:

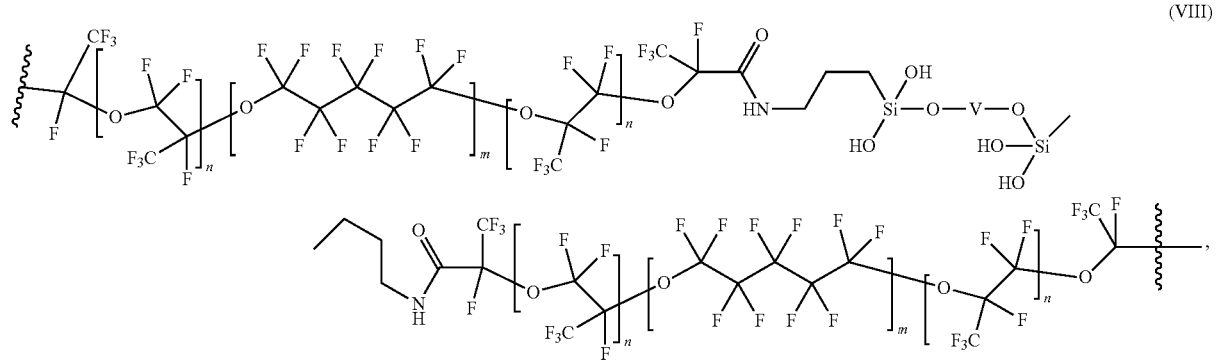

(VIII)

in which each n is 0, 1, 2, 3, 4, 5, 6, or 7, m is 1, 2, 3, 4, 5, or 6, and V is —(CH$_2$)$_{n'}$—C$_{1-15}$ perfluoroalkylene-(CH$_2$)$_{n'}$— or —(CH$_2$)$_{n'}$—(C$_{1-15}$ heterofluoroalkylene)$_{n'}$-(CH$_2$)$_{n'}$—, wherein each n' is independently 1, 2, 3, 4, 5, 6 or 7. In some embodiments, m is 1-5, such as 3. In some embodiments, n+n is 4-13, e.g., 7-13, such as 4 (e.g., 1+3, 2+2, or 3+1), 5 (e.g., 1+4, 2+3, 3+2, or 4+1), 6 (e.g., 1+5, 2+4, 3+3, 4+2, or 5+1), 7 (e.g., 1+6, 2+5, 3+4, 4+3, 5+2, or 6+1), 8 (e.g., 1+7, 2+6, 3+5, 4+4, 5+3, 6+2, or 7+1), 9 (e.g., 2+7, 3+6, 4+5, 5+4, 6+3, or 7+2), 10 (e.g., 4+5, 5+5, 6+4, or 7+3), 11 (e.g., 4+7, 5+6, 6+5, or 7+4), 12 (e.g., 5+7, 6+6, or 7+5), or 13 (e.g., 6+7, or 7+6). For example, n+n is 7 when the fluorocarbon surface coating has the moiety IX:

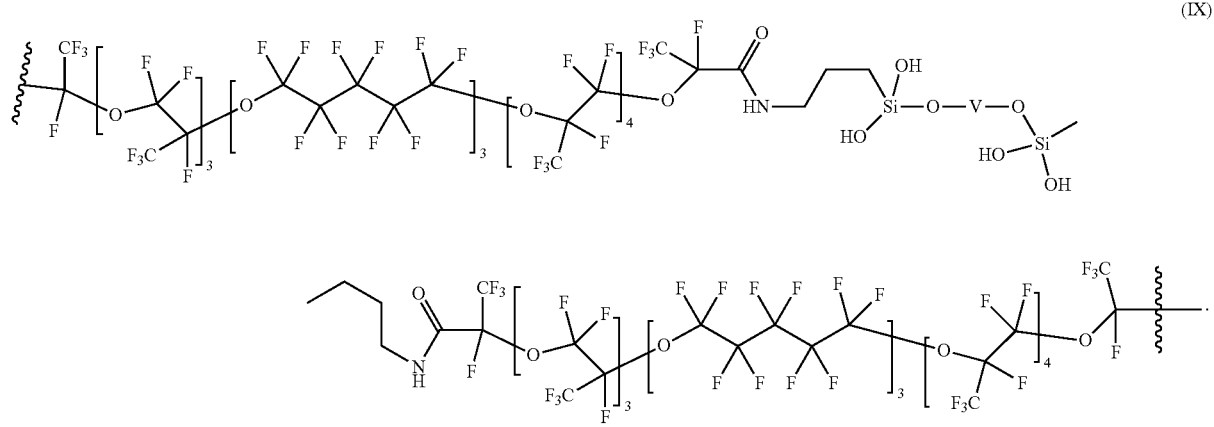

(IX)

The invention also features a method of coating a surface by contacting the surface with a mixture of the fluorocarbon silane and the fluorocarbon polyol. In one embodiment, the fluorocarbon silane and the fluorocarbon polyol are mixed and allowed to react for a period of time, such as 1-60 minutes (e.g., about 1, 2, 3, 4, 5, 6, 7, 8, 9, 10, 11, 12, 13, 14, 15, 16, 17, 18, 19, 20, 21, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes), 1-24 hours (e.g., about 1, 2, 3, 4, 5, 6, 7, 8, 9, 10, 11, 12, 13, 14, 15, 16, 17, 18, 19, 20, 21, 22, 23, or 24 hours), or 1-7 days (e.g., 1, 2, 3, 4, 5, 6, or 7 days), prior to contacting the surface. For example, a fluorocarbon silane and fluorocarbon polyol may be reacted, and a period of time of 1 day may lapse prior to contacting the surface with the reacted fluorocarbon polyol and fluorocarbon silane. The surface typically contains hydroxyl groups for reaction with the silane. Such hydroxyl groups may be native or introduced chemically, e.g., by plasma treatment or chemical reaction. The mixture may contact the surface for a period of time to allow for coating, e.g., 1-60 minutes (e.g., about 1, 2, 3, 4, 5, 6, 7, 8, 9, 10, 11, 12, 13, 14, 15, 16, 17, 18, 19, 20, 21, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes), 1-24 hours (e.g., about 1, 2, 3, 4, 5, 6, 7, 8, 9, 10, 11, 12, 13, 14, 15, 16, 17, 18, 19, 20, 21, 22, 23, or 24 hours), or 1-7 days (e.g., about 1, 2, 3, 4, 5, 6, or 7 days).

In one embodiment, the fluorocarbon polyol and the fluorocarbon silane are mixed in a ratio of 10 mol % to 180 mol %, in which "mol %," as used herein, refers to the ratio of moles of fluorocarbon polyol to moles of fluorocarbon silane. For example, the fluorocarbon silane and the fluorocarbon polyol may be mixed in a ratio of about 10 mol %, 20 mol %, 30 mol %, 40 mol %, 50 mol %, 60 mol %, 70 mol %, 80 mol %, 90 mol %, 100 mol %, 110 mol %, 120 mol %, 130 mol %, 140 mol %, 150 mol %, 160 mol %, 170 mol %, or 180 mol %. In some embodiments, the fluorocarbon polyol and the fluorocarbon silane are mixed at a ratio of 90 mol %.

In some embodiments, the fluorocarbon silane and the fluorocarbon polyol may be combined in one or more solvents capable of dissolving both the fluorocarbon silane and the fluorocarbon polyol, e.g., aprotic fluorinated solvents, such as hydrofluoroethers (HFE), or conjugate alcohols of the fluorocarbon silane. For example, the fluorocarbon silane and the fluorocarbon polyol may be dissolved in HFE-7100. In one approach, the device surface properties are attributable to one or more surface coatings present in a device portion. In some embodiments, other portions of the device include hydrophobic coatings that include fluoropolymers (e.g., AQUAPEL® glass treatment), silanes, siloxanes, silicones, or other coatings known in the art. Other coatings include those vapor deposited from a precursor such as henicosyl-1,1,2,2-tetrahydrododecyldimethyltris(dimethylaminosilane); henicosyl-1,1,2,2-tetrahydrododecyltrichlorosilane (C12); heptadecafluoro-1,1,2,2-tetrahydrodecyltrichlorosilane (C10); nonafluoro-1,1,2,2-tetrahydrohexyltris(dimethylamino)silane; 3,3,3,4,4,5,5,6,6-nonafluorohexyltrichlorosilane; tridecafluoro-1,1,2,2-tetrahydrooctyltrichlorosilane (C8); bis(tridecafluoro-1,1,2,2-tetrahydrooctyl)dimethylsiloxymethylchlorosilane; nonafluorohexyltriethoxysilane (C6); dodecyltrichlorosilane (DTS); dimethyldichlorosilane (DDMS); or 10-undecenyltrichlorosilane (V11); pentafluorophenylpropyltrichlorosilane (C5). In some embodiments, hydrophilic coatings include polymers such as polysaccharides, polyethylene glycol, polyamines, and polycarboxylic acids. Hydrophilic surfaces may also be created by oxygen plasma treatment of certain materials.

A coated surface may be formed by depositing a metal oxide onto a surface of the device. Example metal oxides useful for coating surfaces include, but are not limited to, $Al_2O_3$, $TiO_2$, $SiO_2$, or a combination thereof. Other metal oxides useful for surface modifications are known in the art. The metal oxide can be deposited onto a surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be deposited on a surface by contacting it with trimethylaluminum (TMA) and water. In some embodiments, the fluorocarbon surface coating may be the product of the reaction of any of the compounds described herein and a hydroxyl group. For example, and without limitation, one or more of the compounds described herein may react with a hydroxyl group on the surface of the device and/or portion of the device, wherein a plasma activation and/or plasma functionalization technique may be performed to form the fluorocarbon surface coating.

In another approach, the device surface properties may be attributable to surface texture. For example, a surface may have a nanotexture, e.g., have a surface with nanometer surface features, such as cones or columns, that alters the wettability of the surface. Nanotextured surface may be hydrophilic, hydrophobic, or superhydrophobic, e.g., have a water contact angle greater than 150°. Exemplary superhydrophobic materials include Manganese Oxide Polystyrene ($MnO_2$/PS) nano-composite, Zinc Oxide Polystyrene (ZnO/PS) nano-composite, Precipitated Calcium Carbonate, Carbon nano-tube structures, and a silica nano-coating. Superhydrophobic coatings may also include a low surface energy material (e.g., an inherently hydrophobic material) and a surface roughness (e.g., using laser ablation techniques, plasma etching techniques, or lithographic techniques in which a material is etched through apertures in a patterned mask). Examples of low surface energy materials include fluorocarbon materials, e.g., polytetrafluoroethylene (PTFE), fluorinated ethylene propylene (FEP), ethylene tetrafluoroethylene (ETFE), ethylene chloro-trifluoroethylene (ECTFE), perfluoro-alkoxyalkane (PFA), poly(chloro-trifluoroethylene) (CTFE), perfluoro-alkoxyalkane (PFA), and poly(vinylidene fluoride) (PVDF). Other superhydrophobic surfaces are known in the art.

In some cases, the water contact angle of a hydrophilic or more hydrophilic material or coating is less than or equal to about 90°, e.g., less than 80°, 70°, 60°, 50°, 40°, 30°, 20°, or 10°, e.g., 90°, 85°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, or 0°. In some cases, the water contact angle of a hydrophobic or more hydrophobic material or coating is at least 70°, e.g., at least 80°, at least 85°, at least 90°, at least 95°, or at least 100° (e.g., about 100°, 101°, 102°, 103°, 104°, 105°, 106°, 107°, 108°, 109°, 110°, 115°, 120°, 125°, 130°, 135°, 140°, 145°, or about 150°).

The difference in water contact angles between that of a hydrophilic or more hydrophilic material or coating and a hydrophobic or more hydrophobic material or coating may be 5° to 100°, e.g., 5° to 80°, 5° to 60°, 5° to 50°, 5° to 40°, 5° to 30°, 5° to 20°, 10° to 75°, 15° to 70°, 20° to 65°, 25° to 60°, 30 to 50°, 35° to 45°, e.g., about 5°, 6°, 7°, 8°, 9°, 10°, 15°, 20°, 25°, 30°, 35°, 40°, 45°, 50°, 55°, 60°, 65°, 70°, 75°, 80°, 85°, 90°, 95°, or 100°.

In some embodiments, the fluorocarbon surface coating creates a coated surface which is hydrophobic enough to create a water contact angle of at least 105° during droplet generation, e.g., to reduce asymmetric droplet generation. For example, the fluorocarbon surface coating may create a hydrophobic coating that produces a water contact angle of about 105° to about 150° (e.g., 105°-120°, 120°-130°, 130°-140°, or 140°-150°). The water contact angle may vary based on the concentration of the fluorocarbon surface coating applied to the device or a portion of the device (e.g., surface, channel, reservoir, etc.). For example, the water contact angle may be about 105° to about 113° when the fluorocarbon coating agent has a concentration of about 0.02 wt %. As a further example, the water contact angle may be about 109° to about 114° when the fluorocarbon surface coating agent has a concentration of about 0.05 wt %.

The above discussion centers on the water contact angle. It will be understood that liquids employed in the devices and methods of the invention may not be water, or even aqueous. Accordingly, the actual contact angle of a liquid on a surface of the device may differ from the water contact angle. Furthermore, the determination of a water contact angle of a material or coating can be made on that material or coating when not incorporated into a device of the invention.

Particles

The invention includes devices employing particles, e.g., for use in analysis. For example, particles configured with analyte moieties (e.g., barcodes, nucleic acids, binding molecules (e.g., proteins, peptides, aptamers, antibodies, or antibody fragments), enzymes, substrates, droplets, etc.) can be included in a droplet containing an analyte to modify the analyte and/or detect the presence or concentration of the analyte. In some embodiments, particles are synthetic particles (e.g., supports, e.g., gel beads).

For example, a droplet may include one or more analyte moieties, e.g., unique identifiers, such as barcodes. Analyte moieties, e.g., barcodes, may be introduced into droplets previous to, subsequent to, or concurrently with droplet formation. The delivery of the analyte moieties, e.g., barcodes, to a particular droplet allows for the later attribution of the characteristics of an individual sample (e.g., biological particle) to the particular droplet. Analyte moieties, e.g., barcodes, may be delivered, for example on a nucleic acid (e.g., an oligonucleotide), to a droplet via any suitable mechanism. Analyte moieties, e.g., barcoded nucleic acids (e.g., oligonucleotides), can be introduced into a droplet via a particle, such as a microcapsule. In some cases, analyte moieties, e.g., barcoded nucleic acids (e.g., oligonucleotides), can be initially associated with the particle (e.g., microcapsule) and then released upon application of a stimulus which allows the analyte moieties, e.g., nucleic acids (e.g., oligonucleotides), to dissociate or to be released from the particle.

A particle, e.g., a support, may be porous, non-porous, hollow (e.g., a microcapsule), solid, semi-solid, semi-fluidic, fluidic, and/or a combination thereof. In some instances, a particle, e.g., a support, may be dissolvable, disruptable, and/or degradable. In some cases, a particle, e.g., a support, may not be degradable. In some cases, the particle, e.g., a support, may be a gel bead. A gel bead may be a hydrogel bead. A gel bead may be formed from molecular precursors, such as a polymeric or monomeric species. A semi-solid particle, e.g., a support, may be a liposomal bead. Solid particles, e.g., supports, may comprise metals including iron oxide, gold, and silver. In some cases, the particle, e.g., the support, may be a silica bead. In some cases, the particle, e.g., a support, can be rigid. In other cases, the particle, e.g., a support, may be flexible and/or compressible.

A particle, e.g., a support, may comprise natural and/or synthetic materials. For example, a particle, e.g., a support, can comprise a natural polymer, a synthetic polymer or both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly (ethylene oxide), poly(ethylene terephthalate), polyethylene, polyisobutylene, poly(methyl methacrylate), poly(oxymethylene), polyformaldehyde, polypropylene, polystyrene, poly (tetrafluoroethylene), poly(vinyl acetate), poly(vinyl alcohol), poly(vinyl chloride), poly(vinylidene dichloride), poly (vinylidene difluoride), poly(vinyl fluoride) and/or combinations (e.g., co-polymers) thereof. Supports may also be formed from materials other than polymers, including lipids, micelles, ceramics, glass-ceramics, material composites, metals, other inorganic materials, and others.

In some instances, the particle, e.g., the support, may contain molecular precursors (e.g., monomers or polymers), which may form a polymer network via polymerization of the molecular precursors. In some cases, a precursor may be an already polymerized species capable of undergoing further polymerization via, for example, a chemical cross-linkage. In some cases, a precursor can comprise one or more of an acrylamide or a methacrylamide monomer, oligomer, or polymer. In some cases, the particle, e.g., the support, may comprise prepolymers, which are oligomers capable of further polymerization. For example, polyurethane beads may be prepared using prepolymers. In some cases, the particle, e.g., the support, may contain individual polymers that may be further polymerized together. In some cases, particles, e.g., supports, may be generated via polymerization of different precursors, such that they comprise mixed polymers, co-polymers, and/or block co-polymers. In some cases, the particle, e.g., the support, may comprise covalent or ionic bonds between polymeric precursors (e.g., monomers, oligomers, linear polymers), oligonucleotides, primers, and other entities. In some cases, the covalent bonds can be carbon-carbon bonds or thioether bonds.

Cross-linking may be permanent or reversible, depending upon the particular cross-linker used. Reversible cross-linking may allow for the polymer to linearize or dissociate under appropriate conditions. In some cases, reversible cross-linking may also allow for reversible attachment of a material bound to the surface of a support. In some cases, a cross-linker may form disulfide linkages. In some cases, the chemical cross-linker forming disulfide linkages may be cystamine or a modified cystamine.

Particles, e.g., supports, may be of uniform size or heterogeneous size. In some cases, the diameter of a particle, e.g., a support, may be at least about 1 micrometer (μm), 5 μm, 10 μm, 20 μm, 30 μm, 40 μm, 50 μm, 60 μm, 70 μm, 80 μm, 90 μm, 100 μm, 250 μm, 500 μm, 1 mm, or greater. In some cases, a particle, e.g., a support, may have a diameter of less than about 1 µm, 5 µm, 10 µm, 20 µm, 30 µm, 40 µm, 50 µm, 60 µm, 70 µm, 80 µm, 90 µm, 100 µm, 250 µm, 500 µm, 1 mm, or less. In some cases, a particle, e.g., a support, may have a diameter in the range of about 40-75 µm, 30-75 µm, 20-75 µm, 40-85 µm, 40-95 µm, 20-100 µm, 10-100 µm, 1-100 µm, 20-250 µm, or 20-500 µm. The size of a particle, e.g., a support, e.g., a gel bead, used to produce droplets is typically on the order of a cross section of the first channel (width or depth). In some cases, the gel beads are larger than the width and/or depth of the first channel and/or shelf, e.g., at least 1.5×, 2×, 3×, or 4× larger than the width and/or depth of the first channel and/or shelf.

In certain embodiments, particles, e.g., supports, can be provided as a population or plurality of particles, e.g., supports, having a relatively monodisperse size distribution. Where it may be desirable to provide relatively consistent amounts of reagents within droplets, maintaining relatively consistent particle, e.g., support, characteristics, such as size, can contribute to the overall consistency. In particular, the particles, e.g., supports, described herein may have size distributions that have a coefficient of variation in their cross-sectional dimensions of less than 50%, less than 40%, less than 30%, less than 20%, and in some cases less than 15%, less than 10%, less than 5%, or less.

Particles may be of any suitable shape. Examples of particles, e.g., supports, shapes include, but are not limited to, spherical, non-spherical, oval, oblong, amorphous, circular, cylindrical, and variations thereof.

A particle, e.g., support, injected or otherwise introduced into a droplet may comprise releasably, cleavably, or reversibly attached analyte moieties (e.g., barcodes). A particle, e.g., support, injected or otherwise introduced into a droplet may comprise activatable analyte moieties (e.g., barcodes). A particle, e.g., support, injected or otherwise introduced into a droplet may be a degradable, disruptable, or dissolvable particle, e.g., dissolvable bead.

Particles, e.g., supports, within a channel may flow at a substantially regular flow profile (e.g., at a regular flow rate). Such regular flow profiles can permit a droplet, when formed, to include a single particle (e.g., support) and a single cell or other biological particle. Such regular flow profiles may permit the droplets to have a dual occupancy (e.g., droplets having at least one support and at least one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. In some embodiments, the droplets have a 1:1 dual occupancy (i.e., droplets having exactly one particle (e.g., support) and exactly one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. Such regular flow profiles and devices that may be used to provide such regular flow profiles are provided, for example, in U.S. Patent Publication No. 2015/0292988, which is entirely incorporated herein by reference.

As discussed above, analyte moieties (e.g., barcodes) can be releasably, cleavably or reversibly attached to the particles, e.g., supports, such that analyte moieties (e.g., barcodes) can be released or be releasable through cleavage of a linkage between the barcode molecule and the particle, e.g., support, or released through degradation of the particle (e.g., support) itself, allowing the barcodes to be accessed or be accessible by other reagents, or both. Releasable analyte moieties (e.g., barcodes) may sometimes be referred to as activatable analyte moieties (e.g., activatable barcodes), in that they are available for reaction once released. Thus, for example, an activatable analyte moiety (e.g., activatable barcode) may be activated by releasing the analyte moiety (e.g., barcode) from a particle, e.g., support (or other suitable type of droplet described herein). Other activatable configurations are also envisioned in the context of the described methods and systems.

In addition to, or as an alternative to the cleavable linkages between the particles, e.g., supports, and the associated moieties, such as barcode containing nucleic acids (e.g., oligonucleotides), the particles, e.g., supports may be degradable, disruptable, or dissolvable spontaneously or upon exposure to one or more stimuli (e.g., temperature changes, pH changes, exposure to particular chemical species or phase, exposure to light, reducing agent, etc.). In some cases, a particle, e.g., support, may be dissolvable, such that material components of the particle, e.g., support, are degraded or solubilized when exposed to a particular chemical species or an environmental change, such as a change temperature or a change in pH. In some cases, a gel bead can be degraded or dissolved at elevated temperature and/or in basic conditions. In some cases, a particle, e.g., support, may be thermally degradable such that when the particle, e.g., support, is exposed to an appropriate change in temperature (e.g., heat), the particle, e.g., support, degrades. Degradation or dissolution of a particle (e.g., support) bound to a species (e.g., a nucleic acid, e.g., an oligonucleotide, e.g., barcoded oligonucleotide) may result in release of the species from the particle, e.g., support. As will be appreciated from the above disclosure, the degradation of a particle, e.g., support, may refer to the disassociation of a bound or entrained species from a particle, e.g., support, both with and without structurally degrading the physical particle, e.g., support, itself. For example, entrained species may be released from particles, e.g., supports, through osmotic pressure differences due to, for example, changing chemical environments. By way of example, alteration of particle, e.g., support, pore sizes due to osmotic pressure differences can generally occur without structural degradation of the particle, e.g., support, itself. In some cases, an increase in pore size due to osmotic swelling of a particle, e.g., support or microcapsule (e.g., liposome), can permit the release of entrained species within the particle. In other cases, osmotic shrinking of a particle may cause the particle, e.g., support, to better retain an entrained species due to pore size contraction.

A degradable particle, e.g., support, may be introduced into a droplet, such that the particle, e.g., support, degrades within the droplet and any associated species (e.g., nucleic acids, oligonucleotides, or fragments thereof) are released within the droplet when the appropriate stimulus is applied. The free species (e.g., nucleic acid, oligonucleotide, or fragment thereof) may interact with other reagents contained in the droplet. For example, a polyacrylamide bead comprising cystamine and linked, via a disulfide bond, to a barcode sequence, may be combined with a reducing agent within a droplet of a water-in-oil emulsion. Within the droplet, the reducing agent can break the various disulfide bonds, resulting in particle, e.g., support, degradation and release of the barcode sequence into the aqueous, inner environment of the droplet. In another example, heating of a droplet comprising a particle-, e.g., support-, bound analyte moiety (e.g., barcode) in basic solution may also result in particle, e.g., support, degradation and release of the attached barcode sequence into the aqueous, inner environment of the droplet.

Any suitable number of analyte moieties (e.g., molecular tag molecules (e.g., primer, barcoded oligonucleotide, etc.)) can be associated with a particle, e.g., support, such that, upon release from the particle, the analyte moieties (e.g., molecular tag molecules (e.g., primer, e.g., barcoded oligonucleotide, etc.)) are present in the droplet at a pre-defined concentration. Such pre-defined concentration may be selected to facilitate certain reactions for generating a sequencing library, e.g., amplification, within the droplet. In some cases, the pre-defined concentration of a primer can be limited by the process of producing oligonucleotide-bearing particles, e.g., supports.

Additional reagents may be included as part of the particles (e.g., analyte moieties) and/or in solution or dispersed in the droplet, for example, to activate, mediate, or otherwise participate in a reaction, e.g., between the analyte and analyte moiety.

Biological Samples

A droplet of the present disclosure may include biological particles (e.g., cells or particulate components thereof, e.g., organelles, such as a nucleus or a mitochondrion) and/or macromolecular constituents thereof (e.g., components of cells (e.g., intracellular or extracellular proteins, nucleic acids, glycans, or lipids) or products of cells (e.g., secretion products)). An analyte from a biological particle, e.g., component or product thereof, may be considered to be a bioanalyte. In some embodiments, a biological particle, e.g., cell, or product thereof is included in a droplet, e.g., with one or more particles (e.g., supports) having an analyte moiety. A biological particle, e.g., cell, and/or components or products thereof can, in some embodiments, be encased inside a gel, such as via polymerization of a droplet containing the biological particle and precursors capable of being polymerized or gelled.

In the case of encapsulated biological particles (e.g., cells or particulate components thereof), a biological particle may be included in a droplet that contains lysis reagents in order to release the contents (e.g., contents containing one or more analytes (e.g., bioanalytes)) of the biological particles within the droplet. In such cases, the lysis agents can be contacted with the biological particle suspension concurrently with, or immediately prior to the introduction of the biological particles into the droplet or particle source region, for example, through an additional channel or channels upstream or proximal to a second channel or a third channel that is upstream or proximal to a second droplet or particle source region. Examples of lysis agents include bioactive reagents, such as lysis enzymes that are used for lysis of different cell types, e.g., gram positive or negative bacteria, plants, yeast, mammalian, etc., such as lysozymes, achromopeptidase, lysostaphin, labiase, kitalase, lyticase, and a variety of other lysis enzymes available from, e.g., Sigma-Aldrich, Inc. (St Louis, MO), as well as other commercially available lysis enzymes. Other lysis agents may additionally or alternatively be contained in a droplet with the biological particles (e.g., cells or particulate components thereof) to cause the release of the biological particles' contents into the droplets or particles. For example, in some cases, surfactant-based lysis solutions may be used to lyse cells, although these may be less desirable for emulsion-based systems where the surfactants can interfere with stable emulsions. In some cases, lysis solutions may include non-ionic surfactants such as, for example, TRITON X-100 and TWEEN 20. In some cases, lysis solutions may include ionic surfactants such as, for example, sarcosyl and sodium dodecyl sulfate (SDS). In some embodiments, lysis solutions are hypotonic, thereby lysing cells by osmotic shock. Electroporation, thermal, acoustic or mechanical cellular disruption may also be used in certain cases, e.g., non-emulsion based droplet formation such as encapsulation of biological particles that may be in addition to or in place of droplet formation, where any pore size of the encapsulate is sufficiently small to retain nucleic acid fragments of a desired size, following cellular disruption.

In addition to the lysis agents, other reagents can also be included in droplets with the biological particles, including, for example, DNase and RNase inactivating agents or inhibitors, such as proteinase K, chelating agents, such as EDTA, and other reagents employed in removing or otherwise reducing negative activity or impact of different cell lysate components on subsequent processing of nucleic acids. In addition, in the case of encapsulated biological particles (e.g., cells or particulate components thereof), the biological particles may be exposed to an appropriate stimulus to release the biological particles or their contents from a microcapsule within a droplet. For example, in some cases, a chemical stimulus may be included in a droplet along with an encapsulated biological particle to allow for degradation of the encapsulating matrix and release of the cell or its contents into the larger droplet. In some cases, this stimulus may be the same as the stimulus described elsewhere herein for release of analyte moieties (e.g., oligonucleotides) from their respective particle (e.g., support). In alternative aspects, this may be a different and non-overlapping stimulus, in order to allow an encapsulated biological particle to be released into a droplet at a different time from the release of analyte moieties (e.g., oligonucleotides) into the same droplet.

Additional reagents may also be included in droplets with the biological particles, such as endonucleases to fragment a biological particle's DNA, DNA polymerase enzymes and dNTPs used to amplify the biological particle's nucleic acid fragments and to attach the barcode molecular tags to the amplified fragments. Other reagents may also include reverse transcriptase enzymes, including enzymes with terminal transferase activity, primers and oligonucleotides, and switch oligonucleotides (also referred to herein as "switch oligos" or "template switching oligonucleotides") which can be used for template switching. In some cases, template switching can be used to increase the length of a cDNA. In some cases, template switching can be used to append a predefined nucleic acid sequence to the cDNA. In an example of template switching, cDNA can be generated from reverse transcription of a template, e.g., cellular mRNA, where a reverse transcriptase with terminal transferase activity can add additional nucleotides, e.g., polyC, to the cDNA in a template independent manner. Switch oligos can include sequences complementary to the additional nucleotides, e.g., polyG. The additional nucleotides (e.g., polyC) on the cDNA can hybridize to the additional nucleotides (e.g., polyG) on the switch oligo, whereby the switch oligo can be used by the reverse transcriptase as template to further extend the cDNA. Template switching oligonucleotides may comprise a hybridization region and a template region. The hybridization region can comprise any sequence capable of hybridizing to the target. In some cases, as previously described, the hybridization region comprises a series of G bases to complement the overhanging C bases at the 3' end of a cDNA molecule. The series of G bases may comprise 1 G base, 2 G bases, 3 G bases, 4 G bases, 5 G bases or more than 5 G bases. The template sequence can comprise any sequence to be incorporated into the cDNA. In some cases, the template region comprises at least 1 (e.g., at least 2, 3, 4, 5 or more) tag sequences and/or functional sequences. Switch oligos may comprise deoxyribonucleic acids; ribonucleic acids; modified nucleic acids including 2-Aminopurine, 2,6-Diaminopurine (2-Amino-dA), inverted dT, 5-Methyl dC, 2'-deoxyinosine, Super T (5-hydroxybutynl-2'-deoxyuridine), Super G (8-aza-7-deazaguanosine), locked nucleic acids (LNAs), unlocked nucleic acids (UNAs, e.g., UNA-A, UNA-U, UNA-C, UNA-G), Iso-dG, Iso-dC, 2' Fluoro bases (e.g., Fluoro C, Fluoro U, Fluoro A, and Fluoro G), or any combination.

In some cases, the length of a switch oligo may be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250 nucleotides or longer.

In some cases, the length of a switch oligo may be at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides or longer.

In some cases, the length of a switch oligo may be at most 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides.

Once the contents of the cells are released into their respective droplets, the macromolecular components (e.g., macromolecular constituents of biological particles, such as RNA, DNA, or proteins) contained therein may be further processed within the droplets.

As described above, the macromolecular components (e.g., bioanalytes) of individual biological particles (e.g., cells or particulate components thereof) can be provided with unique identifiers (e.g., barcodes) such that upon characterization of those macromolecular components, at which point components from a heterogeneous population of cells may have been mixed and are interspersed or solubilized in a common liquid, any given component (e.g., bioanalyte) may be traced to the biological particle (e.g., cell) from which it was obtained. The ability to attribute characteristics to individual biological particles or groups of biological particles is provided by the assignment of unique identifiers specifically to an individual biological particle or groups of biological particles. Unique identifiers, for example, in the form of nucleic acid barcodes, can be assigned or associated with individual biological particles (e.g., cells or particulate components thereof) or populations of biological particles (e.g., cells or particulate components thereof), in order to tag or label the biological particle's macromolecular components (and as a result, its characteristics) with the unique identifiers. These unique identifiers can then be used to attribute the biological particle's components and characteristics to an individual biological particle or group of biological particles. This can be performed by forming droplets including the individual biological particle or groups of biological particles with the unique identifiers (via particles, e.g., supports), as described in the devices and methods herein.

In some aspects, the unique identifiers are provided in the form of oligonucleotides that comprise nucleic acid barcode sequences that may be attached to or otherwise associated with the nucleic acid contents of individual biological particle, or to other components of the biological particle, and particularly to fragments of those nucleic acids. The oligonucleotides are partitioned such that as between oligonucleotides in a given droplet, the nucleic acid barcode sequences contained therein are the same, but as between different droplets, the oligonucleotides can, and do have differing barcode sequences, or at least represent a large number of different barcode sequences across all of the droplets in a given analysis. In some aspects, only one nucleic acid barcode sequence can be associated with a given droplet, although in some cases, two or more different barcode sequences may be present.

The nucleic acid barcode sequences can include from 6 to about 20 or more nucleotides within the sequence of the oligonucleotides. In some cases, the length of a barcode sequence may be 6, 7, 8, 9, 10, 11, 12, 13, 14, 15, 16, 17, 18, 19, 20 nucleotides or longer. In some cases, the length of a barcode sequence may be at least 6, 7, 8, 9, 10, 11, 12, 13, 14, 15, 16, 17, 18, 19, 20 nucleotides or longer. In some cases, the length of a barcode sequence may be at most 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be 4, 5, 6, 7, 8, 9, 10, 11, 12, 13, 14, 15, 16 nucleotides or longer. In some cases, the barcode subsequence may be at least 4, 5, 6, 7, 8, 9, 10, 11, 12, 13, 14, 15, 16 nucleotides or longer. In some cases, the barcode subsequence may be at most 4, 5, 6, 7, 8, 9, 10, 11, 12, 13, 14, 15, 16 nucleotides or shorter.

Analyte moieties (e.g., oligonucleotides) in droplets can also include other functional sequences useful in processing of nucleic acids from biological particles contained in the droplet. These sequences include, for example, targeted or random/universal amplification primer sequences for amplifying the genomic DNA from the individual biological particles within the droplets while attaching the associated barcode sequences, sequencing primers or primer recognition sites, hybridization or probing sequences, e.g., for identification of presence of the sequences or for pulling down barcoded nucleic acids, or any of a number of other potential functional sequences.

Other mechanisms of forming droplets containing oligonucleotides may also be employed, including, e.g., coalescence of two or more droplets, where one droplet contains oligonucleotides, or microdispensing of oligonucleotides into droplets, e.g., droplets within microfluidic devices.

In an example, particles (e.g., supports) are provided that each include large numbers of the above described barcoded oligonucleotides releasably attached to the supports, where all of the oligonucleotides attached to a particular support will include the same nucleic acid barcode sequence, but where a large number of diverse barcode sequences are represented across the population of supports used. In some embodiments, hydrogel beads, e.g., supports having polyacrylamide polymer matrices, are used as a solid support and delivery vehicle for the oligonucleotides into the droplets, as they are capable of carrying large numbers of oligonucleotide molecules, and may be configured to release those oligonucleotides upon exposure to a particular stimulus, as described elsewhere herein. In some cases, the population of supports will provide a diverse barcode sequence library that includes at least about 1,000 different barcode sequences, at least about 5,000 different barcode sequences, at least about 10,000 different barcode sequences, at least about 50,000 different barcode sequences, at least about 100,000 different barcode sequences, at least about 1,000,000 different barcode sequences, at least about 5,000,000 different barcode sequences, or at least about 10,000,000 different barcode sequences, or more. Additionally, each support can be provided with large numbers of oligonucleotide molecules attached. In particular, the number of molecules of oligonucleotides including the barcode sequence on an individual support can be at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules, or more.

Moreover, when the population of supports are included in droplets, the resulting population of droplets can also include a diverse barcode library that includes at least about 1,000 different barcode sequences, at least about 5,000 different barcode sequences, at least about 10,000 different barcode sequences, at least at least about 50,000 different barcode sequences, at least about 100,000 different barcode sequences, at least about 1,000,000 different barcode sequences, at least about 5,000,000 different barcode sequences, or at least about 10,000,000 different barcode sequences. Additionally, each droplet of the population can include at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules.

In some cases, it may be desirable to incorporate multiple different barcodes within a given droplet, either attached to a single or multiple particles, e.g., supports, within the droplet. For example, in some cases, mixed, but known barcode sequences set may provide greater assurance of identification in the subsequent processing, for example, by providing a stronger address or attribution of the barcodes to a given droplet, as a duplicate or independent confirmation of the output from a given droplet.

Oligonucleotides may be releasable from the particles (e.g., supports) upon the application of a particular stimulus. In some cases, the stimulus may be a photo-stimulus, e.g., through cleavage of a photo-labile linkage that releases the oligonucleotides. In other cases, a thermal stimulus may be used, where increase in temperature of the particle, e.g., support, environment will result in cleavage of a linkage or other release of the oligonucleotides form the particles, e.g., supports. In still other cases, a chemical stimulus is used that cleaves a linkage of the oligonucleotides to the supports, or otherwise results in release of the oligonucleotides from the particles, e.g., supports. In one case, such compositions include the polyacrylamide matrices described above for encapsulation of biological particles and may be degraded for release of the attached oligonucleotides through exposure to a reducing agent, such as dithiothreitol (DTT).

The droplets described herein may contain either one or more biological particles (e.g., cells or particulate components thereof), either one or more barcode carrying particles, e.g., supports, or both at least a biological particle and at least a barcode carrying particle, e.g., support. In some instances, a droplet may be unoccupied and contain neither biological particles nor barcode-carrying particles, e.g., supports. As noted previously, by controlling the flow characteristics of each of the liquids combining at the droplet source region(s), as well as controlling the geometry of the droplet source region(s), droplet formation can be optimized to achieve a desired occupancy level of particles, e.g., supports, biological particles, or both, within the droplets that are generated.

Methods of Producing Droplets

The methods described herein may include producing droplets. The methods disclosed herein may produce emulsions, generally, i.e., droplet of a dispersed phases in a continuous phase. For example, droplets may include a first liquid, and the other liquid may be a second liquid. The first liquid may be substantially immiscible with the second liquid. In some instances, the first liquid may be an aqueous liquid or may be substantially miscible with water. Droplets produced according to the methods disclosed herein may combine multiple liquids. For example, a droplet may combine a first and third liquids. The first liquid may be substantially miscible with the third liquid. The second liquid may be an oil, as described herein.

A variety of applications require the evaluation of the presence and quantification of different biological particle or organism types within a population of biological particles, including, for example, microbiome analysis and characterization, environmental testing, food safety testing, epidemiological analysis, e.g., in tracing contamination or the like.

The methods described herein may allow for the production of one or more droplets containing a single particle, e.g., support, and/or single biological particle (e.g., cell or particulate component thereof) with uniform and predictable droplet size. The methods also allow for the sorting and/or production of one or more droplets comprising a single biological particle (e.g., cell or particulate component thereof) and more than one particle, e.g., support, one or more droplets comprising more than one biological particle (e.g., cell or particulate component thereof) and a single particle, e.g., support, and/or one or more droplets comprising more than one biological particle (e.g., cell) and more than one particle, e.g., supports. The methods may also allow for increased throughput of droplet sorting and/or formation.

Droplets are in general formed by allowing a first liquid to flow into a second liquid in a droplet source region, e.g., where droplets spontaneously form as described herein. The droplets may comprise an aqueous liquid dispersed phase within a non-aqueous continuous phase, such as an oil phase. In some cases, droplet formation may occur in the absence of externally driven movement of the continuous phase, e.g., a second liquid, e.g., an oil. As discussed above, the continuous phase may nonetheless be externally driven, even though it is not required for droplet formation. Emulsion systems for creating stable droplets in non-aqueous (e.g., oil) continuous phases are described in detail in, for example, U.S. Pat. No. 9,012,390, which is entirely incorporated herein by reference for all purposes. Alternatively or in addition, the droplets may comprise, for example, microvesicles that have an outer barrier surrounding an inner liquid center or core. In some cases, the droplets may comprise a porous matrix that is capable of entraining and/or retaining materials within its matrix. The droplets can be collected in a substantially stationary volume of liquid, e.g., with the buoyancy of the formed droplets moving them out of the path of nascent droplets (up or down depending on the relative density of the droplets and continuous phase). Alternatively or in addition, the formed droplets can be moved out of the path of nascent droplets actively, e.g., using a gentle flow of the continuous phase, e.g., a liquid stream or gently stirred liquid.

Allocating particles, e.g., supports (e.g., microcapsules carrying barcoded oligonucleotides) or biological particles (e.g., cells or particulate components thereof) to discrete droplets may generally be accomplished by introducing a flowing stream of particles, e.g., supports, in an aqueous liquid into a flowing stream or non-flowing reservoir of a non-aqueous liquid, such that droplets are generated. In some instances, the occupancy of the resulting droplets (e.g., number of particles, e.g., supports, per droplet) can be controlled by providing the aqueous stream at a certain concentration or frequency of particles, e.g., supports and sorting the droplets in a suitable manner. In some instances, the occupancy of the resulting droplets can also be controlled by adjusting one or more geometric features at the point of droplet formation, such as a width of a fluidic channel carrying the particles, e.g., supports, relative to a diameter of a given particles, e.g., supports and subsequently sorting the droplets to provide uniform populations within the partitioning channels of the collection region.

Where single particle-, e.g., support-, containing droplets are desired, the relative flow rates of the liquids can be selected such that, on average, the droplets contain fewer than one particle, e.g., support, per droplet in order to ensure that those droplets that are occupied are primarily singly occupied. In some embodiments, the relative flow rates of the liquids can be selected such that a majority of droplets are occupied, for example, allowing for only a small percentage of unoccupied droplets. The flows and channel architectures can be controlled as to ensure a desired number of singly occupied droplets, less than a certain level of unoccupied droplets and/or less than a certain level of multiply occupied droplets.

When the methods described herein further include producing droplets, the devices described herein can be operated such that a majority of occupied droplets include no more than one biological particle (e.g., cell or particulate component thereof) per occupied droplet. In some cases, the droplet sorting and/or formation processes are conducted such that fewer than 25% of the occupied droplets contain more than one biological particle (e.g., multiply occupied droplets), and in many cases, fewer than 20% of the occupied droplets have more than one biological particle. In some cases, fewer than 10% or even fewer than 5% of the occupied droplets include more than one biological particle per droplet.

It may be desirable to avoid the creation of excessive numbers of empty droplets, for example, from a cost perspective and/or efficiency perspective. However, while this may be accomplished by providing sufficient numbers of particles, e.g., supports, into the droplet or particle source region, the Poisson distribution may expectedly increase the number of droplets that may include multiple biological particles. As such, at most about 95%, 90%, 85%, 80%, 75%, 70%, 65%, 60%, 55%, 50%, 45%, 40%, 35%, 30%, 25%, 20%, 15%, 10%, 5% or less of the generated droplets can be unoccupied. In some cases, the flow of one or more of the particles, or liquids directed into the droplet or particle source region can be conducted such that, in many cases, no more than about 50% of the generated droplets, no more than about 25% of the generated droplets, or no more than about 10% of the generated droplets are unoccupied. Furthermore, in the instance where too many empty droplets are formed, it is desirable to sort out the droplets that are not empty for subsequent use. Furthermore, in the instance where too many droplets are formed that do not contain the desired material but are not empty, it is desirable to sort out the droplets that do not contain the desired material for subsequent use. The flows can be controlled so as to present non-Poisson distribution of singly occupied droplets while providing lower levels of unoccupied droplets. The above noted ranges of unoccupied droplets can be achieved while still providing any of the single occupancy rates described above. For example, in many cases, the use of the devices and methods described herein creates resulting droplets that have multiple occupancy rates of less than about 25%, less than about 20%, less than about 15%, less than about 10%, and in many cases, less than about 5%, while having unoccupied droplets of less than about 50%, less than about 40%, less than about 30%, less than about 20%, less than about 10%, less than about 5%, or less.

The flow of the first fluid may be such that the droplets contain a single particle, e.g., support. In certain embodiments, the yield of droplets containing a single particle is at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

As will be appreciated, the above-described occupancy rates are also applicable to droplets that include both biological particles (e.g., cells or particulate components thereof) and supports. The occupied droplets (e.g., at least about 10%, 20%, 30%, 40%, 50%, 60%, 70%, 80%, 90%, 95%, or 99% of the occupied droplets) can include both a support and a biological particle. Particles, e.g., supports, within a channel (e.g., a particle channel) may flow at a substantially regular flow profile (e.g., at a regular flow rate) to provide a droplet, when formed and/or sorted, with a single particle (e.g., support) and a single cell or other biological particle. Such regular flow profiles may permit the droplets to have a dual occupancy (e.g., droplets having at least one support and at least one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. In some embodiments, the droplets have a 1:1 dual occupancy (i.e., droplets having exactly one particle (e.g., support) and exactly one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. Such regular flow profiles and devices that may be used to provide such regular flow profiles are provided, for example, in U.S. Patent Publication No. 2015/0292988, which is entirely incorporated herein by reference.

In some cases, additional particles may be used to deliver additional reagents to a droplet. In such cases, it may be advantageous to introduce different particles (e.g., support) into a common channel (e.g., proximal to or upstream from a droplet or particle source region) or droplet formation intersection from different support sources (e.g., containing different associated reagents) through different channel inlets into such common channel or droplet or particle source region. In such cases, the flow and/or frequency of each of the different particle, e.g., support, sources into the channel or fluidic connections may be controlled to provide for the desired ratio of particles, e.g., supports, from each source, while optionally ensuring the desired pairing or combination of such particles, e.g., supports, are formed into a droplet with the desired number of biological particles.

The droplets or particles described herein may comprise small volumes, for example, less than about 10 microliters (µL), 5 µL, 1 µL, 900 picoliters (pL), 800 pL, 700 pL, 600 pL, 500 pL, 400 pL, 300 pL, 200 pL, 100 pL, 50 pL, 20 pL, 10 pL, 1 pL, 500 nanoliters (nL), 100 nL, 50 nL, or less. For example, the droplets or particles may have overall volumes that are less than about 1000 pL, 900 pL, 800 pL, 700 pL, 600 pL, 500 pL, 400 pL, 300 pL, 200 pL, 100 pL, 50 pL, 20 pL, 10 pL, 1 pL, or less. Where the droplets further comprise particles (e.g., supports or microcapsules), it will be appreciated that the sample liquid volume within the droplets may be less than about 90% of the above described volumes, less than about 80%, less than about 70%, less than about 60%, less than about 50%, less than about 40%, less than about 30%, less than about 20%, or less than about 10% the above described volumes (e.g., of a partitioning liquid), e.g., from 1% to 99%, from 5% to 95%, from 10% to 90%, from 20% to 80%, from 30% to 70%, or from 40% to 60%, e.g., from 1% to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, 90% to 95%, or 95% to 100% of the above described volumes.

Any suitable number of droplets or particles can be generated. For example, in a method described herein, a plurality of droplets or particles may be generated that comprises at least about 1,000 droplets or particles, at least about 5,000 droplets or particles, at least about 10,000 droplets or particles, at least about 50,000 droplets or particles, at least about 100,000 droplets or particles, at least about 500,000 droplets or particles, at least about 1,000,000 droplets or particles, at least about 5,000,000 droplets or particles at least about 10,000,000 droplets or particles, at least about 50,000,000 droplets or particles, at least about 100,000,000 droplets or particles, at least about 500,000,000 droplets or particles, at least about 1,000,000,000 droplets or particles, or more. Moreover, the plurality of droplets may comprise both unoccupied droplets (e.g., empty droplets) and occupied droplets.

The droplets or particles may be polydisperse, monodisperse, or substantially monodisperse (e.g., having a homogenous distribution of diameters). A plurality of droplets or particles is substantially monodisperse in instances where the droplets or particles have a distribution of diameters such that no more than about 10%, about 5%, about 4%, about 3%, about 2%, about 1%, or less, of the droplets or particles have a diameter greater than or less than about 20%, about 30%, about 50%, about 75%, about 80%, about 90%, about 95%, about 99%, or more, of the average diameter of all of the droplets or particles.

The fluid to be dispersed into droplets may be transported from a reservoir to the droplet source region. Alternatively, the fluid to be dispersed into droplets is formed in situ by combining two or more fluids in the device. For example, the fluid to be dispersed may be formed by combining one fluid containing one or more reagents with one or more other fluids containing one or more reagents. In these embodiments, the mixing of the fluid streams may result in a chemical reaction. For example, when a particle is employed, a fluid having reagents that disintegrates the particle may be combined with the particle, e.g., immediately upstream of the droplet generating region. In these embodiments, the particles may be cells, which can be combined with lysing reagents, such as surfactants. When particles, e.g., supports, are employed, the particles, e.g., supports, may be dissolved or chemically degraded, e.g., by a change in pH (acid or base), redox potential (e.g., addition of an oxidizing or reducing agent), enzymatic activity, change in salt or ion concentration, or other mechanism.

The first fluid is transported through the first channel at a flow rate sufficient to produce droplets in the droplet source region. Faster flow rates of the first fluid generally increase the rate of droplet production; however, at a high enough rate, the first fluid will form a jet, which may not break up into droplets. Typically, the flow rate of the first fluid though the first channel may be between about 0.01 µL/min to about 100 µL/min, e.g., 0.1 to 50 µL/min, 0.1 to 10 µL/min, or 1 to 5 µL/min. In some instances, the flow rate of the first liquid may be between about 0.04 µL/min and about 40 µL/min. In some instances, the flow rate of the first liquid may be between about 0.01 µL/min and about 100 µL/min. Alternatively, the flow rate of the first liquid may be less than about 0.01 µL/min. Alternatively, the flow rate of the first liquid may be greater than about 40 µL/min, e.g., 45 µL/min, 50 µL/min, 55 µL/min, 60 µL/min, 65 µL/min, 70 µL/min, 75 µL/min, 80 µL/min, 85 µL/min, 90 µL/min, 95 µL/min, 100 µL/min, 110 µL/min, 120 µL/min, 130 µL/min, 140 µL/min, 150 µL/min, or greater. At lower flow rates, such as flow rates of about less than or equal to 10 µL/min, the droplet radius may not be dependent on the flow rate of first liquid. Alternatively or in addition, for any of the abovementioned flow rates, the droplet radius may be independent of the flow rate of the first liquid.

The typical droplet or particle formation rate for a single channel in a device of the invention is between 0.1 Hz to 10,000 Hz, e.g., 1 to 1000 Hz or 1 to 500 Hz. The use of multiple first channels can increase the rate of droplet or particle formation by increasing the number of locations of formation. For example, and without limitation, the droplet or particle formation rate for a single channel may be 130-150 Hz.

As discussed above, droplet or particle formation may occur in the absence of externally driven movement of the continuous phase. In such embodiments, the continuous phase flows in response to displacement by the advancing stream of the first fluid or other forces. Channels may be present in the droplet or particle source region, e.g., including a shelf region, to allow more rapid transport of the continuous phase around the first fluid. This increase in transport of the continuous phase can increase the rate of droplet or particle formation. Alternatively, the continuous phase may be actively transported. For example, the continuous phase may be actively transported into the droplet or particle source region, e.g., including a shelf region, to increase the rate of droplet or particle formation; continuous phase may be actively transported to form a sheath flow around the first fluid as it exits the distal end; or the continuous phase may be actively transported to move droplets or particles away from the point of formation.

Additional factors that affect the rate of droplet or particle formation include the viscosity of the first fluid and of the continuous phase, where increasing the viscosity of either fluid reduces the rate of droplet or particle formation. In certain embodiments, the viscosity of the first fluid and/or continuous is between 0.5 cP to 10 cP. Furthermore, lower interfacial tension results in slower droplet or particle formation. In certain embodiments, the interfacial tension is between 0.1 and 100 mN/m, e.g., 1 to 100 mN/m or 2 mN/m to 60 mN/m. The depth of the shelf region can also be used to control the rate of droplet or particle formation, with a shallower depth resulting in a faster rate of formation.

The methods may be used to produce droplets or particles in range of 1 µm to 500 µm in diameter, e.g., 1 to 250 µm, 5 to 200 µm, 5 to 150 µm, or 12 to 125 µm. Factors that affect the size of the droplets or particles include the rate of formation, the cross-sectional dimension of the distal end of the first channel, the depth of the shelf, and fluid properties and dynamic effects, such as the interfacial tension, viscosity, and flow rate.

The first liquid may be aqueous, and the second liquid may be an oil (or vice versa). Examples of oils include perfluorinated oils, mineral oil, and silicone oils. For example, a fluorinated oil may include a fluorosurfactant for stabilizing the resulting droplets, for example, inhibiting subsequent coalescence of the resulting droplets. Examples of particularly useful liquids and fluorosurfactants are described, for example, in U.S. Pat. No. 9,012,390, which is entirely incorporated herein by reference for all purposes. Specific examples include hydrofluoroethers, such as HFE 7500, 7300, 7200, or 7100. Suitable liquids are those described in US 2015/0224466 and U.S. 62/522,292, the liquids of which are hereby incorporated by reference. In some cases, liquids include additional components such as a particle, e.g., a cell or a gel bead. As discussed above, the first fluid or continuous phase may include reagents for carrying out various reactions, such as nucleic acid amplification, lysis, or bead dissolution. The first liquid or continuous phase may include additional components that stabilize or otherwise affect the droplets or particles or a component inside the droplet. Such additional components include surfactants, antioxidants, preservatives, buffering agents, antibiotic agents, salts, chaotropic agents, enzymes, nanoparticles, and sugars.

Devices and methods of the present disclosure may be used for various applications, such as, for example, processing a single analyte (e.g., bioanalytes, e.g., RNA, DNA, or protein) or multiple analytes (e.g., bioanalytes, e.g., DNA and RNA, DNA and protein, RNA and protein, or RNA, DNA and protein) from a single cell. For example, a biological particle (e.g., a cell or virus) can be formed in a droplet, and one or more analytes (e.g., bioanalytes) from the biological particle (e.g., cell) can be modified or detected (e.g., bound, labeled, or otherwise modified by an analyte moiety) for subsequent processing. The multiple analytes may be from the single cell. This process may enable, for example, proteomic, transcriptomic, and/or genomic analysis of the cell or population thereof (e.g., simultaneous proteomic, transcriptomic, and/or genomic analysis of the cell or population thereof).

Methods of modifying analytes include providing a plurality of particles (e.g., supports) in a liquid carrier (e.g., an aqueous carrier); providing a sample containing an analyte (e.g., as part of a cell, or component or product thereof) in a sample liquid; and using the device to combine the liquids and form an analyte droplet containing one or more particles and one or more analytes (e.g., as part of one or more cells, or components or products thereof). Such sequestration of one or more particles with analyte (e.g., bioanalyte associated with a cell) in a droplet enables labeling of discrete portions of large, heterologous samples (e.g., single cells within a heterologous population). Once labeled or otherwise modified, droplets or particles can be subsequently sorted or combined (e.g., by breaking an emulsion), and the resulting liquid can be analyzed to determine a variety of properties associated with each of numerous single cells.

In particular embodiments, the invention features methods of producing analyte droplets using a device having a particle channel and a sample channel that intersect proximal to a droplet or particle source region. Particles having an analyte moiety in a liquid carrier flow proximal-to-distal (e.g., towards the droplet or particle source region) through the particle channel and a sample liquid containing an analyte flows proximal-to-distal (e.g., towards the droplet or particle source region) through the sample channel until the two liquids meet and combine at the intersection of the sample channel and the particle channel, upstream (and/or proximal to) the droplet or particle source region. The combination of the liquid carrier with the sample liquid results in an analyte liquid. For example, and without limitation, a first liquid from a first channel comprising a support may react with a third liquid from a second channel having a biological particle such that the droplets include the first and third liquids to create an analyte liquid having both the support and the biological particle. In some embodiments, the two liquids are miscible (e.g., they both contain solutes in water or aqueous buffer). The combination of the two liquids can occur at a controlled relative rate, such that the analyte liquid has a desired volumetric ratio of particle liquid to sample liquid, a desired numeric ratio of particles to cells, or a combination thereof (e.g., one particle per cell per 50 pL). As the analyte liquid flows through the droplet or particle source region into a partitioning liquid (e.g., a liquid which is immiscible with the analyte liquid, such as an oil), analyte droplets form. Alternatively or in addition, the analyte droplets may accumulate (e.g., as a substantially stationary population) in a collection region. In some cases, the accumulation of a population of droplets may occur by a gentle flow of a fluid within the collection region, e.g., to move the formed droplets out of the path of the nascent droplets.

Devices useful for analysis may feature any combination of elements described herein. For example, various droplet or particle source regions can be employed in the design of a device for analysis. In some embodiments, analyte droplets are formed at a droplet or particle source region having a shelf region, where the analyte liquid expands in at least one dimension as it passes through the droplet or particle source region. Any shelf region described herein can be useful in the methods of analyte droplet sorting and/or formation provided herein. Additionally or alternatively, the droplet or particle source region may have a step region comprising a step at or distal to an inlet of the droplet or particle source region (e.g., within the droplet or particle source region or distal to the droplet or particle source region). In some embodiments, analyte droplets are formed without externally driven flow of a continuous phase (e.g., by one or more crossing flows of liquid at the droplet or particle source region). Alternatively, analyte droplets are formed in the presence of an externally driven flow of a continuous phase.

A device useful for droplet formation may feature multiple droplet formation, sorting, and/or collection regions (e.g., in or out of (e.g., as independent, parallel circuits) fluid communication with one another. For example, such a device may have 2-100, 3-50, 4-40, 5-30, 6-24, 8-18, or 9-12, e.g., 2-6, 6-12, 12-18, 18-24, 24-36, 36-48, or 48-96, e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or more droplet formation, sorting, and/or collection regions configured to produce analyte droplets).

Source reservoirs can store liquids prior to and during droplet or particle formation. In some embodiments, a device useful in analyte droplet or particle formation includes one or more particle reservoirs connected proximally to one or more particle channels. Particle suspensions can be stored in particle reservoirs prior to analyte droplet formation. Particle reservoirs can be configured to store particles containing an analyte moiety. For example, particle reservoirs can include, e.g., a coating to prevent adsorption or binding (e.g., specific or non-specific binding) of particles or analyte moieties. Additionally or alternatively, particle reservoirs can be configured to minimize degradation of analyte moieties (e.g., by containing nuclease, e.g., DNAse or RNAse) or the particle matrix itself, accordingly.

Additionally or alternatively, a device includes one or more sample reservoirs connected proximally to one or more sample channels. Samples containing cells and/or other reagents useful in analysis and/or droplet sorting and/or formation can be stored in sample reservoirs prior to analyte droplet sorting and/or formation. Sample reservoirs can be configured to reduce degradation of sample components, e.g., by including nuclease (e.g., DNAse or RNAse).

Methods of the invention include administering a sample and/or particles to the device, for example, (a) by pipetting a sample liquid, or a component or concentrate thereof, into a sample reservoir and/or (b) by pipetting a liquid carrier (e.g., an aqueous carrier) and/or particles into a particle reservoir. In some embodiments, the method involves first pipetting the liquid carrier (e.g., an aqueous carrier) and/or particles into the particle reservoir prior to pipetting the sample liquid, or a component or concentrate thereof, into the sample reservoir.

The sample reservoir and/or particle reservoir may be incubated in conditions suitable to preserve or promote activity of their contents until the initiation or commencement of droplet or particle formation and sorting.

Sorting and/or formation of bioanalyte droplets or particles, as provided herein, can be used for various applications. In particular, by sorting and/or forming bioanalyte droplets using the methods and devices a user can perform standard downstream processing methods to barcode heterogeneous populations of cells or perform single-cell nucleic acid sequencing.

In methods of barcoding a population of cells, an aqueous sample having a population of cells is combined with bioanalyte particles having a nucleic acid primer sequence and a barcode in an aqueous carrier at an intersection of the sample channel and the particle channel to form a reaction liquid. Upon passing through the droplet or particle source region, the reaction liquid meets a partitioning liquid (e.g., a partitioning oil) under droplet-forming conditions to form a plurality of reaction droplets, each reaction droplet having one or more of the particles and one or more cells in the reaction liquid. The reaction droplets are incubated under conditions sufficient to allow for barcoding of the nucleic acid of the cells in the reaction droplets or particles. In some embodiments, the conditions sufficient for barcoding are thermally optimized for nucleic acid replication, transcription, and/or amplification. For example, reaction droplets can be incubated at temperatures configured to enable reverse transcription of RNA produced by a cell in a droplet into DNA, using reverse transcriptase. Additionally or alternatively, reaction droplets may be cycled through a series of temperatures to promote amplification, e.g., as in a polymerase chain reaction (PCR). Accordingly, in some embodiments, one or more nucleotide amplification reagents (e.g., PCR reagents) are included in the reaction droplets (e.g., primers, nucleotides, and/or polymerase). Any one or more reagents for nucleic acid replication, transcription, and/or amplification can be provided to the reaction droplet by the aqueous sample, the liquid carrier, or both. In some embodiments, one or more of the reagents for nucleic acid replication, transcription, and/or amplification are in the aqueous sample.

The invention also provides methods of single-cell nucleic acid sequencing, in which a heterologous population of cells can be characterized by their individual gene expression, e.g., relative to other cells of the population. Methods of barcoding cells discussed above and known in the art can be part of the methods of single-cell nucleic acid sequencing provided herein. After barcoding, nucleic acid transcripts that have been barcoded are sequenced, and sequences can be processed, analyzed, and stored according to known methods. In some embodiments, these methods enable the generation of a genome library containing gene expression data for any single cell within a heterologous population.

Alternatively, the ability to sequester a single cell or particulate component thereof in a reaction droplet provided by methods herein enables applications beyond genome characterization. For example, a reaction droplet containing a single cell or particulate component thereof and variety of analyte moieties capable of binding different proteins can allow a single cell or particulate component thereof to be detectably labeled to provide relative protein expression data. In some embodiments, analyte moieties are antigen-binding molecules (e.g., antibodies or fragments thereof), wherein each antibody clone is detectably labeled (e.g., with a fluorescent marker having a distinct emission wavelength). Binding of antibodies to proteins can occur within the reaction droplet, and cells can be subsequently analyzed for bound antibodies according to known methods to generate a library of protein expression. Other methods known in the art can be employed to characterize cells within heterologous populations after detecting analytes using the methods provided herein. In one example, following the sorting and/or formation of droplets, subsequent operations that can be performed can include formation of amplification products, purification (e.g., via solid phase reversible immobilization (SPRI)), further processing (e.g., shearing, ligation of functional sequences, and subsequent amplification (e.g., via PCR)). These operations may occur in bulk (e.g., outside the droplet). An exemplary use for droplets formed and/or sorted using methods of the invention is in performing nucleic acid amplification, e.g., polymerase chain reaction (PCR), where the reagents necessary to carry out the amplification are contained within the first fluid. In the case where a droplet is a droplet in an emulsion, the emulsion can be broken and the contents of the droplet pooled for additional operations. Additional reagents that may be included in a droplet along with the barcode bearing support may include oligonucleotides to block ribosomal RNA (rRNA) and nucleases to digest genomic DNA from cells. Alternatively, rRNA removal agents may be applied during additional processing operations. The configuration of the constructs generated by such a method can help minimize (or avoid)

sequencing of poly-T sequence during sequencing and/or sequence the 5' end of a polynucleotide sequence. The amplification products, for example first amplification products and/or second amplification products, may be subject to sequencing for sequence analysis. In some cases, amplification may be performed using the Partial Hairpin Amplification for Sequencing (PHASE) method.

Methods of Device Manufacture

The microfluidic devices of the present disclosure may be fabricated in any of a variety of conventional ways. Devices may be fabricated in whole or in part from polymeric materials, such as polyethylene or polyethylene derivatives, such as cyclic olefin copolymers (COC), polymethylmethacrylate (PMMA), polydimethylsiloxane (PDMS), polycarbonate, polystyrene, polypropylene, polyvinyl chloride, polytetrafluoroethylene, polyoxymethylene, polyether ether ketone, polycarbonate, polystyrene, or the like, or they may be fabricated in whole or in part from inorganic materials, such as silicon, or other silica based materials, e.g., glass, quartz, fused silica, borosilicate glass, metals, ceramics, and combinations thereof. Polymeric device components may be fabricated using any of a number of processes including soft lithography, embossing techniques, micromachining, e.g., laser machining, or in some aspects injection molding of the layer components that include the defined channels as well as other structures, e.g., reservoirs, integrated functional components, etc. In some aspects, the structure comprising the reservoirs and channels may be fabricated using, e.g., injection molding techniques to produce polymeric structures. In such cases, a laminating layer may be adhered to the molded structured part through readily available methods, including thermal lamination, solvent based lamination, sonic welding, or the like.

As will be appreciated, structures comprised of inorganic materials also may be fabricated using known techniques. For example, channels and other structures may be micromachined into surfaces or etched into the surfaces using standard photolithographic techniques. In some aspects, the microfluidic devices or components thereof may be fabricated using three-dimensional printing techniques to fabricate the channel or other structures of the devices and/or their discrete components.

Other Embodiments

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims. Other embodiments are within the claims.

EXAMPLES

Example 1

Figure 2:
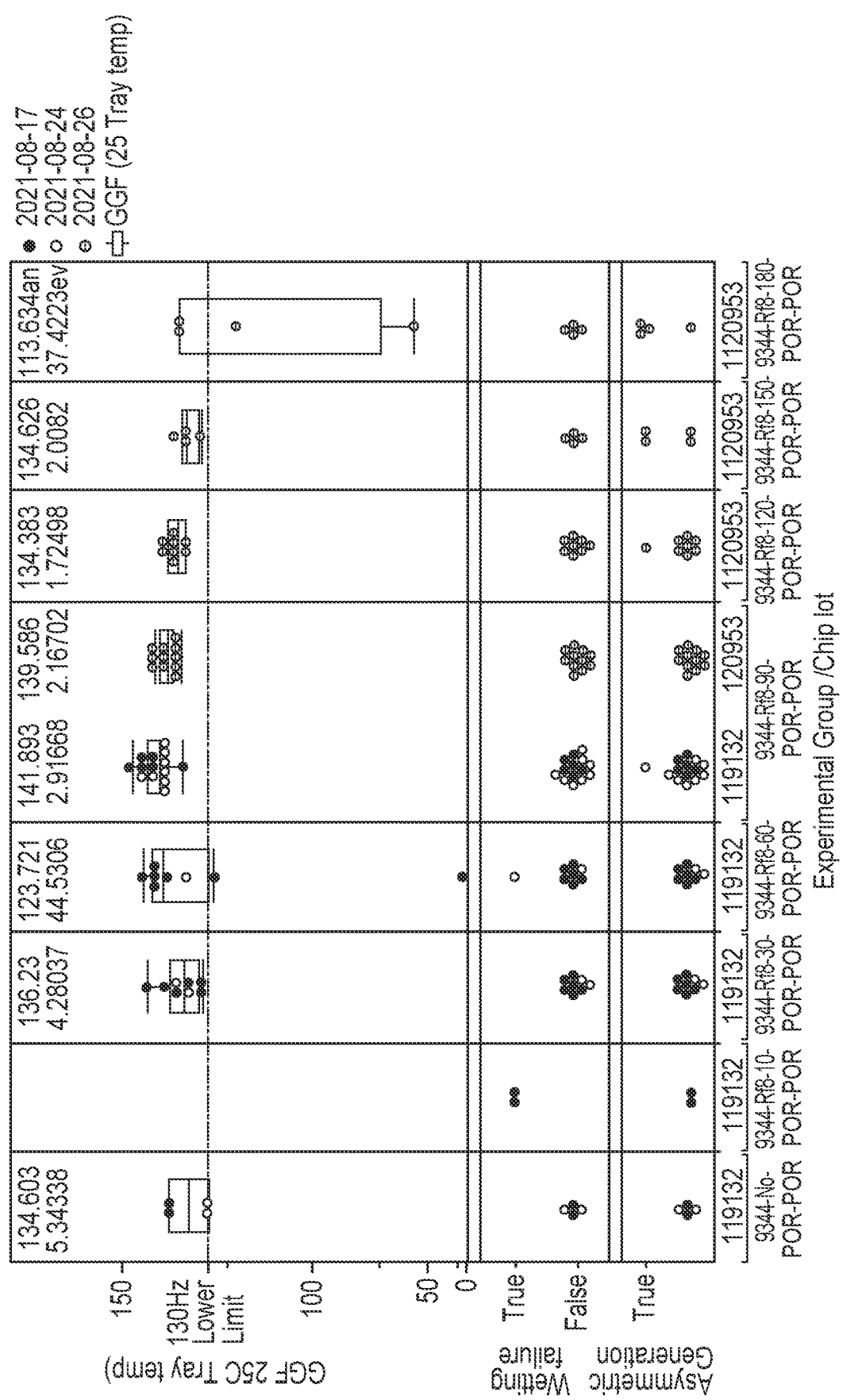
FIG. 2 is a graph illustrating a droplet generation frequency using a crosslinked fluorocarbon surface coating crosslinked with 1H,10H,10H-perfluorodecane-1,10-diol.

FIG. 2 shows an exemplary embodiment of a crosslinked fluorocarbon surface coating comprising the fluorocarbon silane having the structure of Formula I and 1H,10H,10H-perfluorodecane-1,10-diol. The fluorocarbon silane was crosslinked by reacting at least one alkoxy of $R_1$, $R_2$, $R_3$, $R_4$, $R_5$, or $R_6$ of a first fluorocarbon silane with a first hydroxy of 1H,1H,10H,10H-perfluorodecane-1,10-diol, and reacting at least one alkoxy of $R_1$, $R_2$, $R_3$, $R_4$, $R_5$, or $R_6$ of a second fluorocarbon silane with a second hydroxy of 1H,1H,10H, 10H-perfluorodecane-1,10-diol. The crosslinked fluorocarbon surface coating was applied to the droplet source region of a device, in which 1H,1H,10H,10H-perfluorodecane-1, 10-diol was added at a range of concentrations of about 0.01 weight percent (wt %) to about 0.075 wt %. The droplet generation frequency achieved consistent results of 141.893+/−2.91668 Hz and 139.586+/−2.16702 Hz when 1H,1H,10H,10H-perfluorodecane-1,10-diol was added at a 0.03 weight percent (wt %). Additionally, when 1H,1H,10H, 10H-perfluorodecane-1,10-diol was added at a 0.03 wt %, a reduced number of wetting failures and asymmetric generations occurred.

Example 2

Figure 3:
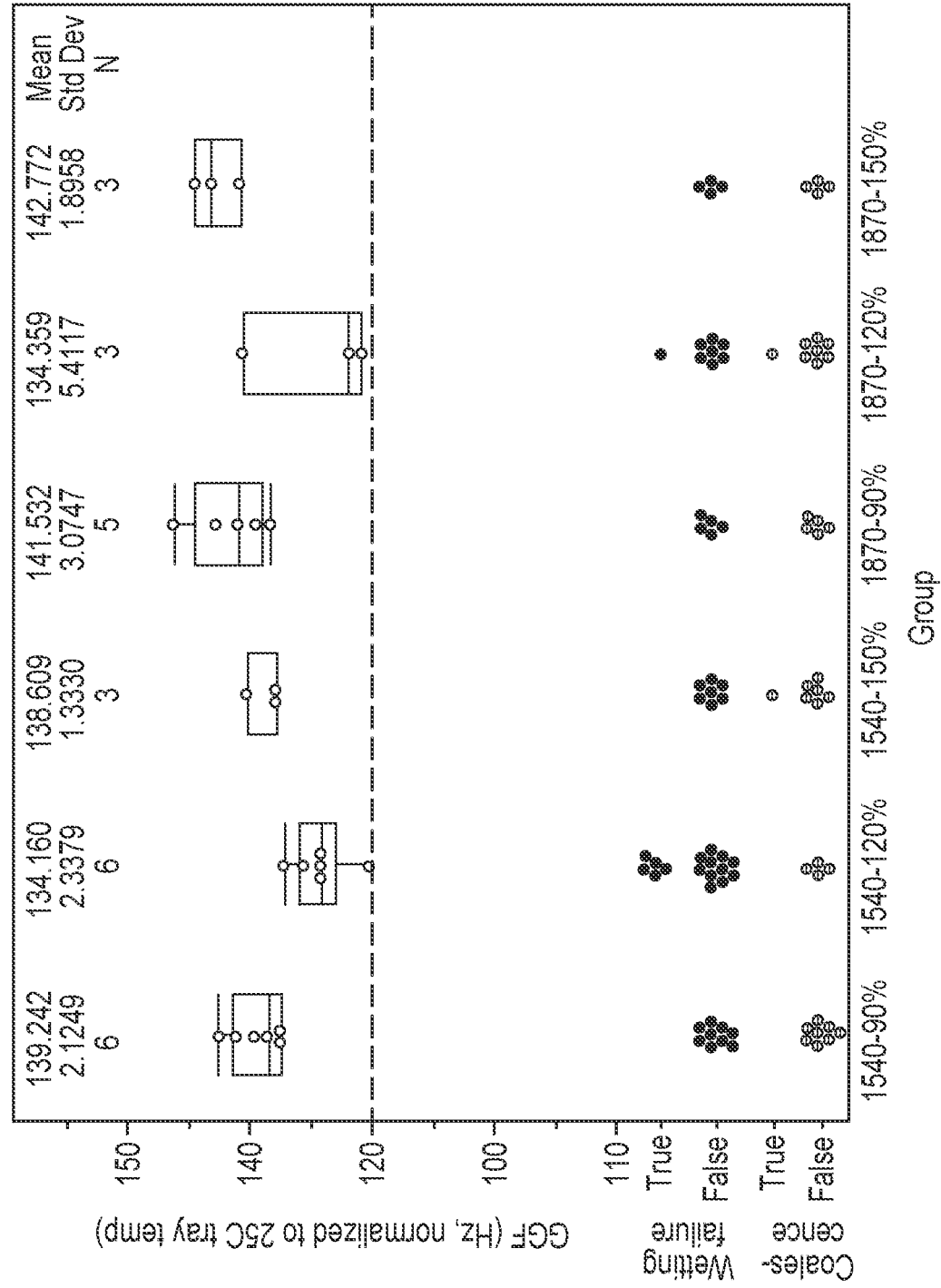
FIG. 3 is a graph illustrating a droplet generation frequency using a fluorocarbon surface coating crosslinked with a perfluoropolyether diol having a molecular weight of 1540 g/mol or 1870 g/mol.

FIG. 3 shows an exemplary embodiment of a fluorocarbon surface coating crosslinked with perfluoropolyether diols having molecular weights of 1540 g/mol and 1870 g/mol, and a general structure of HO—X—$(CF_2CF_2O)_n$ $(CF_2O)_m(CF_2CF(CF_3)O)_k$—Y—OH, in which X and Y were alkyl or perfluoro units and m, n, and k ranged from 0 to 6. The crosslinked fluorocarbon surface coating was applied to the droplet source region of a device, in which the perfluoropolyether diol having a molecular weight of 1540 g/mol was added at a range of about 90 mol % to about 150 mol %. The droplet generation frequency achieved 139.242+/− 2/12496 Hz when perfluoropolyether diol having a molecular weight of 1540 g/mol was added at 90 mol %, in which mol % refers to the moles of fluorocarbon polyol to the moles of fluorocarbon silane). Additionally, when perfluoropolyether diol having a molecular weight of 1540 g/mol was added at 90 mol %, a reduced number of wetting failures and asymmetric generations occurred. The crosslinked fluorocarbon surface coating was applied to the droplet source region of a device, in which the perfluoropolyether diol having a molecular weight of 1870 g/mol was added at a range of about 90 mol % to about 150 mol %. The droplet generation frequency achieved consistent results of 141.532+/−3.07475 Hz when perfluoropolyether diol having a molecular weight of 1870 g/mol was added at 90 mol %. Additionally, when perfluoropolyether diol having a molecular weight of 1870 g/mol was added at 90 mol %, a reduced number of wetting failures and asymmetric generations occurred.

Example 3

Figure 4:
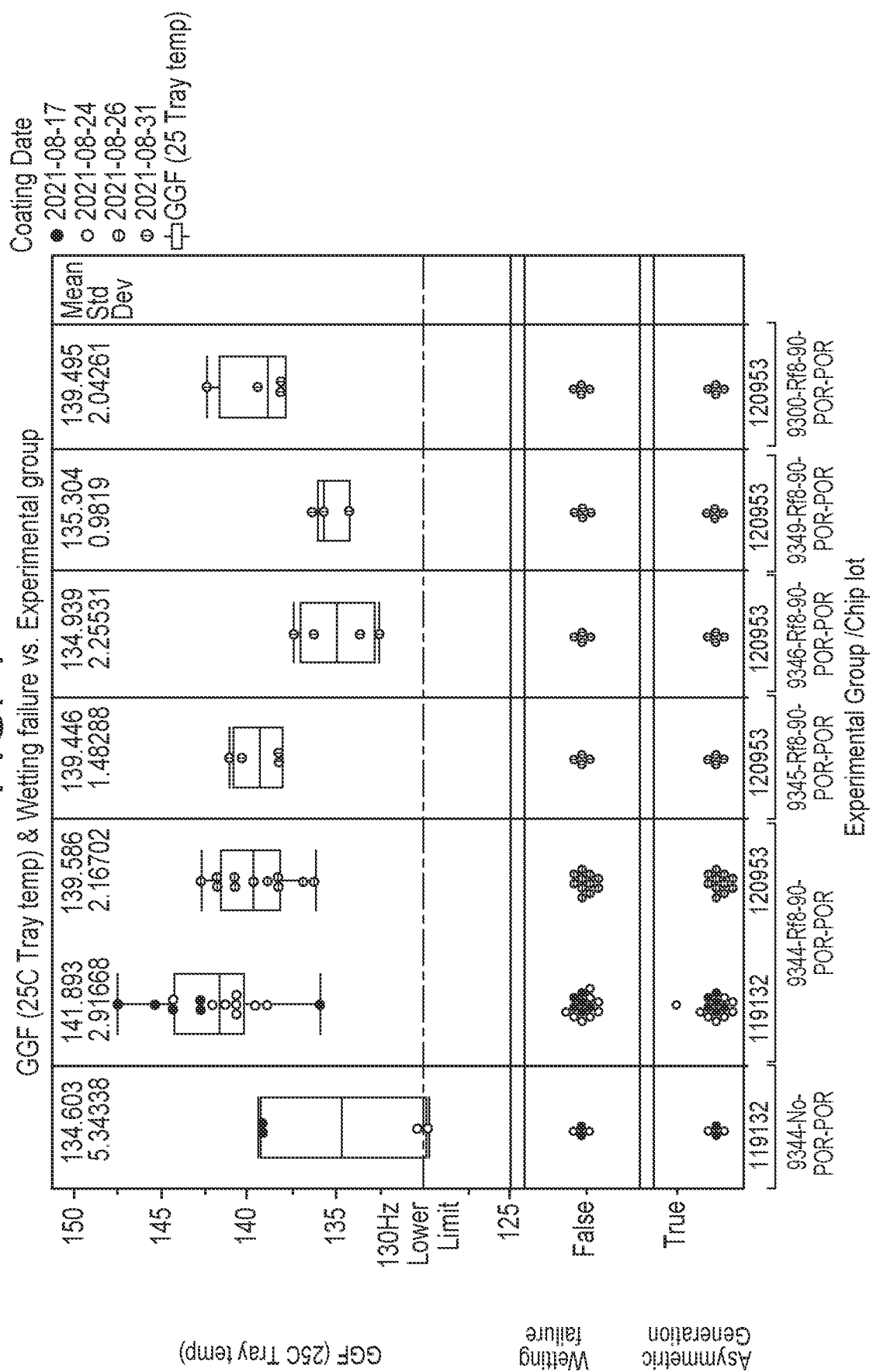
FIG. 4 is a graph illustrating a droplet generation frequency using a crosslinked fluorocarbon surface coating having a plurality of fluorocarbon silanes crosslinked with 1H,1H,10H,10H-perfluorodecane-1,10-diol.

FIG. 4 shows an exemplary embodiment of a crosslinked fluorocarbon surface coating using a plurality of fluorocarbon silanes and 1H,1H,10H,10H-perfluorodecane-1,10-diol. The crosslinked fluorocarbon surface coating was applied to the droplet source region of a device, in which 1H,1H,10H, 10H-perfluorodecane-1,10-diol was added at a range of concentrations of about 0.01 wt % to about 0.075 wt % The droplet generation frequency achieved consistent results of about 141 Hz+/−2.92 Hz when 1H,1H,10H,10H-perfluorodecane-1,10-diol was added at a 0.03 weight percent (wt %). Additionally, when 1H,1H,10H,10H-perfluorodecane-1,10-diol was added at a 0.03 wt %, a reduced number of wetting failures and asymmetric generations occurred.

Other embodiments are in the claims.

What is claimed is:

1. A microfluidic device comprising:
a first channel or region being coated with a crosslinked fluorocarbon surface coating and having a first depth, a first width, a first proximal end, and a first distal end,
wherein the crosslinked fluorocarbon surface coating is produced by the reaction of a fluorocarbon silane and a fluorocarbon polyol,
wherein the fluorocarbon polyol is a compound of Formula V:

(V)

wherein:
V is —(CZ$_2$)$_{n'}$—C$_{1-15}$perfluoroalkylene-(CZ$_2$)$_{n'}$— or —(CZ$_2$)$_{n'}$—(C$_{1-15}$ heterofluoroalkylene)$_{n'}$—(CZ$_2$)$_{n'}$—, wherein each Z is independently H, F, or C$_{1-6}$ perfluoroalkyl and each n' is independently 1, 2, 3, 4, 5, 6 or 7.

2. The device of claim 1, wherein V is —(CZ$_2$)$_{n'}$—C$_{1-15}$perfluoroalkylene-(CZ$_2$)$_{n'}$—.

3. The device of claim 1, wherein V is —(CZ$_2$)$_{n'}$—(C$_{1-15}$ heterofluoroalkylene)$_{n'}$-(CZ$_2$)$_{n'}$—.

4. The device of claim 1, wherein V has the structure of Formula VI:

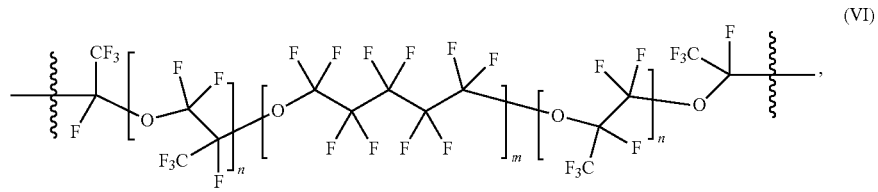

(VI)

wherein each n is independently 0, 1, 2, 3, 4, 5, 6, or 7, and m is 1, 2, 3, 4, 5, or 6.

5. The device of claim 1, wherein the fluorocarbon silane has the structure of Formula II:

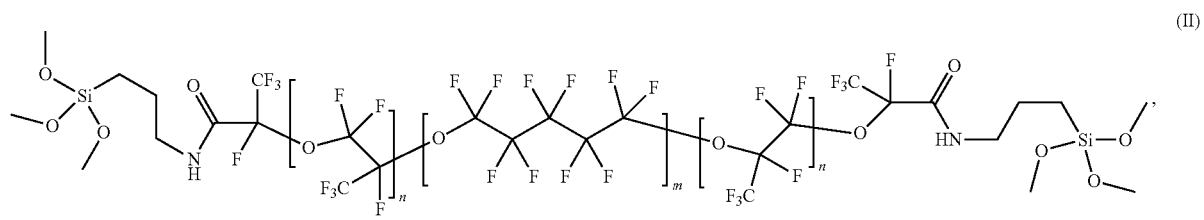

(II)

wherein each n is independently 1, 2, 3, 4, 5, 6, or 7; and m is 1, 2, 3, 4, 5, or 6.

6. A microfluidic device comprising:
a first channel or region being coated with a crosslinked fluorocarbon surface coating and having a first depth, a first width, a first proximal end, and a first distal end,
wherein the crosslinked fluorocarbon surface coating is produced by the reaction of a fluorocarbon silane and a fluorocarbon polyol,
wherein the fluorocarbon silane has the structure of Formula II:

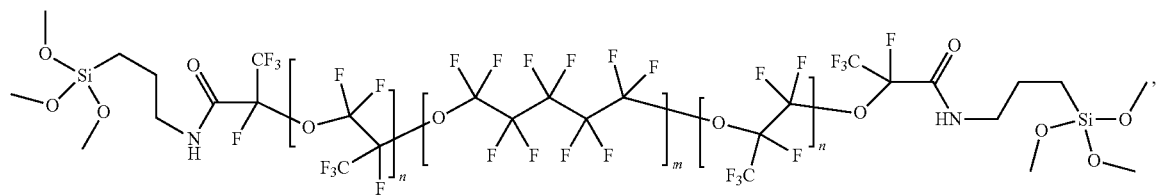 (II)
wherein each n is independently 1, 2, 3, 4, 5, 6, or 7; and m is 1, 2, 3, 4, 5, or 6.
\* \* \* \* \*